(12) United States Patent
Lee

(10) Patent No.: US 12,066,649 B2
(45) Date of Patent: Aug. 20, 2024

(54) LIGHT EMITTING SHEET AND LIGHT UNIT INCLUDING THE SAME

(71) Applicant: MEMSLUX, Daejeon (KR)

(72) Inventor: Jeong-Mu Lee, Daejeon (KR)

(73) Assignee: MEMSLUX (KR)

( * ) Notice: Subject to any disclaimer, the term of this patent is extended or adjusted under 35 U.S.C. 154(b) by 0 days.

(21) Appl. No.: 18/210,098

(22) Filed: Jun. 15, 2023

(65) Prior Publication Data

US 2023/0408747 A1 Dec. 21, 2023

Related U.S. Application Data

(63) Continuation of application No. 17/523,948, filed on Nov. 11, 2021, now Pat. No. 11,774,661.

(30) Foreign Application Priority Data

Nov. 11, 2020 (KR) .......... 10-2020-0150007
Feb. 8, 2021 (KR) .......... 10-2021-0017447

(51) Int. Cl.
*F21V 8/00* (2006.01)
*G02F 1/13357* (2006.01)

(52) U.S. Cl.
CPC .......... *G02B 6/0036* (2013.01); *G02B 6/0088* (2013.01); *G02F 1/133603* (2013.01);
(Continued)

(58) Field of Classification Search
CPC .................................................. G02B 6/0036
See application file for complete search history.

(56) References Cited

U.S. PATENT DOCUMENTS

| 8,834,004 B2 | 9/2014 | Thompson et al. |
| 9,022,635 B2 | 5/2015 | Yoon et al. |

(Continued)

FOREIGN PATENT DOCUMENTS

| CN | 202165953 U | 3/2012 |
| CN | 104520740 A | 5/2015 |

(Continued)

OTHER PUBLICATIONS

Jeongho Yeon et al., "An effective light-extracting microstructure for a single-sheet backlight unit for liquid crystal isplay" Journal of Micromechanics and Microengineering, (Publ ished Jul. 26, 2012) 22 095006, pp. 1-10.

(Continued)

*Primary Examiner* — Keith G. Delahoussaye
(74) *Attorney, Agent, or Firm* — The Belles Group, P.C.

(57) ABSTRACT

The present invention relates to a light exiting member, a method of manufacturing the same, and more particularly, to a backlight unit of a liquid crystal display, a front light unit of a reflective display, applicable to interior lighting, living lighting or advertisement lighting, and a light member capable of implementing a delicate and various specific image by selectively burying or modifying the same. The light exiting member according to an embodiment of the present invention has a plurality of fine pattern portions formed on one surface, the fine pattern portions have a cavity, the cavity is defined by a lower surface located at a predetermined depth from the opening and a plurality of inner surfaces connected to the lower surface, and at least one of the inner surfaces is convex.

18 Claims, 49 Drawing Sheets

(52) U.S. Cl.
CPC .. *G02F 1/133604* (2013.01); *G02F 1/133606* (2013.01); *G02F 1/133611* (2013.01)

(56) References Cited

U.S. PATENT DOCUMENTS

| | | | |
|---|---|---|---|
| 9,470,838 | B2 | 10/2016 | Thompson et al. |
| 10,459,148 | B1 | 10/2019 | Yoon et al. |
| 2002/0197051 | A1 | 12/2002 | Tamura et al. |
| 2010/0157624 | A1 | 6/2010 | Liao et al. |
| 2010/0309687 | A1 | 12/2010 | Sampsell et al. |
| 2013/0094243 | A1 | 4/2013 | Wu et al. |
| 2013/0188392 | A1 | 7/2013 | Yoon et al. |
| 2014/0043850 | A1 | 2/2014 | Thompson et al. |
| 2015/0003106 | A1 | 1/2015 | Thompson et al. |
| 2016/0047972 | A1 | 2/2016 | Kim et al. |
| 2018/0120637 | A1 | 5/2018 | Yun et al. |
| 2019/0302341 | A1 | 10/2019 | Chen |
| 2019/0377127 | A1 | 12/2019 | Jo et al. |
| 2020/0278583 | A1 | 9/2020 | Sasaki et al. |
| 2021/0191024 | A1 | 6/2021 | Kajiya et al. |
| 2021/0318482 | A1 | 10/2021 | Li |

FOREIGN PATENT DOCUMENTS

| | | |
|---|---|---|
| CN | 105807360 A | 7/2016 |
| CN | 110320587 A | 10/2019 |
| JP | 2003149640 A | 5/2003 |
| JP | 2009043471 A | 2/2009 |
| JP | 2009157405 A | 7/2009 |
| JP | 2010198824 A | 9/2010 |
| JP | 2012014834 A | 1/2012 |
| JP | 2015130321 A | 7/2015 |
| JP | 2015531149 A | 10/2015 |
| JP | 2017173733 A | 9/2017 |
| JP | 2018155834 A | 10/2018 |
| KR | 20110060348 A | 6/2011 |
| KR | 20150120000 A | 10/2015 |
| KR | 20200009930 A | 1/2020 |
| WO | 2018174646 A1 | 9/2018 |
| WO | 20200050923 A2 | 3/2020 |

OTHER PUBLICATIONS

Joo-Hyung Lee et al., "Simple liquid crystal display backlight unit comprising only a single-sheet micropatterned polydimethylsiloxane (PDMS) light-guide plate," Optics Letters, vol. 32, No. 18, Issued Sep. 15, 2007, pp. 665-2667.

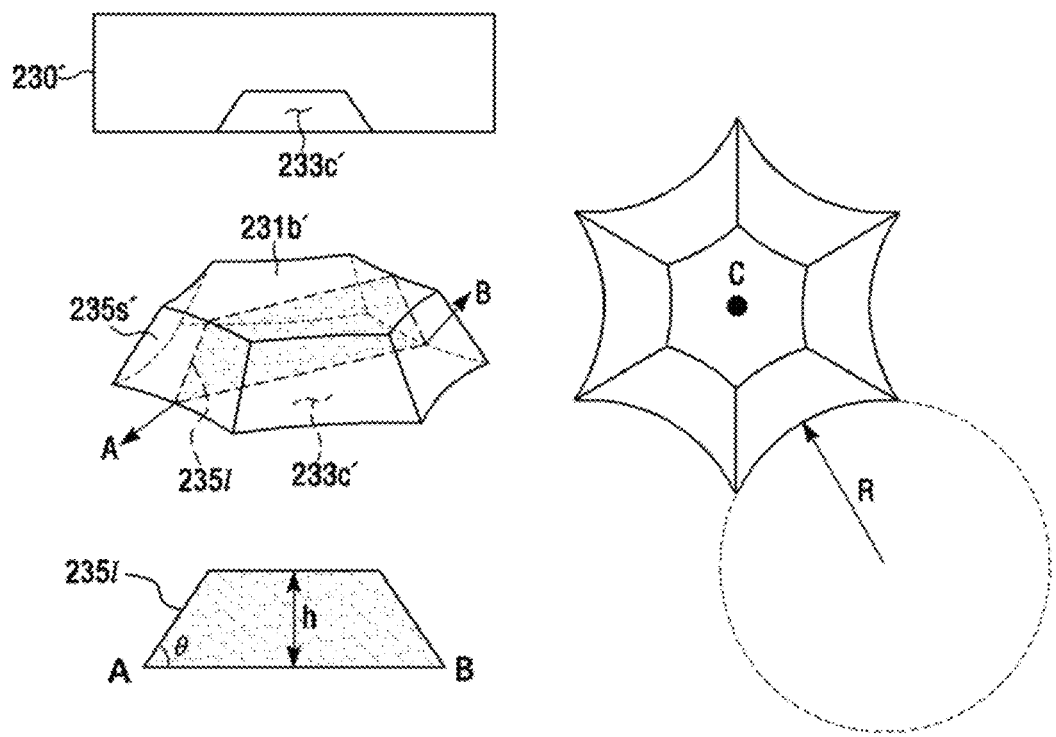
Fig. 13
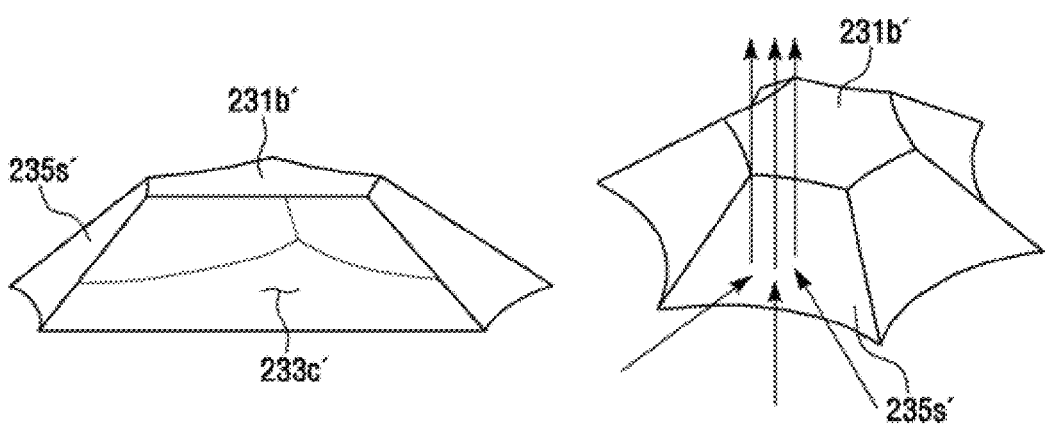
Fig. 14AFig. 14B

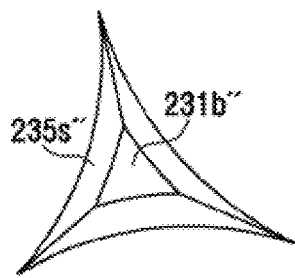 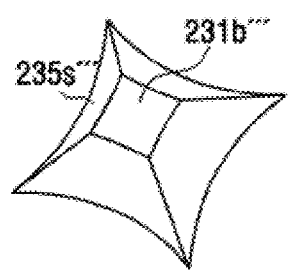 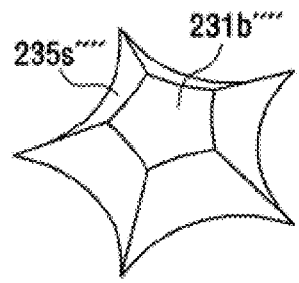
Fig. 15A  Fig. 15B  Fig. 15C
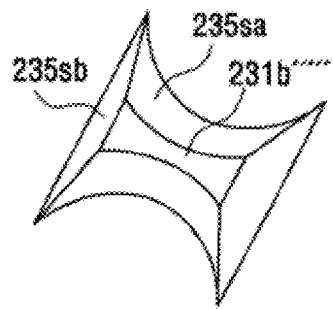 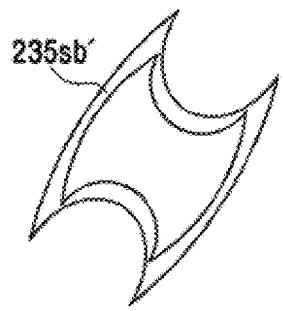
Fig. 15D  Fig. 15E
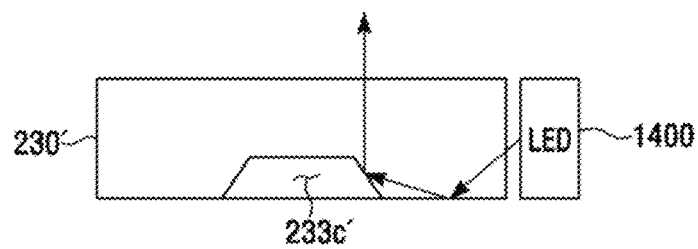
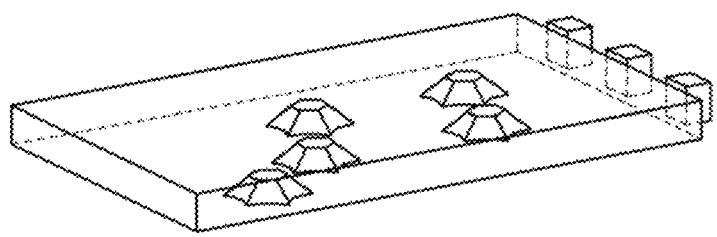
Fig. 16

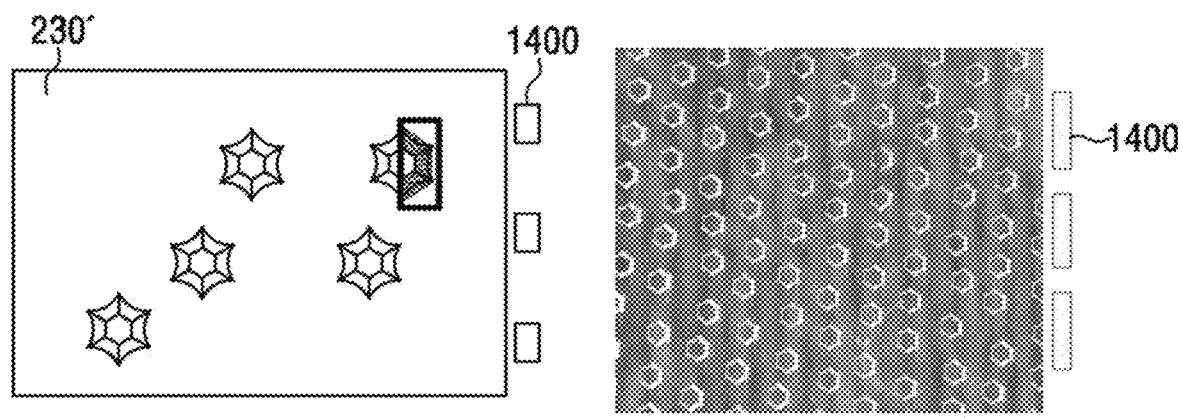
Fig. 17
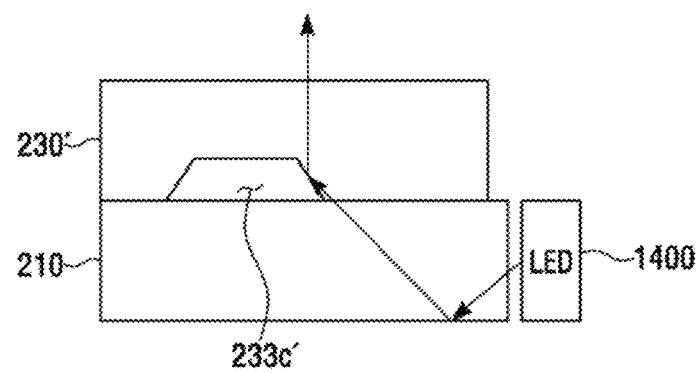
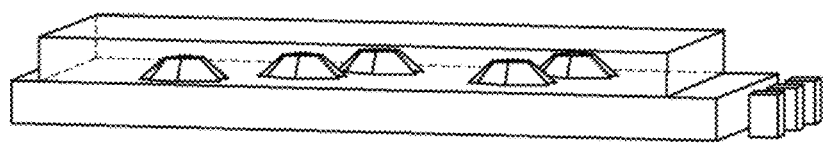
Fig. 18

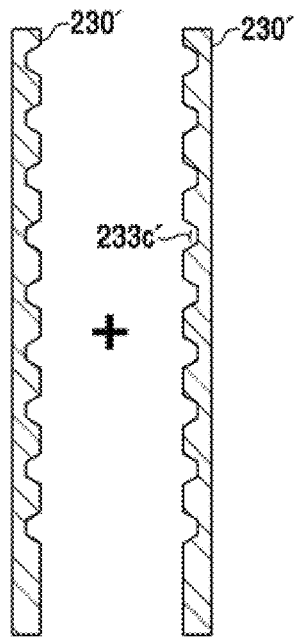
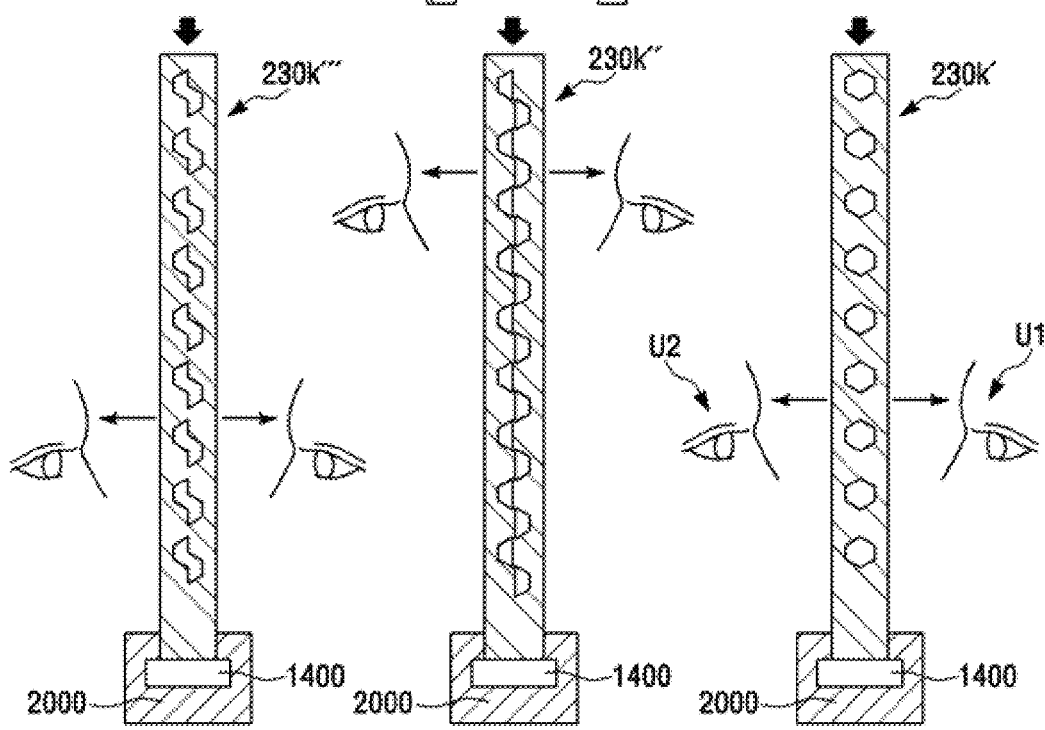
Fig. 35A
Fig. 35B  Fig. 35C  Fig. 35D

LIGHT EMITTING SHEET AND LIGHT UNIT INCLUDING THE SAME

CROSS-REFERENCE TO RELATED APPLICATIONS

This application is a Continuation Application of U.S. patent application Ser. No. 17/523,948, filed on Nov. 11, 2021, that claims priority to and the benefit of Korean Patent Applications No. 10-2020-0150007 filed in the Korean Intellectual Property Office on Nov. 11, 2020 and No. 10-2021-0017447 filed in the Korean Intellectual Property Office on Feb. 8, 2021, the entire contents of all of which are incorporated herein by reference.

TECHNICAL FIELD

The present invention relates to a light exiting member, a method of manufacturing the same, and a light unit comprising the same. More specifically, the present invention relates to a backlight unit of a liquid crystal display, a front light unit of a reflective display, interior lighting, living lighting, or light exiting member applicable to advertising lighting. The present invention provides a light exiting member capable of implementing a delicate and diverse specific image by selectively embedding or modifying a light exiting pattern, a method of manufacturing the same, and a light unit comprising the same.

BACKGROUND ART

The field of flat panel light guide plate technology is applied to front light sources that increase night vision of reflective displays such as backlight units, electronic paper, and RLCDs of liquid crystal displays.

FIG. 1 is a view illustrating a structure of a backlight unit having a conventional multilayer optical film structure.

Referring to FIG. 1, the light guide plate LGP serves to exit light incident from the side surface CCFL or LED to the upper portion of the plane. The light guide plate has a three-dimensional structure or a two-dimensional pattern formed on its surface. The diffusion sheet is used to remove dots by patterns on the light guide plate LGP. The prism sheet corrects the traveling direction of light emitted in an inclined state with respect to the vertical direction to obtain vertical light. In general, two sheets are used in the horizontal and vertical directions.

The conventional backlight unit illustrated in FIG. 1 has various problems such as an increase in the thickness of the entire system, an increase in manufacturing cost, and a decrease in light efficiency due to a multi-layered optical sheet. There are two cases for solving the problems of such a conventional backlight unit. Hereinafter, it will be described with reference to FIGS. 2 and 3.

FIGS. 2 and 3 are examples of a single sheet light guide plate employing conventional reverse slope structure, and relate to non-patent document 1 and non-patent document 2.

The single sheet light guide plate illustrated in FIGS. 2 and 3, for which a pattern structure having an inverted trapezoidal cross section is applied, exits light vertically only by the light guide plate itself. Such a self-vertical light exiting pattern structure does not require two horizontal and vertical prism sheets in the backlight unit. In addition, by applying a fine pattern to prevent the light guide plate pattern from being noticeable to the eyes, the need for a diffusion sheet is also eliminated. As a result, when a pattern structure having such an inverted trapezoidal cross section is applied, a backlight unit of a single sheet may be manufactured.

However, a problem with the technology of non-patent document 1 and non-patent document 2 is that in order to exit light vertically using only one optical sheet without a separate prism sheet, the pattern formed on the surface must have a reverse slope structure. Here, the reverse slope structure means that the upper part of the pattern is larger than the lower part of the pattern, and specifically, the angle formed by the outside of the sidewall of the pattern with the surface of the light guide plate is between 0 and 90 degrees. Since this reverse slope structure inevitably has a larger head than the neck, it is difficult and complicated to perform injection or casting by mold due to the nature of the industry where mass production is absolutely important.

FIG. 4 illustrates an example of a backlight unit to which a single sheet light guide plate employing a conventional buried air gap structure is applied, and relates to patent document 1.

The backlight unit illustrated in FIG. 4 may be manufactured to have a structure in which a reverse slope structure is buried in or on a surface of a light guide plate. Therefore, the efficiency could be further increased. However, there is a problem in that the structure for burying the air layer in the light guide plate is also not suitable for mass production.

FIGS. 5A-B illustrates a light guide plate and a light unit having a guard ring structure according to the prior art, and relates to patent document 2.

The problem with the light guide plate and the light unit having the conventional guard ring structure illustrated in FIGS. 5A-B is that when the guard ring 24a is separated from the light guide part 21 by an external force or itself, external foreign materials may entirely spread to the fine pattern portion 22.

In addition, in order to realize sufficient adhesion strength between the light guide part 21 and the guard ring 24a, as the width of the guard ring 24a increases, not only the overall size of the light guide plate 20 comprising the light guide part 21, the fine pattern portion 22, and the light exiting member 23 increases, but also aesthetics may be damaged when the light guide plate 20 is used alone as a front light.

In addition, the light exiting member 23 and the light guiding part 21 must be attached to each other to play a role. Therefore, there is a limit in reducing the thickness of the entire system, the process is complicated, and the manufacturing cost is increased.

FIGS. 6 to 8 are views for specifically explaining problems of a light guide plate and a light unit having a guard ring structure of the prior art illustrated in FIGS. 5A-B.

Referring to FIGS. 6 to 8, the light guide plate and the light unit having a guard ring structure of the prior art has following problems in the process of transferring and adhering the light guide member 23 and the light guide part 21.

1) Since the effective adhesive area between the light guide part 21 and the light exiting member 23 is small, the adhesive strength is weak.

2) During adhesion, pressure is applied by the laminator. In this process, unlike the ideal, there are many empty spaces between the fine pattern portions 22. Therefore, there is a problem in that the shape of the fine pattern portion 22 is deformed, and the light exiting member 23 collapses into the empty space between the fine pattern portions 22. Therefore, it is difficult to produce the optical characteristics intended in the design.

3) When the guard ring 24a is damaged, there is a problem in that external foreign substances may flow into the entire fine pattern portion 22 along the empty space.

FIG. 9 is an actual photograph of a conventional acrylic lighting device. To implement the conventional acrylic lighting device (also referred to as a patterning surface light source) illustrated in FIG. 9, a specific image is implemented by scratching or V-cutting on one surface of the light guide plate in the manner of laser marking method or mechanical marking method illustrated in FIG. 10. Otherwise, an image is realized by irradiating a laser onto one surface of the light guide plate in units of dots. Then, as illustrated in FIG. 9, light is diffusedly reflected only on the processed area to implement the image.

However, this conventional method has limitations in implementing delicate and precise images. In addition, there is a disadvantage in that the existing intaglio pattern-based light guide plate cannot be recycled.

In order to form an embossed or/and intaglio-shaped light exiting pattern on one surface of the conventional light guide plate, the following process was necessary.

1) A metal mold for a surface light source is prepared to brighten the entire area of the light guide plate by distributing the light exiting patterns evenly over the entire area.

2) a photomask or film mask designed according to the image to be implemented is prepared.

3) By using the photomask or film mask, a photosensitive film is selectively left directly on the metal mold by a semiconductor process (photolithography).

4) The light exiting pattern is transferred from the metal mold to one surface of the light guide plate.

The above 1) to 4) processes are somewhat complicated and inefficient in terms of manufacturing. In addition, whenever a specific image is implemented, there is a waste of cost because a photomask or film mask suitable for it must be separately manufactured. In addition, once the metal mold is patterned, the patterned metal mold does not become clean even when it is cleaned. Therefore, once the metal mold is patterned, the patterned metal mold can no longer be used.

SUMMARY OF THE INVENTION

An object to be achieved by the present invention is to provide a light exiting member capable of mass production, a method of manufacturing the same, and a light unit comprising the same.

The present invention also provides a light exiting member capable of improving mechanical stability and structural stability, a method of manufacturing the same, and a light unit comprising the same.

In addition, a light unit capable of exiting light in a substantially vertical direction using a single light exiting member is provided.

The present invention also provides a light unit capable of exiting light substantially in a vertical direction without a separate prism or brightness enhancement film (BEF).

The present invention also provides a light exiting member capable of implementing a fine and delicate image on the light exiting member, a method of manufacturing the same, and a light unit comprising the same.

In addition, the present invention provides a light exiting member capable of efficiently implementing a surface lighting device while recycling a light exiting member having a light exiting pattern such as an intaglio or embossed pattern, a method of manufacturing the same, and a light unit comprising the same.

In addition, the present invention provides a light exiting member capable of efficiently patterning by reducing cost and time consumption, a method of manufacturing the same, and a light unit comprising the same.

The light exiting member according to an embodiment of the present invention has a plurality of fine pattern portions formed on one surface. The fine pattern portion has a cavity. The cavity is defined by a lower surface located at a predetermined depth from an opening and a plurality of inner surfaces connected to the lower surface, the cavity has a width which becomes narrower from the opening toward the lower surface, and at least one of the inner surfaces is convex.

The light exiting member according to another embodiment of the present invention comprises: a base sheet, a plurality of fine pattern portions disposed under the base sheet, and a guard ring disposed under the base sheet and disposed between an edge of the base sheet and the plurality of fine pattern portions. The fine pattern portion has a cavity defined by a lower surface of the base sheet and a plurality of inner surfaces of the guard ring each of which is connected to each side of the lower surface, a width of the cavity becomes narrower from an opening toward the lower surface of the base sheet, and at least one of the inner surfaces is a curved surface convex toward the inside of the cavity.

The light unit according to an embodiment of the present invention comprises: a light source, and a light exiting member for exiting light upward from the light source. The light exiting member has a light exiting part having one surface and other surface. The light exiting part has a plurality of fine pattern portions formed on the one surface. The fine pattern portion has a cavity. The cavity is defined by a lower surface located at a predetermined depth from an opening and a plurality of inner surfaces each of which is connected to each side of the lower surface. The cavity has a width which becomes narrower from the opening toward the lower surface. At least one of the inner surfaces is a curved surface convex toward inside of the cavity.

The light unit according to another embodiment of the present invention comprises: a light source, and a light exiting member for exiting light upward from the light source. The light exiting member has a light exiting part having one surface and other surface. The light exiting part comprises: a base sheet; a plurality of fine pattern portions disposed under the base sheet, and a guard ring disposed under the base sheet and disposed between an edge of the base sheet and the plurality of fine pattern portions. The fine pattern portion has a cavity defined by a lower surface of the base sheet and inner surfaces of the guard ring each of which is connected to each side of the lower surface. A width of the cavity becomes narrower from an opening toward the lower surface of the base sheet, and at least one of the inner surfaces is a curved surface convex toward the inside of the cavity.

A method of manufacturing a light exiting member according to an embodiment of the present invention comprises: a selective patterning step of forming a resin layer on portions of the light exiting patterns formed on one surface of the light exiting part; and a resin formation step of forming a resin layer on the resin and remaining light exiting patterns. The resin has a refractive index capable of totally reflecting light incident on the light exiting part, and the resin layer has a refractive index relatively lower than that of the light exiting part.

A method of manufacturing a light exiting member according to another embodiment of the present invention comprises: a selective patterning step of forming a deformation pattern by applying heat to portions of the light exiting patterns formed on one surface of the light exiting part; and a resin layer formation step of forming a resin layer on the deformation pattern and remaining light exiting patterns. The resin layer has a refractive index relatively lower than that of the light exiting part.

The light exiting member according to an embodiment of the present invention comprises: a light exiting part having a light exiting pattern formed on one surface, a resin disposed on a portion of the light exiting pattern and for total reflection of light incident on the light exiting part; and a resin layer disposed on the resin and remaining light exiting patterns and having a refractive index relatively lower than that of the light exiting part.

The light exiting member according to another embodiment of the present invention comprises: a light exiting part having a light exiting pattern formed on one surface; and a resin layer disposed on the light exiting pattern and having a refractive index relatively lower than that of the light exiting part. At least a portion of the light exiting pattern is a deformation pattern deformed by heat.

The light unit according to an embodiment of the present invention comprises: a light source, and a light exiting member which receives light from the light source and exits light in only one direction. The light exiting member comprises: a light exiting part having one surface on which a light exiting pattern is formed and other surface on which the light is exited, a resin disposed on a portion of the light exiting pattern and for total reflection of light incident on the light exiting part; and a resin layer disposed on the resin and remaining light exiting patterns and having a refractive index relatively lower than that of the light exiting part.

A light unit according to another embodiment of the present invention comprises: a light source, and a light exiting member which receives light from the light source and exits light in only one direction. The light exiting member comprises: a light exiting part having one surface on which a light exiting pattern is formed and other surface on which the light is exited; and a resin layer disposed on the light exiting pattern and having a refractive index relatively lower than that of the light exiting part. At least a portion of the light exiting pattern is a deformation pattern deformed by heat.

By using the light emitting member, the manufacturing method thereof, and the light unit comprising the same according to embodiments of the present invention, there is an advantage in that mass production is possible. Furthermore, there is an advantage in that mass production is possible without using conventional methods (e.g., machining, laser processing, and inkjet methods) used to process conventional light guide plates.

In addition, there is an advantage of improving mechanical stability and structural stability. In particular, when the light exiting member is bonded with the light guide member and applied in a double sheet structure, the mechanical and structural stability of the fine pattern portion can be improved by providing a guard ring to each fine pattern portion.

In addition, there is an advantage of exiting light in a vertical direction without a separate prism or bright enhancement sheet BEF.

In addition, by excluding a reverse slope structure commonly used for vertical light and employing a forward slope structure and an embossed mold capable of easily injection molding from molds or stamps to vertically exit light with high efficiency, an ultra-thin light unit capable of mass production without adhesion between sheets can be provided.

In addition, there is an advantage that light emission in both directions as well as one direction is possible.

In addition, there is an advantage of improving unidirectional light emission luminance.

In addition, there is an advantage in that it is easy to accommodate an subject.

In addition, there is an advantage in that lighting is possible not only for various subjects, for example, non-transmissive subjects but also for transmissive subjects.

In addition, there is an advantage of implementing a fine and delicate image on the light exiting member.

In addition, there is an advantage in that a surface lighting device may be easily and efficiently implemented while recycling a light exiting member having a light exiting pattern such as an intaglio or embossed pattern.

In addition, there is an advantage in that patterning may be efficiently performed by reducing cost and time consumption.

BRIEF DESCRIPTION OF THE DRAWINGS

FIG. 13 is a diagram for describing in detail the light exiting member 230' according to another the embodiment of the present invention.

FIGS. 14A and 14B are diagrams for describing in detail the light exiting member 230' according to the embodiment of the present invention described with respect to FIG. 13.

FIGS. 15A-E are diagrams illustrating various modified examples of the light exiting member 230' according to another embodiment of the present invention illustrated in FIGS. 14A and 14B.

FIG. 16 is a diagram illustrating a light unit comprising the light exiting member 230' illustrated in FIG. 13.

FIG. 17 is a diagram and a photograph showing light exiting characteristics of the light unit illustrated in FIG. 16.

FIG. 18 is a diagram illustrating a light unit comprising the light exiting member 230' illustrated in FIG. 13.

FIGS. 35A-D are diagrams illustrating a light unit according to a twelfth embodiment of the present invention.

DETAILED DESCRIPTION

Figure 1:
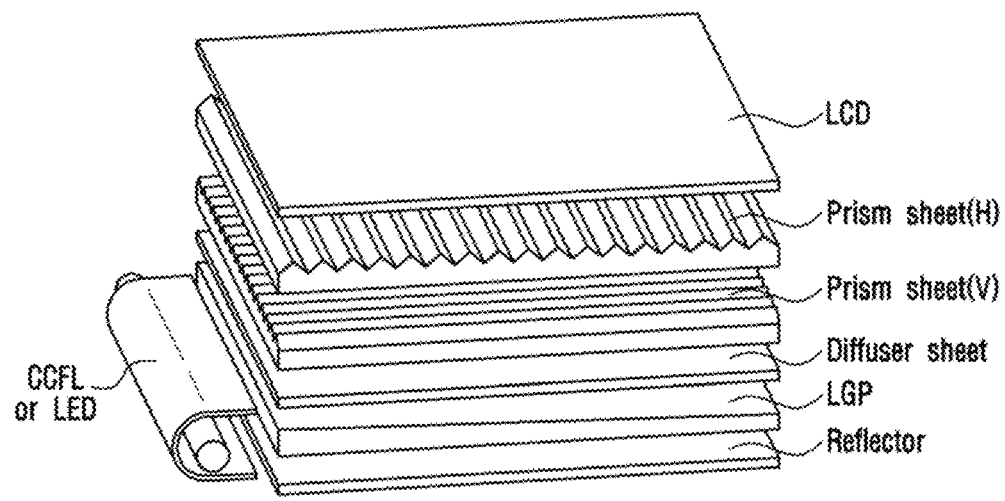
FIG. 1 is a view illustrating a structure of a backlight unit having a conventional multilayer optical film structure.
Figure 2:
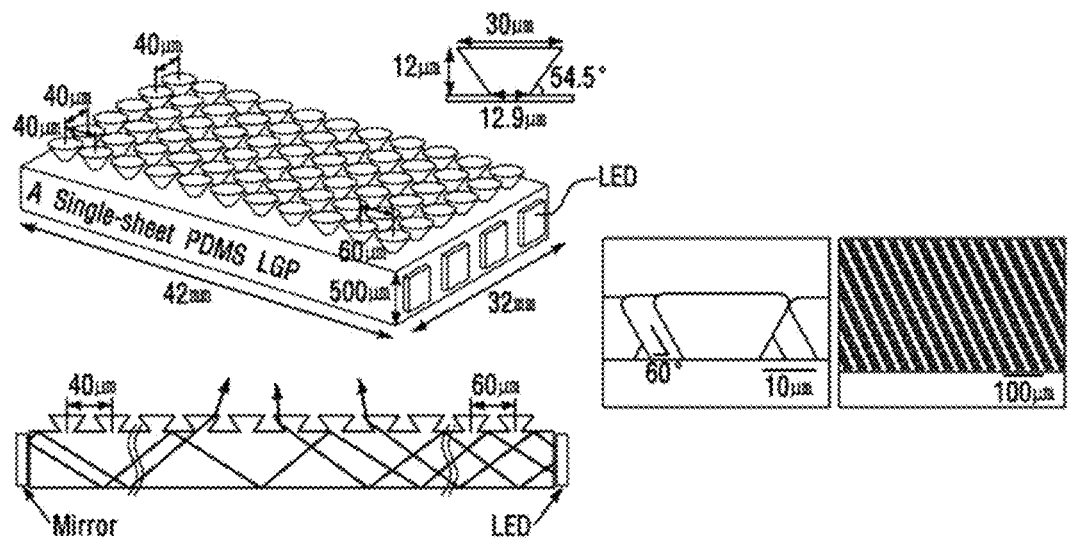
FIGS. 2 and 3 are examples of a single sheet light guide plate employing a conventional reverse slope structure.
Figure 3:
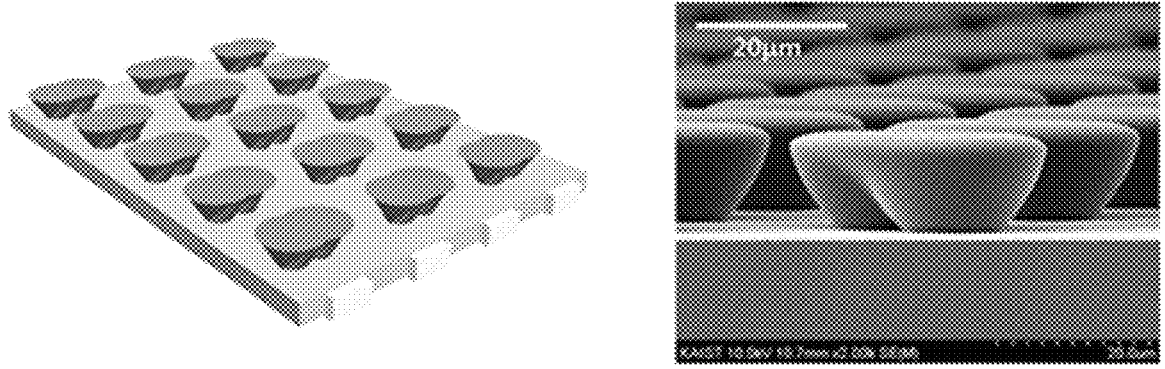
Figure 4:
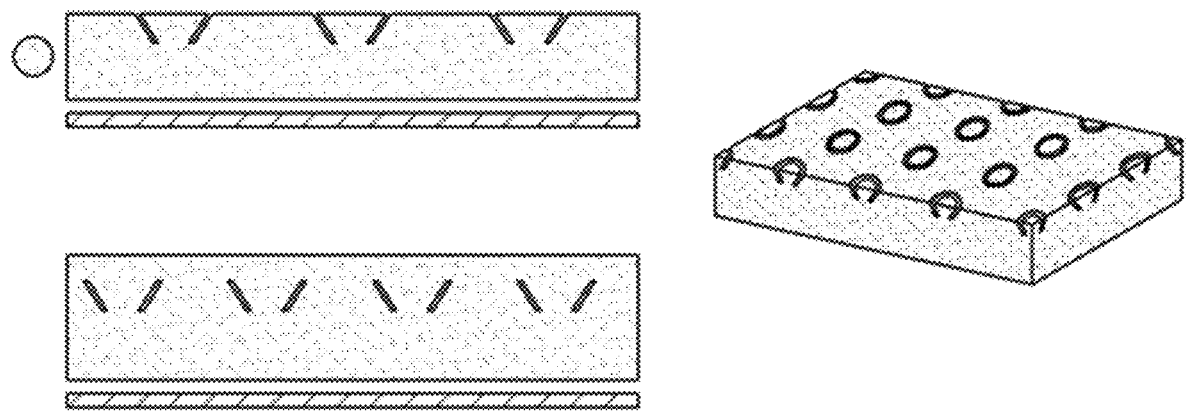
FIG. 4 illustrates an example of a backlight unit to which a single sheet light guide plate employing a conventional buried air gap structure is applied.
Figure 5A:
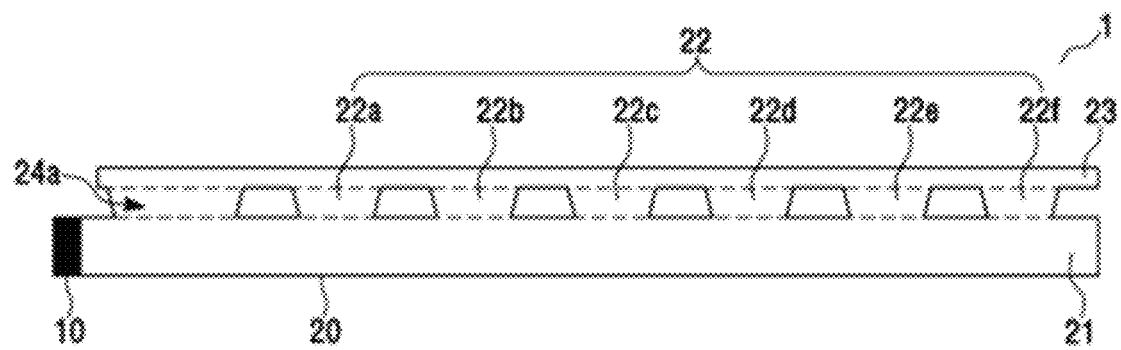
FIGS. 5A-B illustrates a light guide plate and a light unit having a conventional guard ring structure.
Figure 5B:
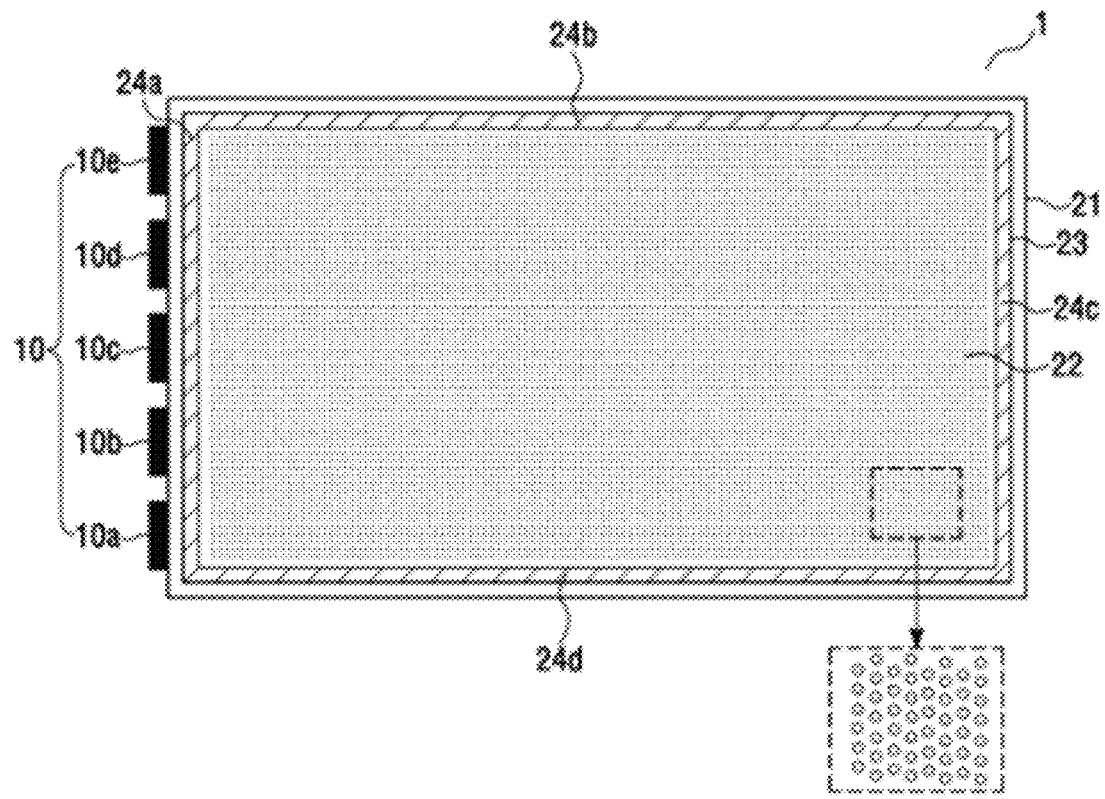
Figure 6:
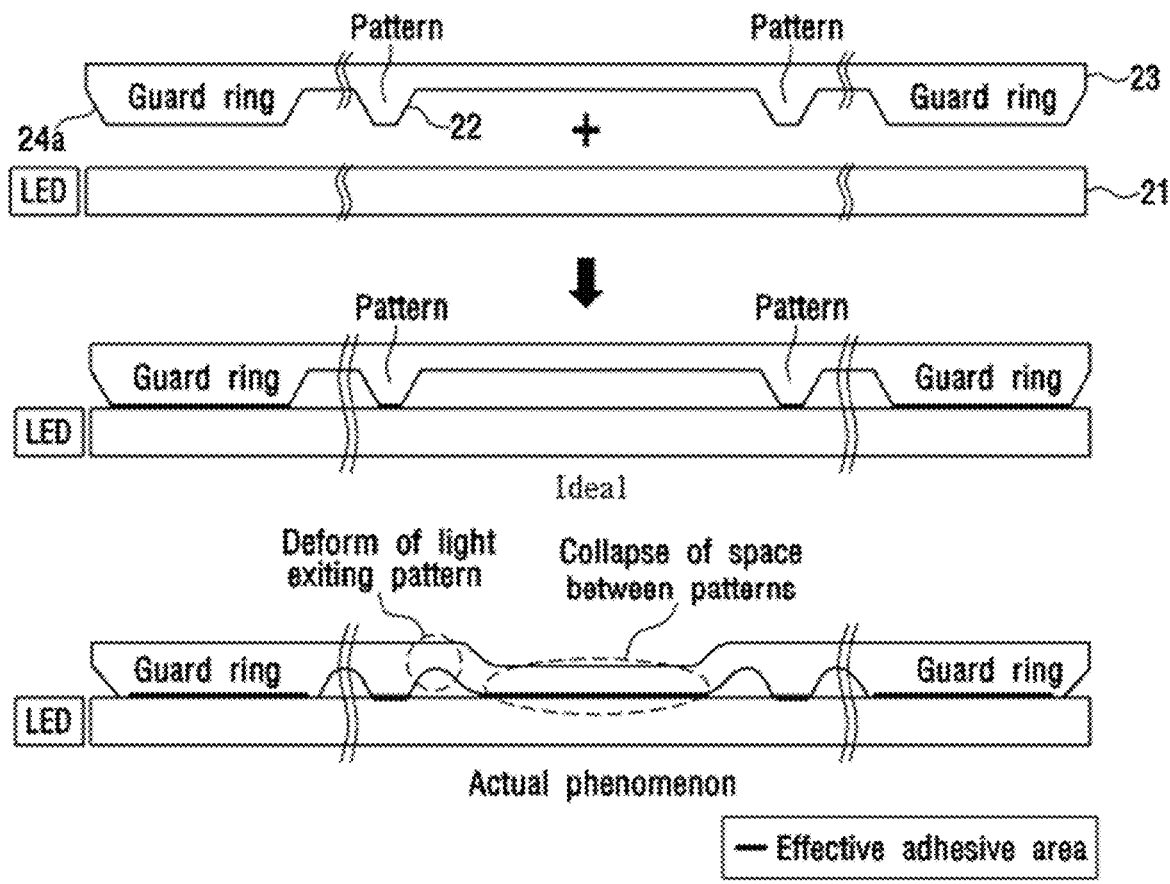
FIGS. 6 to 8 are views for specifically explaining problems of a light guide plate and a light unit having a guard ring structure of the prior art illustrated in FIGS. 5A-B.
Figure 7:
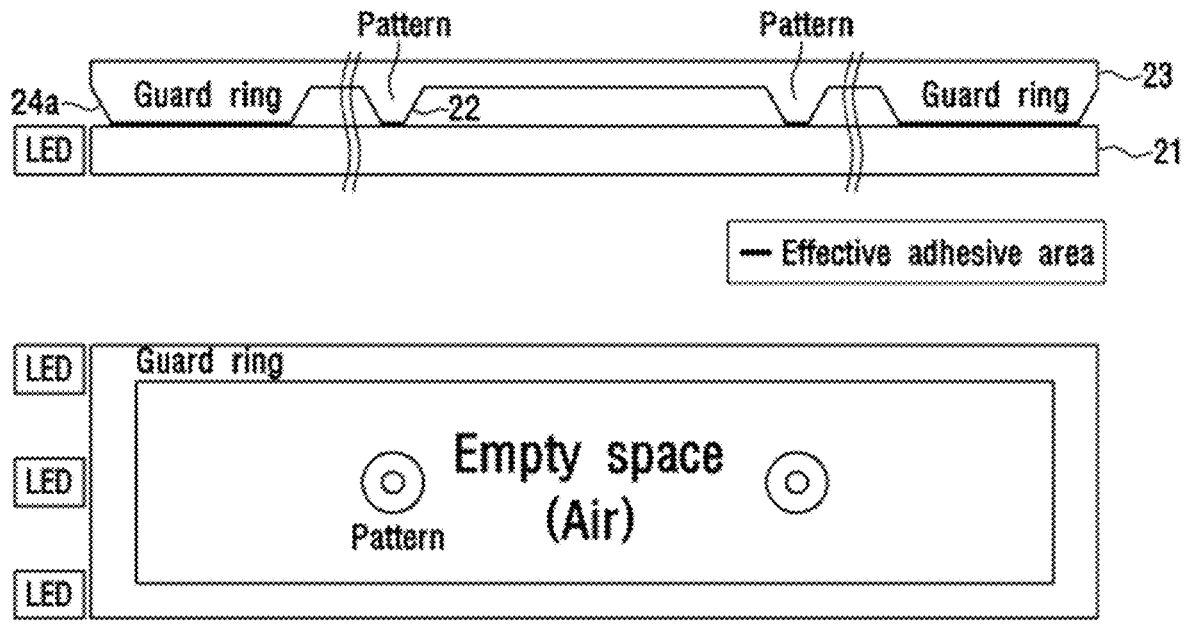
Figure 8:
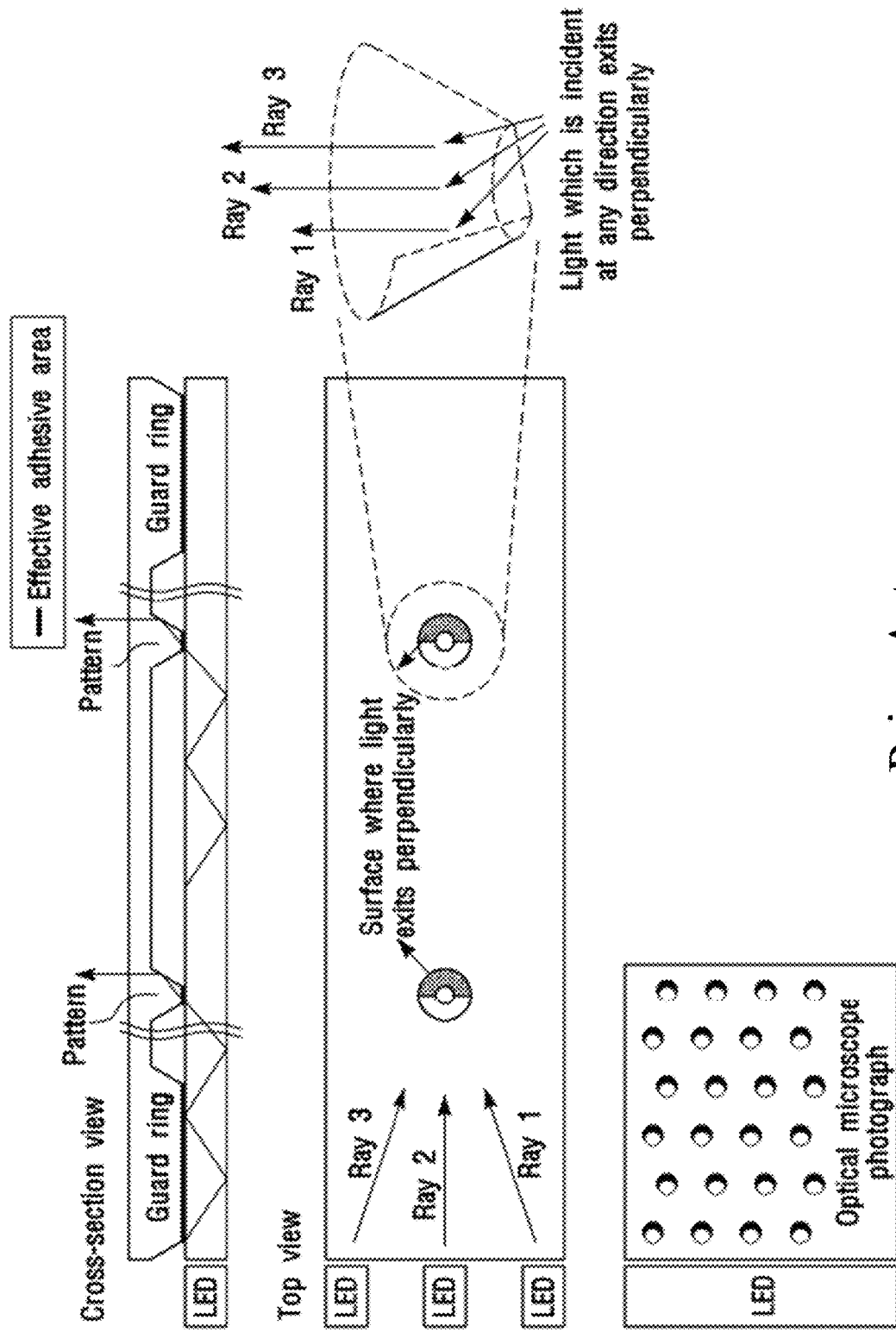

The detailed description of the present invention, which will be described later, is referred to the accompanying drawings illustrating a specific embodiment in which the present invention may be implemented as an example. These embodiments are described in detail sufficiently so that those skilled in the art may implement the present invention. It should be understood that various embodiments of the present invention are different from each other, but need not be mutually exclusive. For example, specific shapes, structures, and characteristics described herein may be implemented in other embodiments without departing from the spirit and scope of the present invention in relation to one embodiment. In addition, it should be understood that the location or arrangement of individual components within each disclosed embodiment may be changed without departing from the spirit and scope of the present invention. Therefore, the detailed description to be described below is not limited in meaning, and the scope of the present invention is limited only by the appended claims as well as all scopes equivalent to those claimed in the claims, if appropriate. In the drawings, similar reference numerals refer to the same or similar functions across several aspects.

Figure 11:
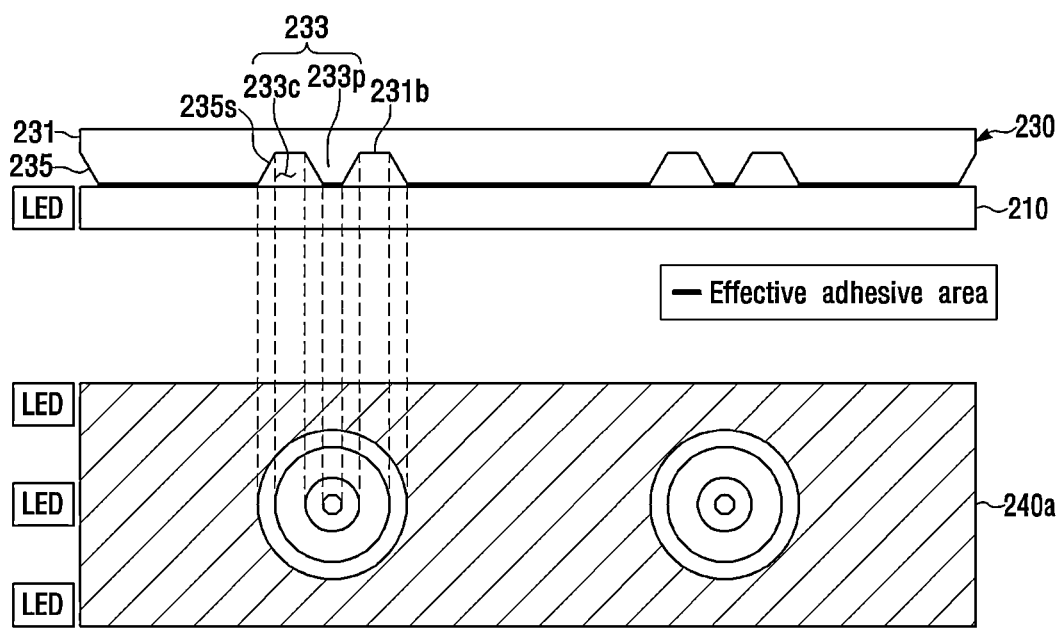
FIG. 11 is a schematic cross-sectional view and a front view of a light unit comprising a light exiting member according to an embodiment of the present invention.
Figure 12:
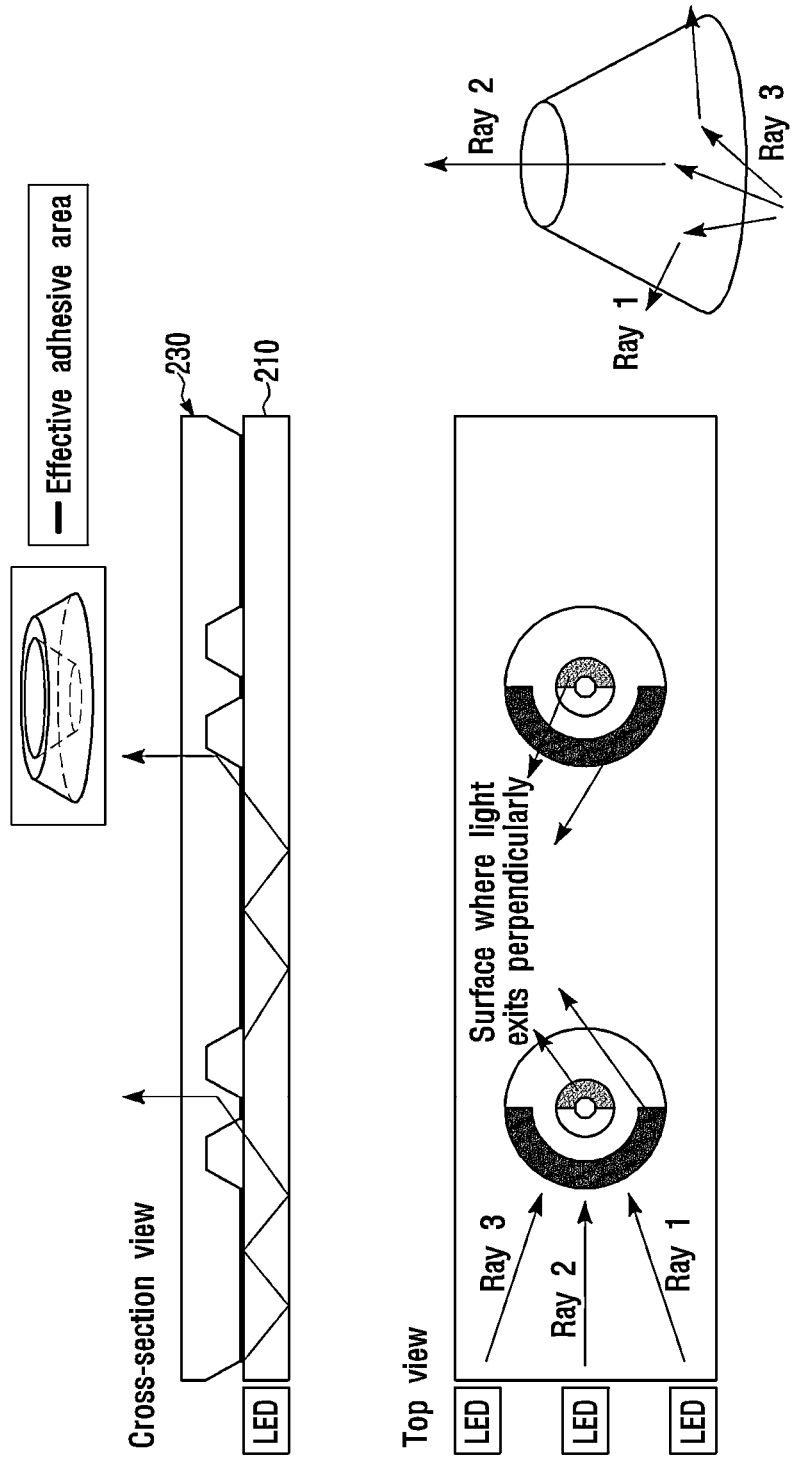
FIG. 12 is a diagram for explaining light exiting characteristics of a light unit comprising the light exiting member 230 according to an embodiment of the present invention illustrated in FIG. 11.

FIG. 11 is a schematic cross-sectional view and a front view of a light unit comprising a light exiting member according to an embodiment of the present invention, and FIG. 12 is a diagram for explaining light exiting characteristics of the light unit comprising the light exiting member according to an embodiment of the present invention illustrated in FIG. 11.

Referring to FIG. 11, a light unit according to an embodiment of the present invention comprises a light exiting member 230, a light guide member 210, and one or a plurality of light sources located at one side part of the light guide member 210.

The light exiting member 230 is disposed on the upper surface of the light guide member 210, and the light exiting member 230 is adhered to the light guide member 210. Accordingly, a predetermined adhesive effective area is formed between the light exiting member 230 and the light guide member 210.

As examples of the adhesive between the light exiting member 230 and the light guide member 210, pressure sensitive adhesive (PSA), optically clear adhesive (OCA), optically clear adhesive (OCR), UV adhesive, oligomer, primer, silane coupling agents, silica-organic hybrid resins, aqueous vinyl acetate resin emulsion adhesives, etc. may be used.

A low refractive index material lower than the optical refractive index of the light exiting member 230 and the light guide member 210 may be disposed between the light exiting member 230 and the light guide member 210. The low refractive index materials comprise air, liquid, and other transparent plastic materials.

The light guide member 210 and the light exiting member 230 are made of a transparent material. As an transparent material, PMMA(Polymethylmethacrylate), SMMA(Styrenemethyl Methacrylate), COC(Cyclic olefin copolymer), AryLite, Polycarbonate, PET(Polyethyleneterephtalate), PI(Polyimide), PE(Polyethylene), PES(Polyethersulfone), PO(Polyolefin), PVA(Polyvinylalcohol), PVC(Polyvinylchloride), TAC(Triacetylcellulose), PS(Polystyrene), PP(Polypropylene), ABS(Acrylonitrile Butadiene Styrene), SAN/AS(Styrene Acrylonitrile), PEN(Polyethylene Naphthalate), PTT(Polytrimethylene Terephthalate), PU(Polyurethane), PUA(Polyurethane Acrylate), TPU(Thermoplastic Polyurethane), PAR(Polyarylate), Silicone, PDMS(Polydimethylsiloxane) may be comprised. Here, the light guide member 210 and the light exiting member 230 may be made of the same material or different materials.

The light exiting member 230 may be made of a rigid or flexible material. The light guide member 210 may also be made of a rigid or flexible material.

The light exiting member 230 may exit light incident on one side surface thereof. Here, the light exiting member 230 may emit incident light in one direction rather than in two directions (upper and lower directions). The light exiting member 230 may exit light incident on the light exiting member 230 in one direction by patterns arranged thereon.

The light exiting member 230 may comprise a base sheet 231, a plurality of fine pattern portions 233, and a guard ring 235. Here, the base sheet 231, the plurality of fine pattern portions 233, and the guard ring 235 may be integrally formed to form a single light exiting member 230.

The base sheet 231 comprises an upper surface and a lower surface 231b. The plurality of fine pattern portions 233 and the guard ring 235 may be disposed on the lower surface 231b of the base sheet 231.

The fine pattern portions 233 may be formed in plural under the base sheet 231. The fine pattern portion 233 may comprise a cavity 233c and a protruding pattern 233p disposed in the cavity 233c. The protruding pattern 233p may protrude upward from the lower surface 231b of the base sheet 231. The protruding pattern 233p may improve light output characteristics, and may support the base sheet 231 positioned on the light guide member 210 to improve mechanical stability of the base sheet 231.

The cavity 233c may be an intaglio pattern having a predetermined shape formed on the lower surface of the light exiting member 230. The cavity 233c may be an empty space having a conical shape that has a predetermined depth from the lower surface of the light exiting member 230 and decreases in diameter as the depth increases. The planar shape of the cavity 233c may be a circular, polygonal, or other irregular closed curve. Since the cavity 233c is formed in the light exiting member 230 in an intaglio shape, there is an advantage that the light exiting member 230 may be in close contact with the light guide member 210.

The cavity 233c may be defined by an inner surface 235s of the guard ring 235, the lower surface 231b of the base sheet 231, and the protruding pattern 233p.

The guard ring 235 is disposed between the plurality of fine pattern portions 233 as well as at an edge of the lower surface of the light exiting member 230. The lower surface of the guard ring 235 may be adhered to the light guide member 210.

The inner surface 235s of the guard ring 235 has a shape corresponding to the side surface of the cone.

The cross-section of the inner surface 235s of the guard ring 235 may form an obtuse angle with the lower surface 231b of the base sheet 231, and the lower surface 231b of the base sheet 231 may form an obtuse angle with the inclined surface of the protruding pattern 233p.

Since the guard ring 235 is disposed between the plurality of fine pattern portions 233, when the light exiting member 230 and the light guide member 210 are press-bonded, an effective adhesive area between the light exiting member 230 and the light guide member 210 may be increased to prevent collapse of the light exiting member 230. In addition, the adhesion strength between the light exiting member 230 and the light guide member 210 may be improved to individually protect the plurality of fine pattern portions 233 from external foreign substances. Here, since the guard ring 235 may individually protect each fine pattern portion 233, it may also be referred to as an Individual Guard ring (IG).

Hereinafter, light exiting characteristics of the light exiting member 230 illustrated in FIG. 11 will be described with reference to FIG. 12.

As illustrated in FIG. 12, when the light guide member 210 receives light from light sources LEDs arranged in a row on one side part of the light guide member 210, some of the light traveling in the light guide member 210 (Ray 1, Ray 2, Ray 3) is reflected from a portion of the inner surface 235s (a surface from which light is exited) and exited to the outside through the light exiting member 230. In this case, all of the light incident on the portion of the inner surface 235s (a surface from which light is exited) of the guard ring 235 is not reflected in a direction substantially perpendicular to the light exiting member 230. Specifically, the Ray 2 vertically incident from the light source LED is reflected on a portion of the inner surface 235s of the guard ring 235s and is output in a direction substantially perpendicular to the light exiting member 230, but the Ray 1 and Ray 3 incident in an oblique direction are emitted while forming an acute (or low angle) with the light exiting member 230. This is due to the fact that the portion of the inner surface 235s (a surface from which light is exited) of the guard ring 235 is convexly formed toward the light source LED.

In this way, in order to reflect light emitted at a low angle (Ray 1 and Ray 3) in a direction substantially perpendicular to the light exiting member 230 as much as possible, the light exiting member 230 preferably has a shape different from that of the cavity 233c illustrated in FIG. 12. A light exiting member and a light unit comprising the same according to another embodiment of the present invention will be described in detail with reference to FIGS. 13 to 16.

FIGS. 13, 14A, and 14B are diagrams for describing in detail the light exiting member 230' according to another embodiment of the present invention.

Referring to FIGS. 13, 14A, and 14B, a light exiting member 230' according to another embodiment of the present invention has a cavity 233c' having an intaglio pattern. Here, the cavity 233c' may be referred to as a fine pattern portion, and a plurality of cavities 233c' may be formed on the lower surface of the light exiting member 230'.

The cavity 233c' has a predetermined depth h from the lower surface of the light exiting member 230'. The cavity 233c' may also be referred to as a groove. Here, the depth h may be equal to or larger than 1 μm and equal to or smaller than 100 μm.

The cavity 233c' has a width of a cross section which becomes narrower as the depth h increases (here, the cross section is a virtual surface that vertically cuts the light exiting member while passing through the central axis C of the cavity 233c'). Here, the cross section of the cavity 233c' may have a trapezoidal shape, and the angle θ between the lower side and the lateral side of the trapezoidal cross section may be larger than 0° and smaller than 90°. On the other hand, although not illustrated in a separate drawing, the lateral side of the trapezoidal cross-section may be a curve, not a straight line, and the lateral side may be a curve having a predetermined radius of curvature toward inside of the trapezoidal cross-section.

The cavity 233c' may be defined by a lower surface located at a predetermined depth from an opening and inner surfaces each of which is connected to each side constituting the lower surface. The cavity 233c' has a width which becomes narrower from the opening toward the lower surface. Here, the inner surfaces of the light exiting member 230' may be three or more, each side of the lower surface may be a curved line convex toward inside of the cavity 233c', and at least one of the inner surfaces may be a curved surface convex toward inside of the cavity 233c'. Here, each side of the lower surface and the inner surface which is a curved surface, may have a predetermined radius of curvature, and the curvature of each side of the lower surface and the radius of curvature (R) of the inner surface may be the same or different. The planar shape of the cavity 233c' may be a polygonal closed curve formed of curves having a radius of curvature R in the range of 100 nm to 1 mm.

Here, when the light exiting member 230' comprises a base sheet and a guard ring disposed under the base sheet as illustrated in FIG. 11, the cavity 233c' may be defined by a lower surface 231b' of the base sheet and a plurality of inner surfaces 235s' of the guard ring each of which is connected to each side of the lower surface 231b'. At least one inner surface 235 s' includes at least one straight line 2351.

Referring to FIGS. 14A and 14B, since the light exiting member (230') according to another embodiment of the present invention has a cavity 233c' with an intaglio pattern, light incident at various angles from a plurality of light sources may be reflected in a direction substantially perpendicular to the light exiting member 230'. Accordingly, the light exiting member 230' illustrated in FIG. 13 has an advantage in that light exiting characteristics are improved compared to those of the light exiting member 230' illustrated in FIG. 11.

FIGS. 15A-E are diagrams illustrating various modified examples of the light exiting member 230' according to another embodiment of the present invention illustrated in FIGS. 14A and 14B.

Referring to FIGS. 15A-E, a cavity according to a first modified example is defined by a lower surface 231b'' having three sides and three inner surfaces 235s''. The cavity according to the second modified example is defined by a lower surface 231b''' having four sides and four inner surfaces 235s'''. The cavity according to the third modified example is defined by a lower surface 231b'''' having five sides and five inner surfaces 235s''''. The cavity according to the fourth modified example is defined by a lower surface 231b''''' having four sides among which two sides facing each other are curved and the other two sides are straight lines, two curved first inner surfaces 235sa, and two flat second inner surfaces 235sb. The cavity according to the fifth modified example has curved second inner surfaces 235sb' which are curved surface convex outward, when compared to the cavity according to the fourth modified example.

As illustrated in FIGS. 14A, 14B, and 15, the cavity of the light exiting member 230' according to another embodiment of the present invention has a predetermined depth from the opening to the lower surface, and the width of the cavity becomes narrower as the depth increases. In addition, the cavity may be defined by a lower surface and inner surfaces connected to the lower surface, the inner surface may be defined by a curved surface convex toward inside of the cavity, and each side of the lower surface may also be defined by curved line convex toward inside of the cavity. Here, the number of inner surfaces may be determined according to the number of sides of the lower surface, and may be at least three or more. In addition, a portion of the inner surfaces may be curved, and the rest may be flat. In addition, all of the inner surfaces may be curved. The light exiting member 230' according to another embodiment of the present invention may reflect light incident from a plurality of light sources at various angles in a direction substantially perpendicular to the light exiting member 230', thereby improving light exiting characteristics.

FIG. 16 is a diagram illustrating a light unit comprising the light exiting member 230' illustrated in FIG. 13, and FIG. 17 is a diagram and a photograph showing actual light exiting characteristics of the light unit illustrated in FIG. 16.

Referring to FIG. 16, a light unit according to an embodiment of the present invention comprises a light source 1400 and a light exiting member 230' illustrated in FIG. 13.

One or a plurality of light sources 1400 may be located at one side part of the light exiting member 230. The light source 1400 may be an LED, but is not limited thereto, and may be CCFL illustrated in FIG. 1.

The light unit according to an embodiment of the present invention illustrated in FIG. 16 may comprise only a light source 1400 and one light exiting member 230'.

As illustrated in FIG. 17, the light unit in accordance with an embodiment of the present invention could obtain a predetermined light exiting characteristic using a single light exiting member 230'. In particular, it was confirmed that light exiting characteristics similar to those of the light unit according to another embodiment of the present invention illustrated in FIG. 18 to be described later could be obtained. Accordingly, the light unit illustrated in FIG. 16 has an advantage of further reducing the thickness compared to the light unit illustrated in FIG. 18.

FIG. 18 is a diagram illustrating a light unit comprising the light exiting member 230' illustrated in FIG. 13.

Referring to FIG. 18, a light unit according to another embodiment of the present invention comprises a light source 1400, a light guide member 210, and a light exiting member 230' illustrated in FIG. 13.

The light unit according to another embodiment of the present invention illustrated in FIG. 18 further comprises a light guide member 210 compared to the light unit according to the embodiment of the present invention illustrated in FIG. 16. One or a plurality of light sources 1400 are located at one side part of the light guide member 210, and the light exiting member 230' illustrated in FIG. 13 is disposed on the light guide member 210.

A light unit according to another embodiment of the present invention illustrated in FIG. 18 may obtain light exiting characteristics similar to those of the light unit according to the embodiment of the present invention illustrated in FIG. 16.

Figure 19:
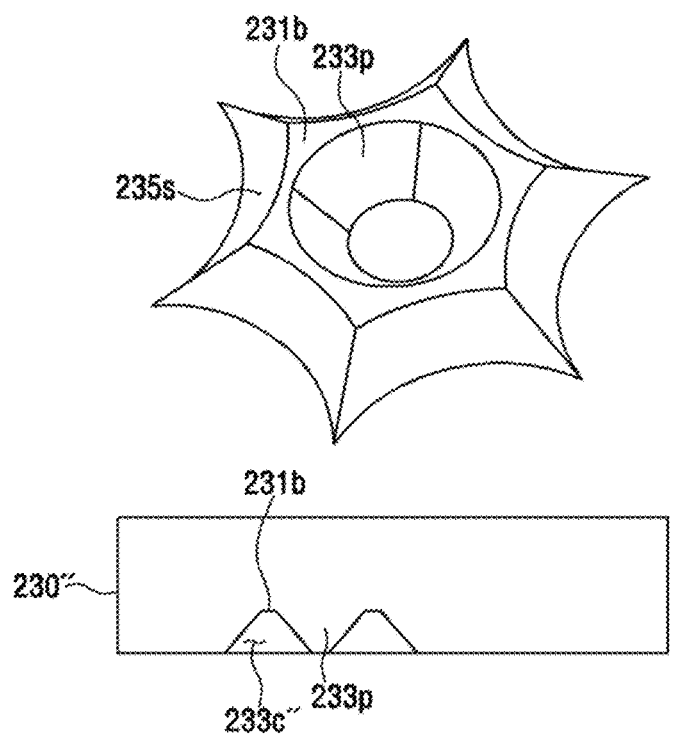
FIG. 19 is a diagram illustrating a light exiting member 230" according to another embodiment of the present invention.

FIG. 19 is a diagram illustrating a light exiting member 230'' according to another embodiment of the present invention.

Referring to FIG. 19, the light exiting member 230'' has a cavity 233c'' and comprises a protruding pattern 233p disposed in the cavity 233c''. Here, in the light exiting member 230'' of FIG. 19, the cavity 233c'' and the protruding pattern 233p may be referred to as fine pattern portions.

The protruding pattern 233p may be disposed in the cavity 233c'' and protrude from the lower surface toward the opening of the cavity 233c''. For example, the protruding pattern 233p may have a truncated cone shape whose diameter increases upward from the lower surface of the cavity 233c''.

Since the light exiting member 230'' illustrated in FIG. 19 further comprises a protruding pattern 233p compared to the light exiting member 230' illustrated in FIG. 13, light exiting characteristics may be further improved. Hereinafter, it will be described in detail with reference to FIGS. 20 and 21.

Figure 20:
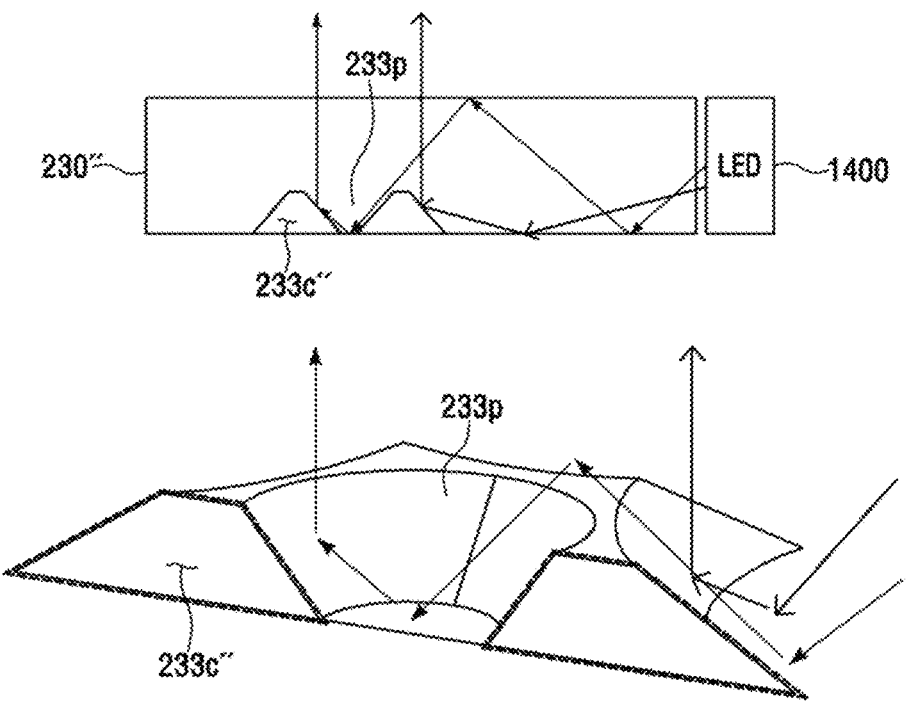
FIG. 20 is a diagram for explaining a light unit and light exiting characteristics of the light unit according to an embodiment comprising the light exiting member 230' illustrated in FIG. 19.

FIG. 20 is a diagram for explaining a light unit and light exiting characteristics of the light unit according to an embodiment comprising the light exiting member 230" illustrated in FIG. 19.

Referring to FIG. 20, a light unit according to an embodiment of the present invention comprises a light exiting member 230" and a light source 1400 located at one side part of the light exiting member 230".

The light exiting member 230" has a cavity 233c" formed on a lower surface thereof and comprises a protruding pattern 233p disposed in the cavity 233c".

The cavity 233c" may be defined by a lower surface and a plurality of inner surfaces connected to the lower surface. The lower surface is disposed at a predetermined depth from the opening. The inner surface may be a curved surface having a predetermined curvature convex into the cavity 233c". The number of inner surfaces may be at least two. Some of the inner surfaces may be curved, and the rest may be flat. In addition, all of the inner surfaces may be curved.

The light exiting member 230' may receive light from the light source 1400, a portion of the received light may be reflected on an inner surface defining the cavity 233c', and a portion of the received light may be reflected on the protruding pattern 233p to be reflected upwardly on the light exiting member 230". The reflected light may be exited in a direction substantially perpendicular to the light exiting member 230".

Compared with the light unit illustrated in FIG. 16, since the light unit illustrated in FIG. 20 further comprises a protruding pattern 233p, there is an advantage in that the light exiting characteristics are further improved. Furthermore, since the protruding pattern 233p supports the light exiting member 230", mechanical stability of the light exiting member 230" may be improved.

Figure 21:
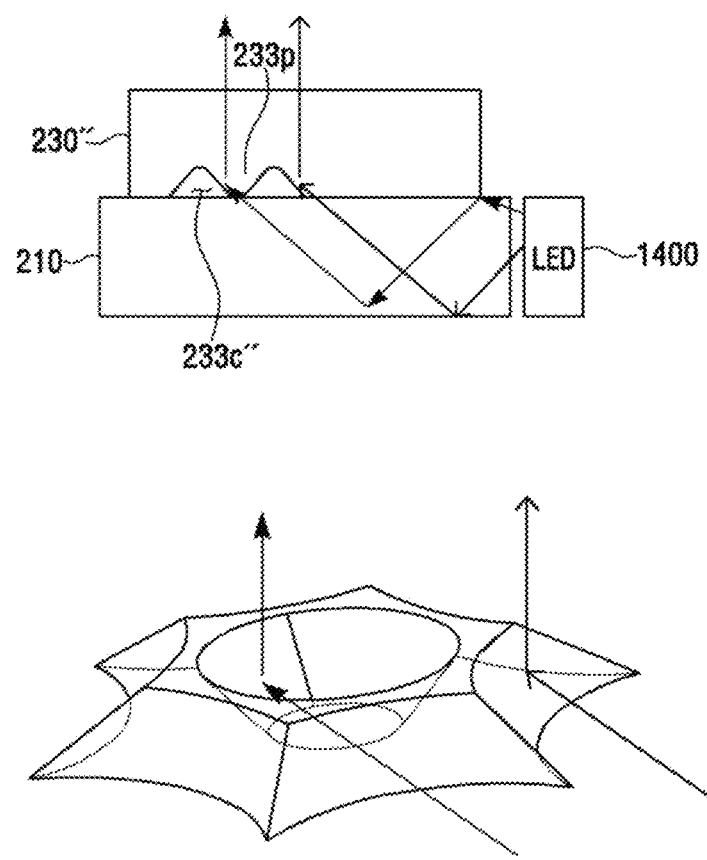
FIG. 21 is a diagram for explaining a light unit and light exiting characteristics of the light unit according to another embodiment of the light exiting member 230' illustrated in FIG. 19.

FIG. 21 is a diagram for explaining light exiting characteristics of a light unit according to another embodiment comprising the light exiting member 230' illustrated in FIG. 19.

Referring to FIG. 21, a light unit according to another embodiment of the present invention comprises a light guide member 210, a light exiting member 230' disposed on the light guide member 210, and a light source 1400 located at one side part of the light guide member 210. As described in FIG. 20, the light exiting member 230" has a cavity 233c" formed on a lower surface thereof and comprises a protruding pattern 233p disposed in the cavity 233c".

The light unit illustrated in FIG. 21 may exit light using two members. The light exiting member 230" of the light unit of FIG. 21 receives light from the light guide member 210, and a portion of the received light is reflected on the inner surface defining the cavity 233c" to be reflected upwardly on the light exiting member 230", and a portion of the received light is reflected on the protruding pattern 233p to be reflected upwardly on the light exiting member 230". The reflected light may be exited in a direction substantially perpendicular to the light exiting member 230".

Figure 22:
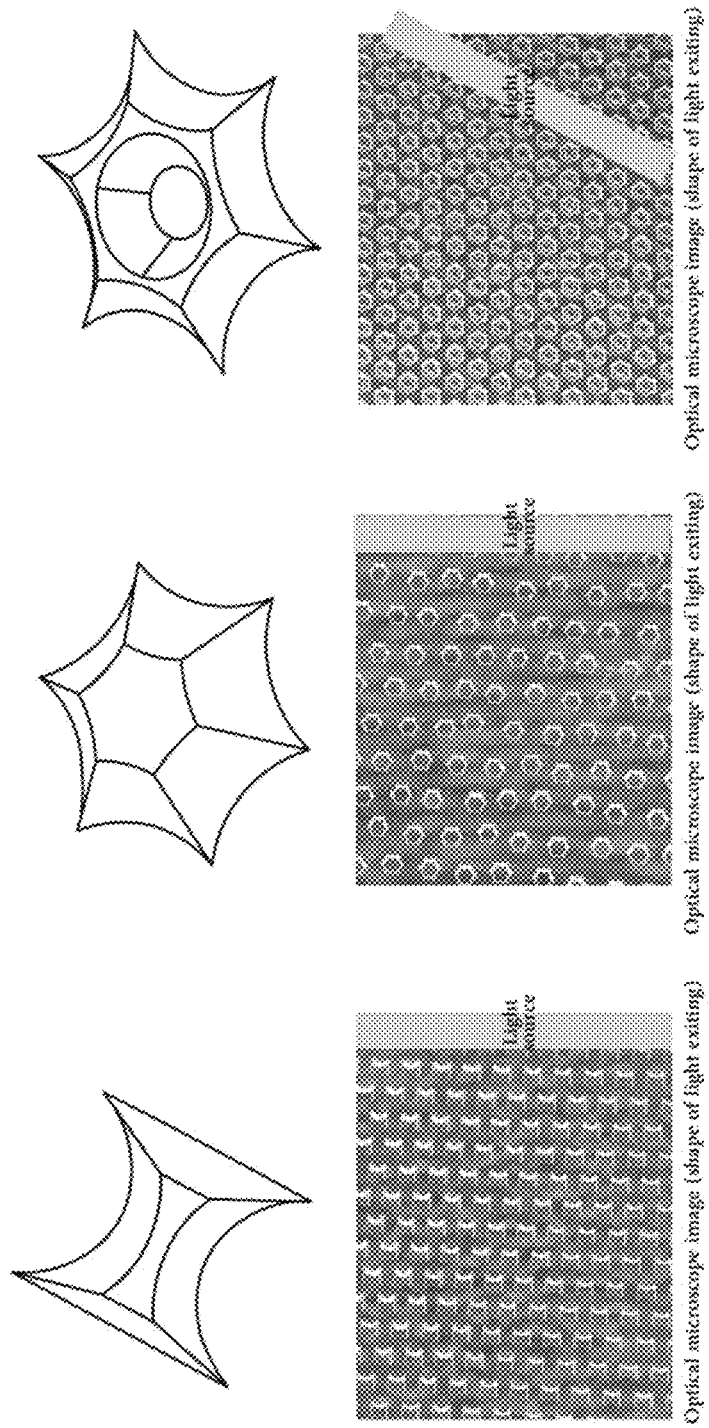
FIG. 22 is an optical microscope image showing the light emitting appearance of the light exiting member according to FIG. 15D, the light exiting member according to an embodiment of FIG. 13, and the light exiting member illustrated in FIG. 19.

FIG. 22 is an optical microscope image showing the light emitting appearance of the light exiting member according to FIG. 15D, the light exiting member according to an embodiment of FIG. 13, and the light exiting member illustrated in FIG. 19.

Referring to FIG. 22, it may be seen that light from the light source is reflected on a portion of the inner surfaces defining the intaglio pattern by the intaglio pattern (or cavity) formed in the light exiting member to exit light in one direction. When the protruding pattern disposed in the intaglio pattern is further provided, it may be recognized that light is exited even by the protruding pattern, and thus light exiting characteristics are further improved.

Meanwhile, the light exiting member according to various embodiments of the present invention described above may be mass-produced by manufacturing a mold of an embossed pattern corresponding to an intaglio pattern (cavity), and then stamping the manufactured embossed pattern mold on one surface (lower surface) of the light exiting member. Therefore, it is possible to solve the disadvantage of the reverse slope structure that has been commonly used for vertical light emission in the prior art.

FIGS. 23 to 32 are diagrams for illustrating various embodiments of a light unit to which the light exiting member according to the embodiments of the present invention described above is applied. For convenience of description, various light units will be described with reference to the light exiting member 230' illustrated in FIG. 13 as an example. Accordingly, the light exiting member 230' illustrated in FIGS. 23 to 32 may be replaced with the light exiting member 230" illustrated in FIG. 20.

Figure 23:
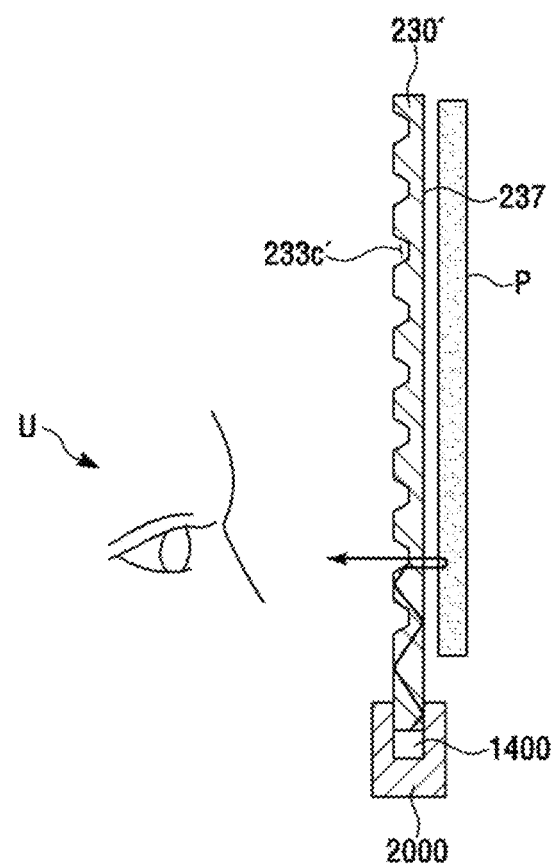
FIG. 23 is a diagram illustrating a light unit according to a first embodiment of the present invention.

FIG. 23 is a diagram illustrating a light unit according to a first embodiment of the present invention.

Referring to FIG. 23, a light unit according to a first embodiment of the present invention comprises a light exiting member 230', a light source 1400, and a housing 2000.

The light exiting member 230' comprises one surface having the cavity 233c' described above with reference to FIGS. 11 to 15 and a light exiting surface 237 through which light from the light source 1400 is exited. Here, the light exiting surface 237 may be referred to as other surface of the light exiting member 230'.

The light source 1400 is disposed at one side surface of the light exiting member 230' and emits light to the light exiting member 230'. The light source 1400 may be one or a plurality of LEDs, or may be CCFL illustrated in FIG. 1.

The light source 1400 is disposed inside a housing 2000. Since the light source 1400 is disposed inside the housing 2000, it is possible to prevent foreign substances or light from being applied to the light source 1400.

The housing 2000 may be disposed to cover one side part comprising the one side surface of the light exiting member 230'. The housing 2000 may be configured such that light emitted from the light source 1400 does not leak to the outside other than the light exiting member 230'. The housing 2000 may have a receiving groove in which the light source 1400 is accommodated. One side part of the light exiting member 230' may be accommodated in the receiving groove.

According to the light unit according to the first embodiment of the present invention illustrated in FIG. 23, the light emitted from the light source 1400 is incident on the light exiting member 230'. The incident light travels while being totally reflected within the light exiting member 230'. The traveling light is reflected on at least one of the inner surfaces defining the cavity 233c' substantially perpendicular to the light exiting surface 237 and exited to the outside through the light exiting surface 237. The light exited from the light exiting surface 237 is reflected by an subject P to be lighted (e.g., a printed material) and passes through the light exiting member 230'. Accordingly, the light reaches an user U. Here, an subject P to be lighted may be attached to and fixed to the light exiting surface 237 of the light exiting member 230' through an adhesive.

When the light unit according to the first embodiment of the present invention illustrated in FIG. 23 is used, only a single light exiting member 230' can be used to illuminate the subject P to be lighted, and the user can accurately recognize the information displayed on the subject P to be lighted not only in a bright environment but also in a dark environment. In addition, since illumination is applied to the subject P to be lighted, the probability of exposure of the subject P to be lighted to the user U may be increased, thereby improving the advertising effect.

Figure 24:
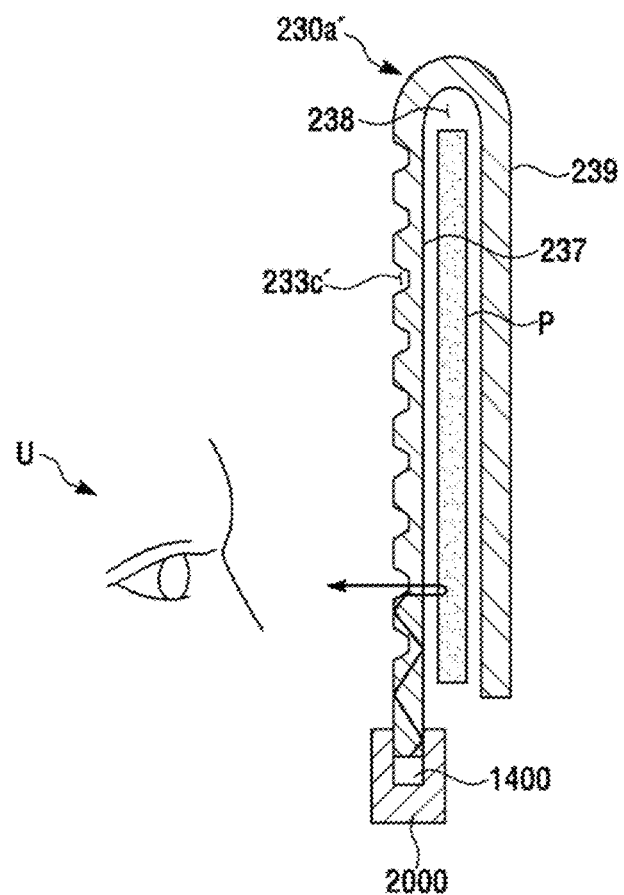
FIG. 24 is a diagram illustrating a light unit according to a second embodiment of the present invention.

FIG. 24 is a diagram illustrating a light unit according to a second embodiment of the present invention.

Referring to FIG. 24, a light unit according to a second embodiment of the present invention comprises a light exiting member 230a', a light source 1400, and a housing 2000. Since the structures of the light source 1400 and the housing 2000 are the same as those of the light source 1400 and the housing 2000 illustrated in FIG. 23, detailed descriptions thereof will be replaced with those described above.

The light exiting member 230a' comprises the light exiting member 230' illustrated in FIG. 23 and an extension part 239. The extension part 239 may extend from the other side part among both side parts of the light exiting member 230' and may be bent toward one side part of the light exiting member 230'.

The light exiting member 230a' may comprise a light exiting part and an extension part 239. Here, the light exiting part refers to a part corresponding to the light exiting member 230' illustrated in FIG. 23, and the extension part 239 may extend from the other side part of the light exiting part and may be bent toward the one side part of the light exiting part.

The light exiting member 230a' has a receiving part 238 for accommodating the subject P to be lighted between the light exiting part (the light exiting member 230' illustrated in FIG. 23) and the extension part 239. Here, the extension part 239 may have a predetermined elasticity toward the light exiting part. The user may pull the extension part 239 in a direction away from the light exiting part to receive the subject P to be lighted in the receiving part 238, and the subject P to be lighted received in the receiving part 238 may be fixed to the receiving part 238 without an additional adhesive.

When the light unit according to the second embodiment of the present invention illustrated in FIG. 24 is used, there is an advantage that the subject P to be lighted may be fixed to the light exiting member 230a' without an additional adhesive in addition to the advantages of the light unit illustrated in FIG. 23.

Figure 25:
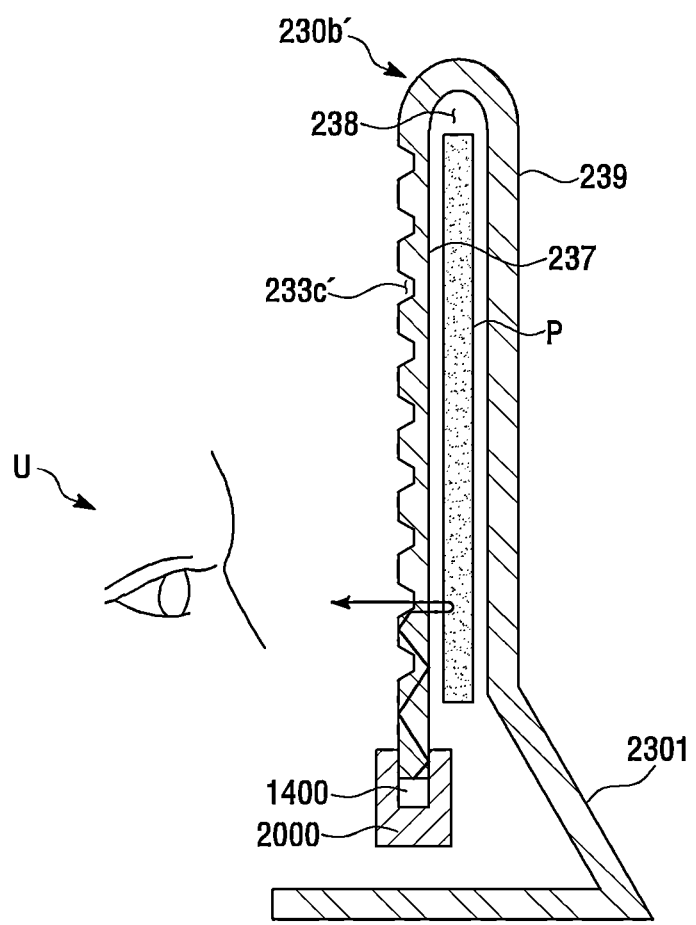
FIG. 25 is a diagram illustrating a light unit according to a third embodiment of the present invention.

FIG. 25 is a diagram illustrating a light unit according to a third embodiment of the present invention.

Referring to FIG. 25, a light unit according to a third embodiment of the present invention comprises a light exiting member 230b', a light source 1400, and a housing 2000. Since the structures of the light source 1400 and the housing 2000 are the same as those of the light source 1400 and the housing 2000 illustrated in FIG. 21, a detailed description thereof will be replaced with the above description.

The light exiting member 230b' further comprises a support part 2301 extending from the end of the extension part 239 of the light exiting member 230a' illustrated in FIG. 24. The support part 2301 may extend from an end portion of the extension part 239 of the light exiting member 230a' and may be bent at least once. The support part 2301 is bent to cover the housing 2000 and supports the light unit according to the third embodiment of the present invention from the bottom.

The light exiting member 230b' comprises a light exiting part (the light exiting member 230' illustrated in FIG. 23), an extension part 239, and a support part 2301. Here, the light exiting part may be a part corresponding to the light exiting member 230' illustrated in FIG. 23, and the extension part 239 may extend from the other side part of the light exiting part and may be bent toward the one side part of the light exiting part. The support part 2301 is bent to cover the housing 2000 and supports the light unit according to the third embodiment of the present invention from the bottom.

When the light unit according to the third embodiment of the present invention illustrated in FIG. 25 is used, there is advantages that the light unit may be supported by the light exiting member 230b', and since the entire light unit may be implemented by a material of the light exiting member 230b', uniformity may be provided to the user, in addition to the advantages of the light unit illustrated in FIG. 24.

Figure 26:
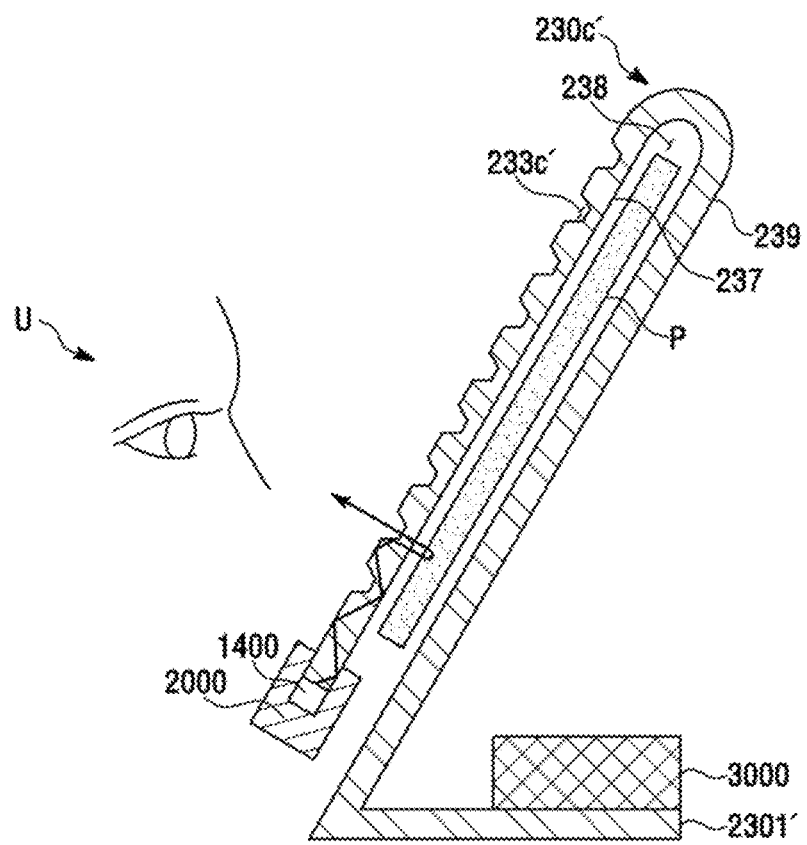
FIG. 26 is a diagram illustrating a light unit according to a fourth embodiment of the present invention.

FIG. 26 is a diagram illustrating a light unit according to a fourth embodiment of the present invention.

Referring to FIG. 26, a light unit according to a fourth embodiment of the present invention comprises a light exiting member 230c', a light source 1400, a housing 2000, and a battery 3000. Since the structures of the light source 1400 and the housing 2000 are the same as those of the light source 1400 and the housing 2000 illustrated in FIG. 23, detailed descriptions thereof will be replaced with those described above.

The light exiting member 230c' further comprises a support part 2301' extending from the end of the extension part 239 of the light exiting member 230a' illustrated in FIG. 24. The support part 2301' may extend from the end of the extension part 239 and may have a bent part at least once. The support part 2301' is bent at the end of the extension part 239 in a direction opposite to the direction in which the housing 2000 is located, and supports the light unit according to the fourth embodiment of the present invention from the bottom.

The light exiting member 230c' comprises a light exiting part (the light exiting member 230' illustrated in FIG. 23), an extension part 239, and a support part 2301'. Here, the light exiting part may be a part corresponding to the light exiting member 230' illustrated in FIG. 23, and the extension part 239 may extend from the other side part of the light exiting part and may be bent toward the one side part of the light exiting part. The support part 2301' is bent at the end of the extension part 239 in a direction opposite to the direction in which the housing 2000 is located, and supports the light unit according to the fourth embodiment of the present invention from the bottom.

The light exiting part and the extension part 239 of the light exiting member 230c' may be supported by the support part 2301' and may be inclined at a predetermined angle. For example, an angle formed by an upper surface of the support part 2301' and one surface of the extension part 239 may be an acute angle.

The battery 3000 is disposed on the support part 2301' of the light exiting member 230c' and supplies power to the light source 1400. Since the battery 3000 is disposed on the support part 2301', there is an advantage in that the battery 3000 is not exposed to the user U.

When the light unit according to the fourth embodiment of the present invention illustrated in FIG. 26 is used, there is advantages that the light unit may be supported by the light exiting member 230c' and since the entire light unit may be implemented by a material of the light exiting member 230c', uniformity may be provided to the user, the light exiting part and the extension part 239 are inclined at a predetermined angle so that the user may easily obtain information on the subject P, and the battery 3000 is not exposed to the user, in addition to the advantages of the light unit illustrated in FIG. 24.

Figure 27:
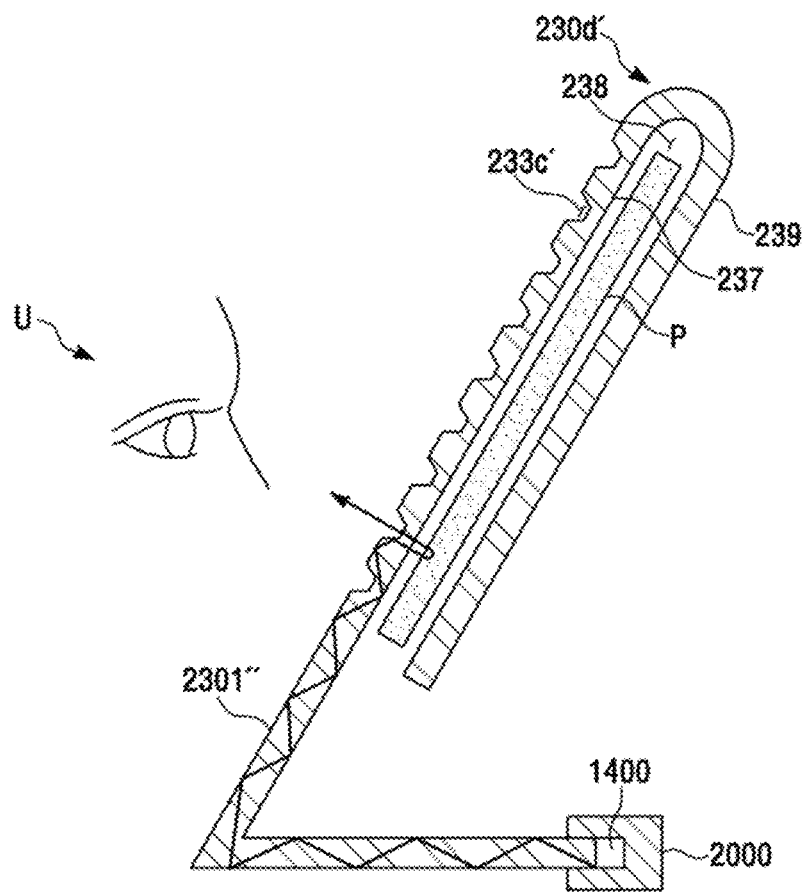
FIG. 27 is a diagram illustrating a light unit according to a fifth embodiment of the present invention.

FIG. 27 is a diagram illustrating a light unit according to a fifth embodiment of the present invention.

Referring to FIG. 27, a light unit according to a fifth embodiment of the present invention comprises a light exiting member 230d', a light source 1400, and a housing 2000. Since the structures of the light source 1400 and the housing 2000 are the same as those of the light source 1400 and the housing 2000 illustrated in FIG. 21, a detailed description thereof will be replaced with the above description.

The light exiting member 230d' further comprises a support part 2301" extending from the one side part of the light exiting member 230a' illustrated in FIG. 24. The support part 2301" may extend from one side part of the light exiting member 230a' and may have a bent part at least once. The support part 2301" extends from the one side part of the light exiting member 230a' by a predetermined length and is bent toward the extension part 239 to support the light unit according to the fifth embodiment of the present invention from the bottom.

The light exiting member 230d' comprises a light exiting part, an extension part 239, and a support part 2301". Here, the light exiting part may correspond to the light exiting member 230' illustrated in FIG. 23, and the extension part 239 may extend from the other side part of the light exiting part and may be bent toward the one side part of the light exiting part. The support part 2301" extends from the one side part of the light exiting part by a predetermined length and is bent toward the extension part 239 to support the light unit according to the fifth embodiment of the present invention from the bottom.

The light exiting part and the extension part 239 of the light exiting member 230d' may be supported by the support part 2301" and may be inclined at a predetermined angle. For example, an angle formed by an upper surface of the support part 2301" and one surface of the light exiting part may be an acute angle.

The light source 1400 may be located at one side surface of the end portion of the support part 2301", and the housing 2000 may be disposed to receive the end portions of the light source 1400 and the support part 2301".

Although not shown separately in the drawings, a battery (not shown) may be disposed on the support part 2301", and power may be supplied to the light source 1400. Since the battery (not shown) is disposed on the support part 2301", there is an advantage that the battery is not exposed to the user U.

When the light unit according to the fifth embodiment of the present invention illustrated in FIG. 27 is used, there is advantages that the light unit may be supported by the light exiting member 230d' and since the entire light unit may be implemented by a material of the light exiting member 230d', uniformity may be provided to the user, the light exiting part and the extension part 239 are inclined at a predetermined angle so that the user may easily obtain information on the subject P to be lighted, and the battery is not exposed to the user, in addition to the advantages of the light unit illustrated in FIG. 24.

Figure 28:
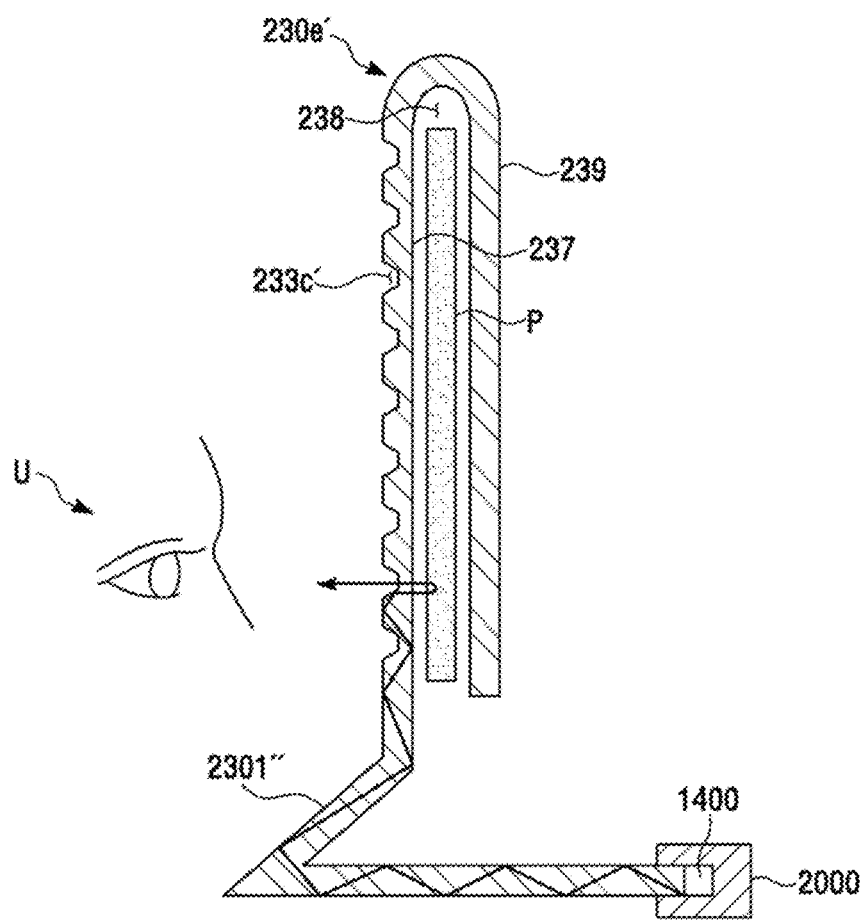
FIG. 28 is a diagram illustrating a light unit according to a sixth embodiment of the present invention.

FIG. 28 is a diagram illustrating a light unit according to a sixth embodiment of the present invention.

The light unit in accordance with the sixth embodiment of the present invention illustrated in FIG. 28 is different from the light unit illustrated in FIG. 27 in that the support part 2301" is extended so as to be bent twice, and the light exiting part and the extension part of the light exiting member 230e' are disposed perpendicular to the ground. Here, the angle formed by the light exiting part and the extension part of the light exiting member 230e' with the ground may be variously changed in design.

According to the light unit according to the sixth embodiment of the present invention illustrated in FIG. 28, there is advantages that the light unit may be supported by the light exiting member 230d', since the entire light unit may be implemented by a material of the light exiting member 230d', uniformity may be provided to the user, and the battery is not exposed to the user, in addition to the advantages of the light unit illustrated in FIG. 27.

Figure 29:
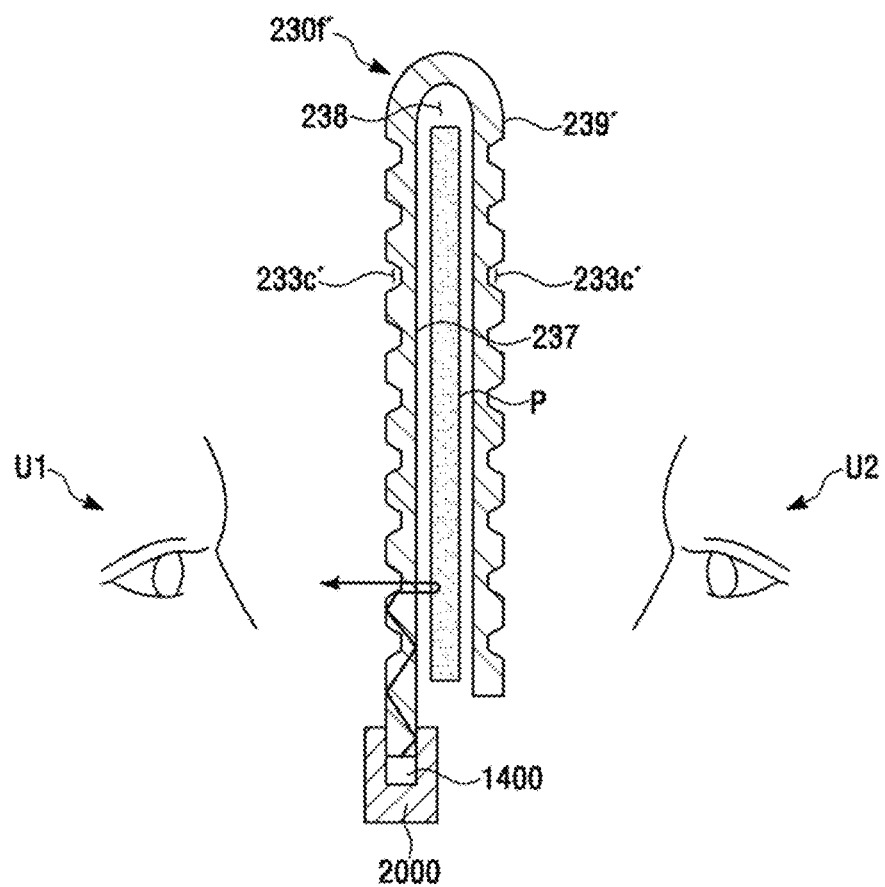
FIG. 29 is a diagram illustrating a light unit according to a seventh embodiment of the present invention.

FIG. 29 is a diagram illustrating a light unit according to a seventh embodiment of the present invention.

The light unit in accordance with the seventh embodiment of the present invention illustrated in FIG. 29 is different in the light exiting part 230f' illustrated in FIG. 24, when compared to the light unit illustrated in FIG. 24.

Specifically, the light exiting member 230f' comprises an extension part 239', and one surface of the extension part 239' of the light exiting member 230f' has a cavity 233c'. Accordingly, the extension part 239' has one surface having the cavity 233c' and a light exiting surface 237.

According to the light unit according to a seventh embodiment of the present invention illustrated in FIG. 29, there is advantages that when the subject P to be lighted is a double-sided print, the information on one surface of the light unit may be shown to first user U1 located at one side of the light unit and simultaneously the information on the other surface of the light unit may be shown to second user U2, in addition to the advantages of the light unit illustrated in FIG. 24.

Figure 30:
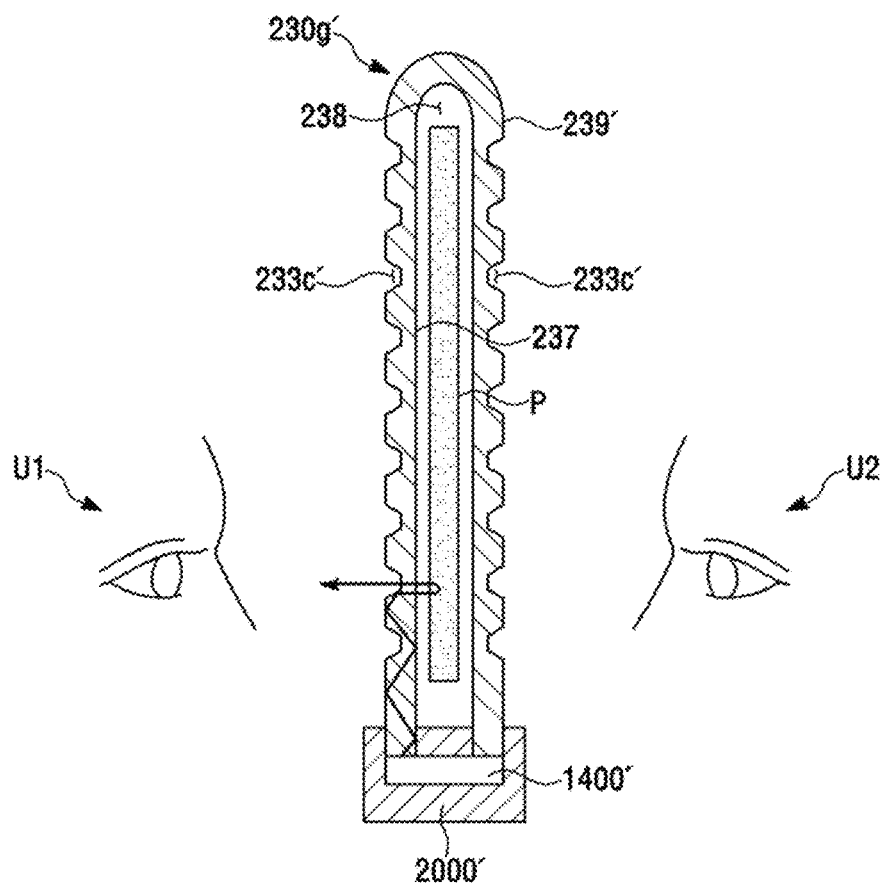
FIG. 30 is a diagram illustrating a light unit according to an eighth embodiment of the present invention.

FIG. 30 is a diagram illustrating a light unit according to an eighth embodiment of the present invention.

The light unit in accordance with the eighth embodiment of the present invention illustrated in FIG. 30 is different from the light unit illustrated in FIG. 29 in that the extension part of the light exiting member 230g' has a structure where the extension part and the light exiting part are symmetrical to each other and in the light source 1400' and the housing 2000'.

The housing 2000' may be configured to accommodate the light source 1400', and to accommodate both ends (an end of the one side part of the light exiting part and an end of the extension part) of the light exiting member 230g'.

The light source 1400' is disposed at both ends of the light exiting member 230g', that is, on the end of the one side part of the light exiting part and the end of the extension part. That is, the light source 1400' may simultaneously emit light to the light exiting part and the extension part. Accordingly, substantially the same lighting effect may be provided to the first user U1 and the second user U2 simultaneously.

Figure 31:
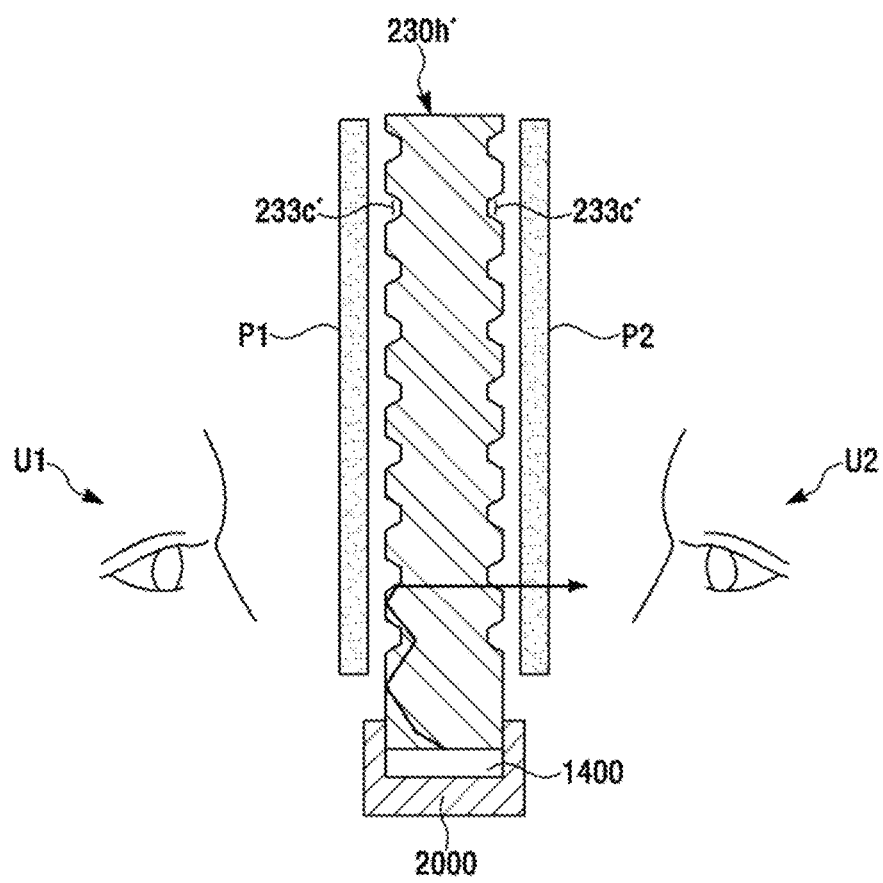
FIG. 31 is a diagram illustrating a light unit according to a ninth embodiment of the present invention.

FIG. 31 is a diagram illustrating a light unit according to a ninth embodiment of the present invention.

The light unit according to the ninth embodiment of the present invention illustrated in FIG. 31 comprises a light exiting member 230h', a light source 1400, and a housing 2000. Here, since the light source 1400 and the housing 2000 are the same as the light source 1400 and the housing 2000 illustrated in FIG. 23, a detailed description thereof will be replaced with those described above.

The light exiting member 230h' has cavities 233c' on both surfaces thereof, when compared to the light exiting member 230' illustrated in FIG. 23.

Light reflected from the cavity 233c' formed on one surface of the light exiting member 230h' is exited to the other surface, and light reflected from the cavity 233c' formed on the other surface of the light exiting member 230h' is exited to the one surface. That is, both surfaces of the light exiting member 230h' may function as light exiting surfaces.

When the first transmissive subject P1 to be lighted is disposed on the one surface of the light exiting member 230h' and the second transmissive subject P2 to be lighted is disposed on the other surface of the light exiting member 230h', the first user U1 may obtain information printed on the first transmissive subject P1 through light exited from the one surface of the light exiting member 230h', and the second user U2 may obtain information printed on the second transmissive subject P2 through light exited from the other surface of the light exiting member 230h'.

Figure 32:
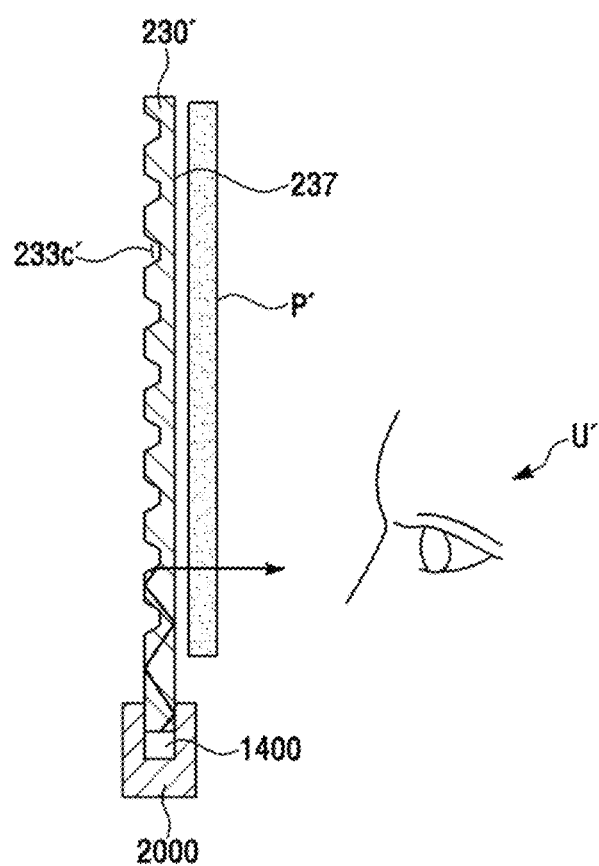
FIG. 32 is a diagram for describing other lighting method of a light unit according to a first embodiment of the present invention illustrated in FIG. 23.

FIG. 32 is a diagram for describing other lighting method of the light unit according to a first embodiment of the present invention illustrated in FIG. 23.

Referring to FIG. 32, the light unit according to the first embodiment of the present invention may exit light to a transmissive subject P' located on the light exiting surface 237, through which a user U' may obtain information contained in the transmissive subject P'. In this way, the light unit according to the first embodiment of the present invention has an advantage of being able to illuminate not only non-transmissive subjects but also transmissive subjects.

The subjects P and P' illustrated in FIGS. 23 to 32 may be a mirror such as a single-sided mirror or a double-sided mirror. If the subjects P and P' are mirrors, a user may use the light unit as a general mirror when light is not incident (light-off) on the light exiting member of FIGS. 23 to 32, and the user may use the light unit as lighting when light is incident (light-on) on the light exiting member of FIGS. 23 to 32. For example, when the light unit is used as lighting, light may exit on the front surface of the mirror which is a subject.

FIGS. 33 to 35D are diagrams for explaining embodiments of a light unit to which a light exiting member is applied according to embodiments of the present invention described above. In FIGS. 33 to 35D, for convenience of description, various light units will be described with reference to the light exiting member 230' illustrated in FIG. 13 as an example. Accordingly, the light exiting member 230' illustrated in FIGS. 33 to 35D may be replaced with the light exiting member 230' illustrated in FIG. 20.

Figure 33:
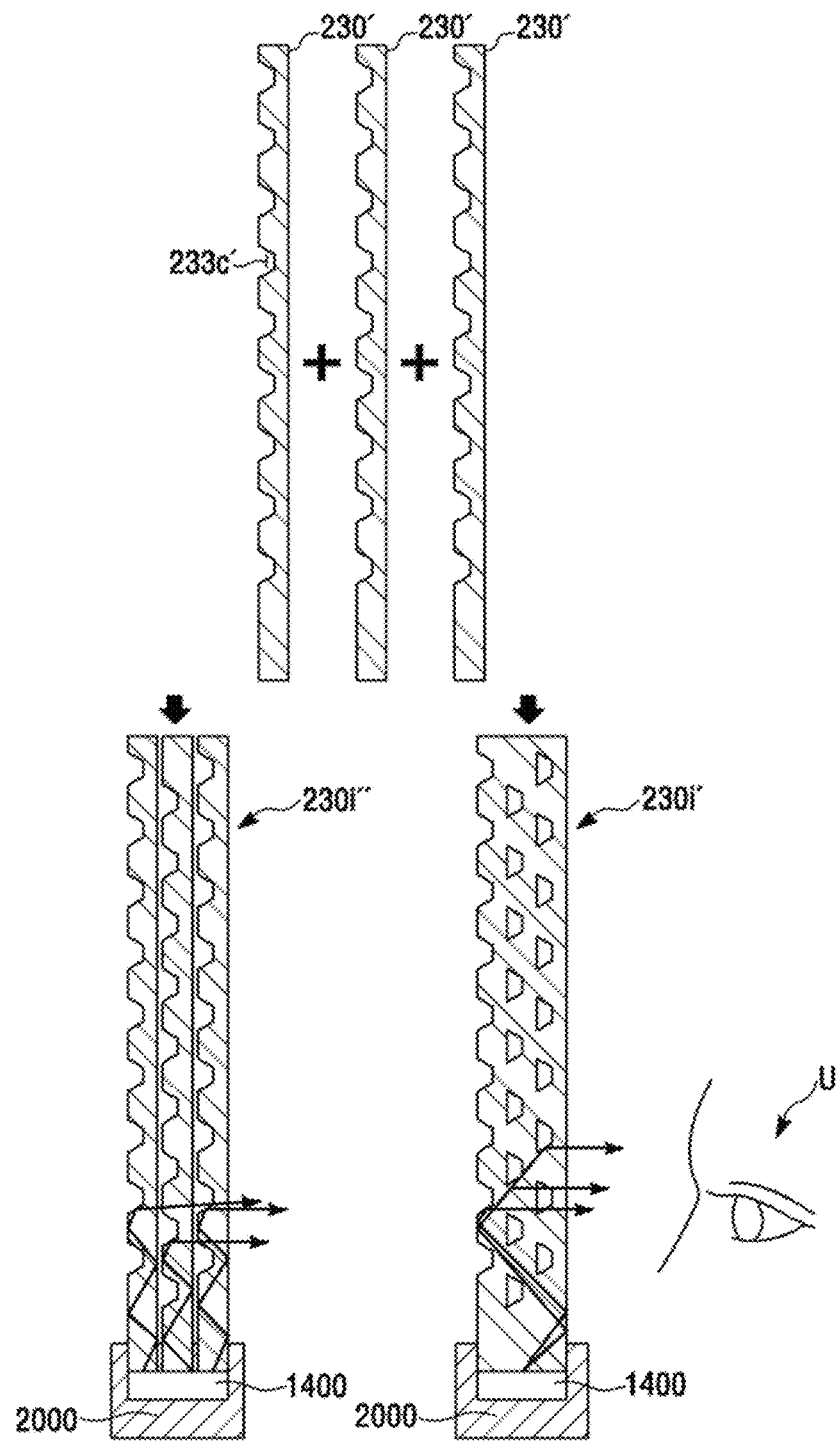
FIG. 33 is a diagram illustrating a light unit according to a tenth embodiment of the present invention.

FIG. 33 is a diagram illustrating a light unit according to a tenth embodiment of the present invention.

Referring to FIG. 33, a light unit according to a tenth embodiment of the present invention comprises a light exiting member 230i', a light source 1400, and a housing 2000.

The light source 1400 is disposed at one side surface of one side part of the light exiting member 230i', and the housing 2000 accommodates the light source 1400 and accommodates the one side part of the light exiting member 230i'.

The light exiting member 230i' may be a plurality of light exiting members 230' illustrated in FIG. 13 combined together. Here, the light exiting member 230' may be about 1 T (mm). When the light exiting member 230i' is configured with a combination of a plurality of light exiting members 230', the unidirectional light exiting luminance can be improved compared to that of using one light exiting member 230'.

The light exiting member 230i' may be formed by bonding a plurality of light exiting members 230' to one body. Here, each of the plurality of light exiting members 230' may be positioned such that one surface in which a cavity 233c' is formed faces the same direction. According to the light unit with such light exiting member 230i', the light incident from the light source 1400 is totally reflected on both surfaces of the light exiting member 230i' and travels inside of the light exiting member 230i', and the travelling light is reflected on the inner surface defining the cavity 233c' toward the light exiting surface which is a surface of the light exiting member 230i' and exited to outside through the light exiting surface.

Meanwhile, the light exiting member 230i'' comprises a plurality of light exiting members 230', the plurality of light exiting members 230' are laminated, and a predetermined air gap may be formed between two laminated light exiting members 230'. Here, each of the plurality of light exiting members 230' may be positioned such that one surface in which the cavity 233c' is formed faces the same direction. According to the light unit with such light exiting member 230i', the light incident from the light source 1400 is totally reflected on both surfaces of each of the light exiting members 230i' and travels inside of each of the light exiting members 230i', and the travelling light is reflected on the inner surface defining the cavity 233c' toward the light exiting surface which is a surface of the light exiting member 230i' and exited to outside through the light exiting surface.

On the other hand, although not illustrated in the drawings, the light exiting member comprises a plurality of light exiting members 230', at least two of the plurality of light exiting members 230' may be bonded to one body, and the other one or ones may be laminated on one surface of the light exiting member combined to one body.

Figure 34:
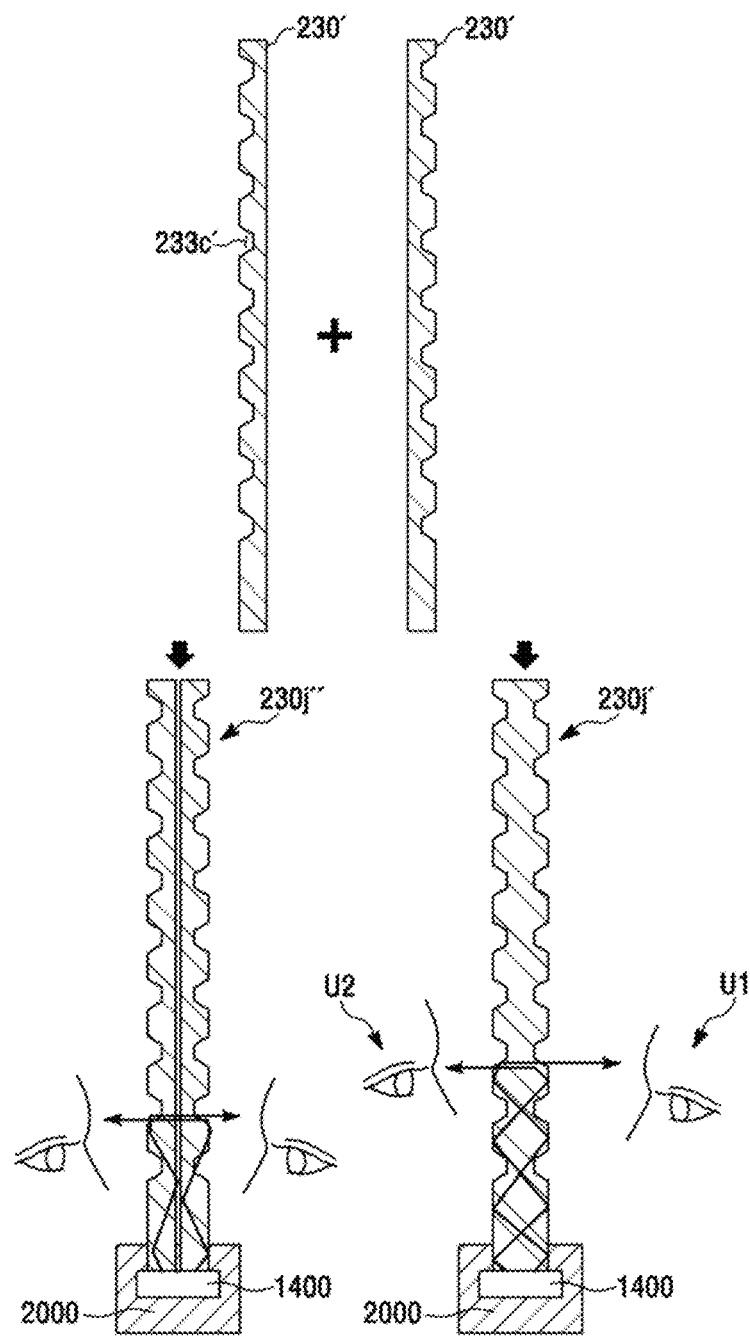
FIG. 34 is a diagram illustrating a light unit according to an eleventh embodiment of the present invention.

FIG. 34 is a diagram illustrating a light unit according to an eleventh embodiment of the present invention.

The light unit in accordance with the eleventh embodiment of the present invention illustrated in FIG. 34 is different in the light exiting member 230j', when compared to the light unit illustrated in FIG. 33.

The light exiting member 230j' may be a plurality of light exiting members 230' illustrated in FIG. 13 combined together. Here, the light exiting member 230j' may be combined in a state in which a plurality of light exiting members 230' are disposed to be symmetrical to each other. The light exiting surfaces of the two light exiting members 230' may be combined to face each other.

The light exiting member 230j' may comprise a plurality of light exiting members 230', and the plurality of light exiting members 230' may be bonded to one body. The light unit comprising the light exiting member 230j' has the advantage of enabling double-sided light exit. Lighting may be provided to the first user U1 and the second user U2 located at both sides with the light exiting member 230j' interposed therebetween.

Meanwhile, the light exiting member 230j'' comprises a plurality of light exiting members 230', and the plurality of light exiting members 230' are laminated, and a predetermined air gap may be formed between the two laminated light exiting members 230'. The light unit comprising the light exiting member 230j'' also has an advantage in that double-sided light exit is possible.

FIGS. 35A-D are diagrams illustrating a light unit according to a twelfth embodiment of the present invention.

The light unit in accordance with the twelfth embodiment of the present invention illustrated in FIGS. 35A-D is different in the light exiting member 230k', when compared to the light unit illustrated in FIG. 34.

The light exiting member 230k' may be a plurality of light exiting members 230' illustrated in FIG. 13 combined together. Here, the light exiting member 230k' may be combined in a state in which a plurality of light exiting members 230' are disposed to be symmetrical to each other.

Two light exiting members 203' may be combined such that one surfaces of the two light exiting members 230' in which the cavity 233c' is formed face each other.

The light exiting member 230k' may comprise a plurality of light exiting members 230', and the plurality of light exiting members 230' may be bonded to one body. The light unit comprising the light exiting member 230k' has the advantage of being able to emit double-sided light or bidirectional light using a plurality of light exiting members 230'. Lighting may be provided to the first user U1 and the second user U2 located at both sides with the light exiting member 230k' interposed therebetween.

Meanwhile, the light exiting member 230k' comprises a plurality of light exiting members 230', the plurality of light exiting members 230' are laminated, and a predetermined air gap may be formed between the two laminated light exiting members 230'.

The light exiting member 230k' may comprise at least two light exiting members 230', and the two light exiting members 230' may be combined so that one surfaces thereof on which the cavity 233c' is formed face each other, and the cavities 233c' facing each other may completely overlap each other (FIG. 35D).

In addition, the light exiting member 230k" comprises at least two light exiting members 230', and the two light exiting members 230' may be combined so that one surfaces thereof on which the cavity 233c' is formed face each other, and the cavities 233c' facing each other may cross each other (FIG. 35C).

In addition, the light exiting member 230k'" comprises at least two light exiting members 230', and the two light exiting members 230' may be combined so that one surfaces thereof on which the cavity 233c' is formed face each other, and the cavities 233c' facing each other may partly overlap each other (FIG. 35B).

Since the light units illustrated in FIGS. 33 to 35D comprise a light exiting member in which a plurality of light exiting members 230' are combined in various ways, there are advantages that light exiting luminance may be improved and light exiting may be not only in both directions but also unidirectional.

Hereinafter, a light exiting member capable of implementing a delicate and diverse specific image by selectively burying or modifying the light exiting pattern, a method of manufacturing the same, and a light unit comprising the same will be described in detail.

First, a method of manufacturing a light exiting member will be described in detail by dividing it into various embodiments.

The First Embodiment

Figure 36:
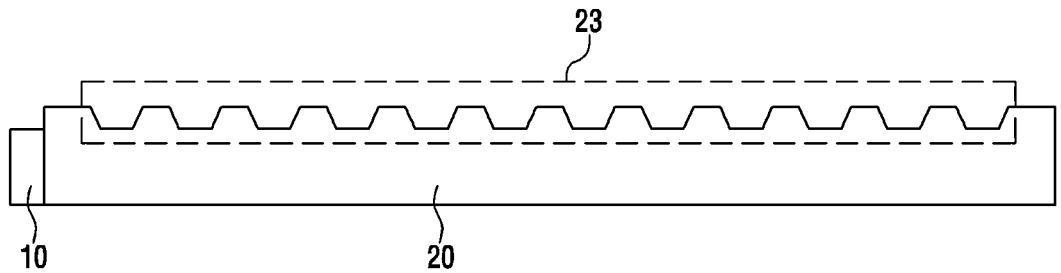
FIGS. 36 to 38 are diagrams for explaining a method of manufacturing a light exiting member according to a first embodiment of the present invention and a light exiting member manufactured by the same method.
Figure 37:
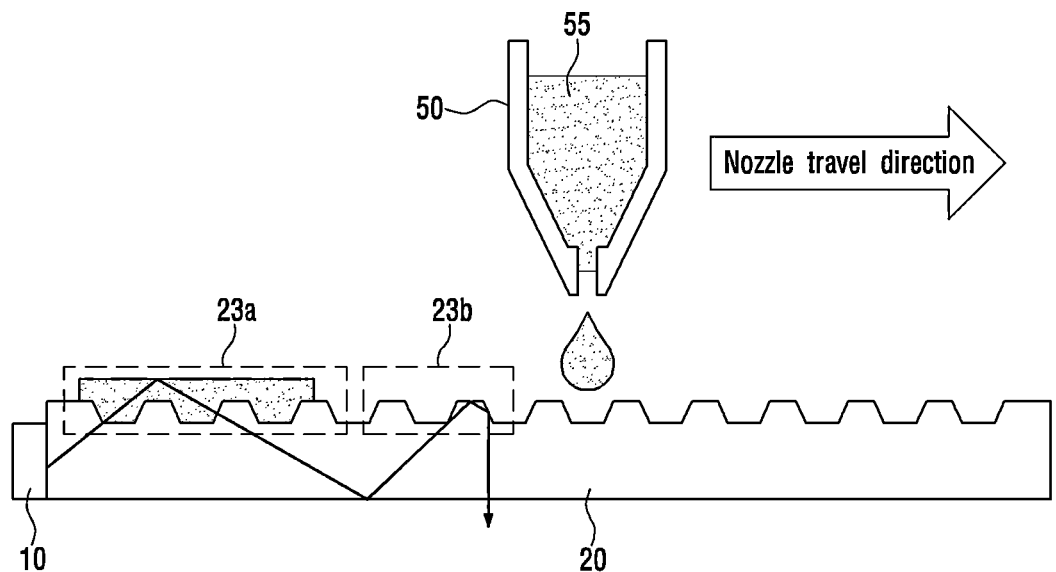
Figure 38:
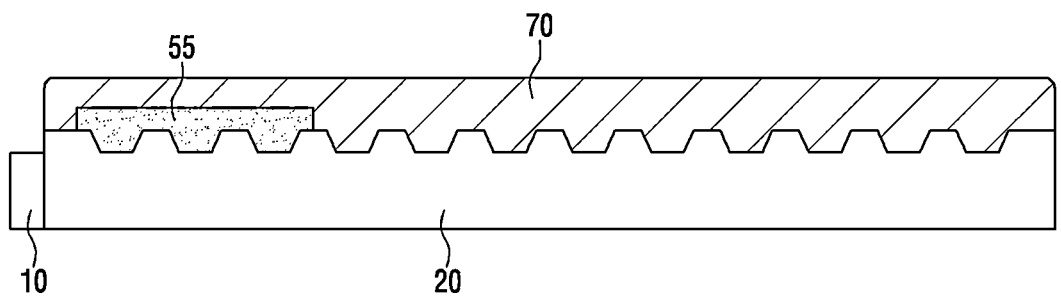

FIGS. 36 to 38 are diagrams for explaining a method of manufacturing a light exiting member according to a first embodiment of the present invention and a light exiting member manufactured by the same method.

Referring to FIG. 36, in the method of manufacturing the light exiting member according to the first embodiment of the present invention, at first, a light exiting part 20 having light exiting patterns 23 is prepared.

The light exiting part 20 is a light guide member and may be a light guide plate or a light guide sheet. Accordingly, the light exiting member that has been manufactured may be a light guide plate or a light guide sheet. The light exiting part 20 may be made of a rigid material or a flexible material.

The light exiting part 20 may has, as transparent material, PMMA(Polymethylmethacrylate), SMMA(Styrenemethyl Methacrylate), COC(Cyclic olefin copolymer), AryLite, Polycarbonate, PET(Polyethyleneterephtalate), PI(Polyimide), PE(Polyethylene), PES(Polyethersulfone), PO(Polyolefin), PVA(Polyvinylalcohol), PVC(Polyvinylchloride), TAC(Triacetylcellulose), PS(Polystylene), PP(Polypropylene), ABS(Acrylonitrile Butadiene Styrene), SAN/AS(Styrene Acrylonitrile), PEN(Polyethylene Naphthalate), PTT (Polytrimethylene Terephthalate), PU(Polyurethane), PUA (Polyurethane Acrylate), TPU(Thermoplastic Polyurethane), PAR(Polyarylate), Silicone, PDMS(Polydimethylsiloxane) and so on.

When a light source 10 is disposed at one side surface of the light exiting part 20, the light exiting part 20 may receive predetermined light from the light source 10 and exit the received light in only one direction. Here, the portion through which the light is exited may be one surface in which the light exiting patterns 23 are not formed among the upper and lower surfaces of the light exiting part 20.

The light exiting patterns 23 may be formed on the one surface (or an upper surface) of the light exiting part 20. Here, the light exiting patterns 23 may also be formed on the other surface (or lower surface) of the light exiting part 20. When the light exiting patterns 23 are also formed on the other surface, light may also be emitted upward through the one surface.

The light exiting patterns 23 may be intaglio patterns or/and embossed fine patterns. In addition, the light exiting patterns 23 may be uneven fine patterns. The light exiting patterns 23 may be uniform patterns or non-uniform patterns.

The light exiting patterns 23 may be formed on the entire of the one surface (or upper surface) of the light exiting part 20 or may be formed on a portion thereof rather than the entire surface.

Next, referring to FIG. 37, a resin 55 is formed on portions of the light exiting patterns 23a of the light exiting part 20, and the resin 55 is not formed on the remaining light exiting patterns 23b. Here, the resin 55 may be a UV printed resin. In addition, the resin 55 may be made of the same material as the light exiting part 20, or may be made of a material having a refractive index equal to or similar to that of the light exiting part 20. Here, the refractive index of the resin 55 may be 0.8 to 1.2 times the refractive index of the light exiting part 20. If the refractive index of the resin 55 is outside the numerical range, total reflection may not be performed well due to a difference in refractive index with the light exiting part 20.

The resin 55 may be formed on the portions of the light exiting patterns 23a through a printer nozzle 50. Here, as illustrated in FIG. 37, the resin 55 may be formed to cover the portions of the light exiting patterns 23a, or may be formed filling the intaglio part (or concave part of the uneven part) of the portions of the light exiting patterns 23a to make the portions of the light exiting patterns 23a be flat, although not illustrated in the drawing.

The printer nozzle 50 may be comprised in the UV inkjet printer. The UV inkjet printer may control the printer nozzle 50 to drive the printer nozzle 50 in a predetermined traveling direction, and may output the resin 55 inside the printer nozzle 50 to the outside at a specific position according to the control. The resin 55 may be formed only on the portions of the light exiting patterns 23*a* of the light exiting part 20 by the UV inkjet printer. Thereafter, the resin 55 formed on the portions of the light exiting patterns 23*a* may be cured through a curing process.

By forming the resin 55 on the light exiting patterns 23*a* only on a specific portions desired by the user among the light exiting patterns 23 of the light exiting part 20, a specific image desired by the user may be formed. When the resin 55 is formed on the portions of the light exiting patterns 23*a*, since the resin 55 has a refractive index equal to or similar to that of the light exiting part 20, light incident from the light source 10 may not exit and may be totally reflected in the light exiting part 20 at the portions of the light exiting patterns 23*a*. Meanwhile, since the resin 55 is not formed on the remaining light exiting patterns 23*b*, light reflected from the remaining light exiting patterns 23*b* may be exited downward through the lower surface (or the other surface) of the light exiting part 20. That is, according to the manufacturing method of the light exiting member according to the first embodiment, a selective light exiting effect may be achieved by selectively controlling an area in which light is exited and an area in which light is not exited.

Meanwhile, the resin 55 formed on the portions of the light exiting patterns 23*a* may be formed not only by the inkjet printing method illustrated in FIG. 37 but also by various ways, for example, a stencil or silkscreen printing method.

Next, referring to FIG. 38, a resin layer 70 having a predetermined refractive index is formed on the light exiting part 20 where the resin 55 is formed and cured on the portions of the light exiting patterns 23*a* of FIG. 37. The resin layer 70 may be made of a material having a lower refractive index than that of the resin 55 and the light exiting part 20. The resin layer 70 may be formed on the entire surface of the light exiting part 20 to cover the resin 55 and the remaining light exiting patterns 23*b* to protect the resin 55 and the remaining light exiting patterns 23*b* from external foreign substances without disturbing the selective light exiting effect described above.

As illustrated in FIG. 38, the light exiting member according to the first embodiment of the present invention comprises a light exiting part 20, a resin 55 disposed only on portions of the light exiting patterns 23*a* of the light exiting part 20, and a resin layer 70 disposed on a remaining light exiting patterns 23*b* among the light exiting patterns of the light exiting part and the resin 55. Here, the refractive index of the resin 55 may be the same as or similar to the refractive index of the light exiting part 20, and the resin layer 70 may have a low refractive index relatively lower than the refractive index of the light exiting part 20 or the resin 55.

The Second Embodiment

Figure 39:
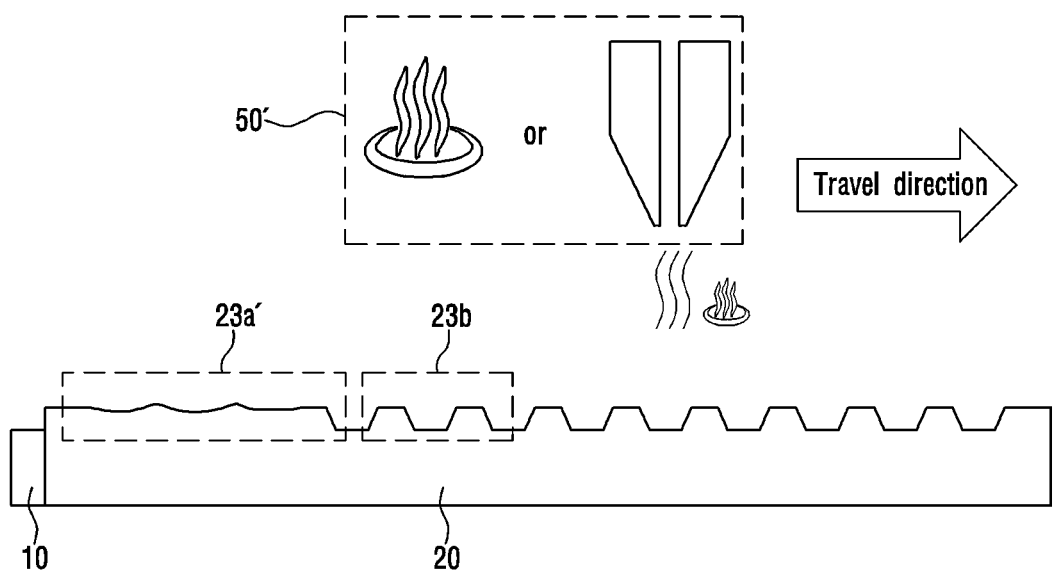
FIGS. 39 to 40 are diagrams for explaining a method of manufacturing a light exiting member according to a second embodiment of the present invention and a light exiting member manufactured by the method thereof.
Figure 40:
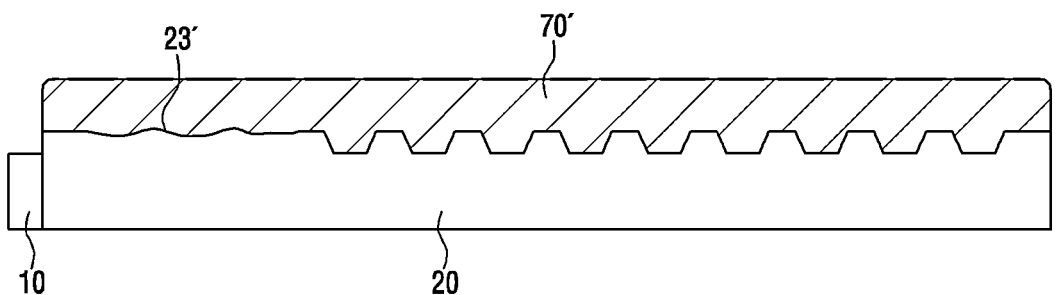

FIGS. 39 to 40 are diagrams for explaining a method of manufacturing a light exiting member according to a second embodiment of the present invention and a light exiting member manufactured by the method thereof.

In the method of manufacturing the light exiting member according to the second embodiment of the present invention, at first, the light exiting part 20 illustrated in FIG. 36 is prepared. Since the description of the light exiting part 20 has been described in connection with the first embodiment, the above description will be referred here.

Next, referring to FIG. 39, deformation patterns 23*a*' are formed by applying heat to portions of the light exiting patterns 23 of the light exiting part 20. The portions of the light exiting patterns may be deformed by receiving heat equal to or higher than a glass transition temperature to be crushed or flat, thereby becoming deformation patterns 23*a*'. Practically, if intaglio patterns are imprinted on plastics and then the plastics are heated, the plastics are deformed and recovered in such a way of becoming flattened.

The heating member 50' for forming the deformation patterns 23*a*' by applying heat to portions of the light exiting patterns may be a heating element probe. The deformation patterns 23*a*' may be formed by heating the portions of the light exiting patterns with a heating element probe and directly pressing them, or by heating the portions of the light exiting patterns with the heating element probe while proceeding in a predetermined direction.

Alternatively, the heating member 50' may be a hot air nozzle which emits hot air.

The heating device comprising the heating element probe or the hot air nozzle may drive the heating element probe or the hot air nozzle according to a control command. For example, the heating element probe or hot air nozzle may be moved in a specific traveling direction, the temperature of the heating element probe may be controlled, or the amount of hot air emitted from the hot air nozzle may be controlled.

The deformation patterns 23*a*' may have at least a flat part, and even the other part may have at least partially smoothly convex or smoothly concave shape. At the deformation patterns 23*a*', light is not exited from the light exiting part 20 likewise at the resin 55 of the first embodiment, and most of the light from the light source 10 may be totally reflected in the light exiting part 20. On the other hand, since the remaining light exiting patterns 23*b* are not deformed, light reflected from the remaining light exiting patterns 23*b* may be exited downward through the lower surface (or the other surface) of the light exiting part 20.

Next, referring to FIG. 40, a resin layer 70' having a predetermined refractive index is formed on the deformation patterns 23*a*' and the remaining light exiting patterns 23*b* of the light exiting part 20. The resin layer 70' has a relatively low refractive index lower than that of the light exiting part 20. Since the resin layer 70' is formed on the entire surface of the light exiting part 20 to cover the deformation patterns 23*a*' and the remaining light exiting patterns 23*b*, the remaining light exiting patterns 23*b* may be protected from external foreign substances without disturbing the selective light exiting effect.

As illustrated in FIG. 40, the light exiting member according to the second embodiment of the present invention comprises a light exiting part 20 having a light exiting patterns 23 formed on one surface and a resin layer 70' disposed on the light exiting part 20, wherein portions of the light exiting patterns 23*a* among the light exiting patterns 23 of the light exiting part 20 is deformation patterns 23*a*' deformed by heat, and the resin layer 70 is disposed on the deformation patterns 23*a*' and the remaining light exiting patterns 23*b*. Here, the resin layer 70 may have a low refractive index which is relatively lower than the refractive index of the light exiting part 20.

According to the method of manufacturing the light exiting member according to the first and second embodiments described referring FIGS. 36 to 40, in a light exiting part having intaglio or/and embossed light exiting patterns on at least one surface thereof, a resin having a refractive index equal to or similar to the refractive index of the light exiting pattern is formed on portions of the light exiting patterns, or the portions of the light exiting patterns are deformed, and a resin layer is formed thereon, thereby implementing a light exiting member of which only a specific portion thereof exits light.

Figure 9:
FIG. 9 is an actual photograph of a conventional acrylic lighting device.
Figure 10:
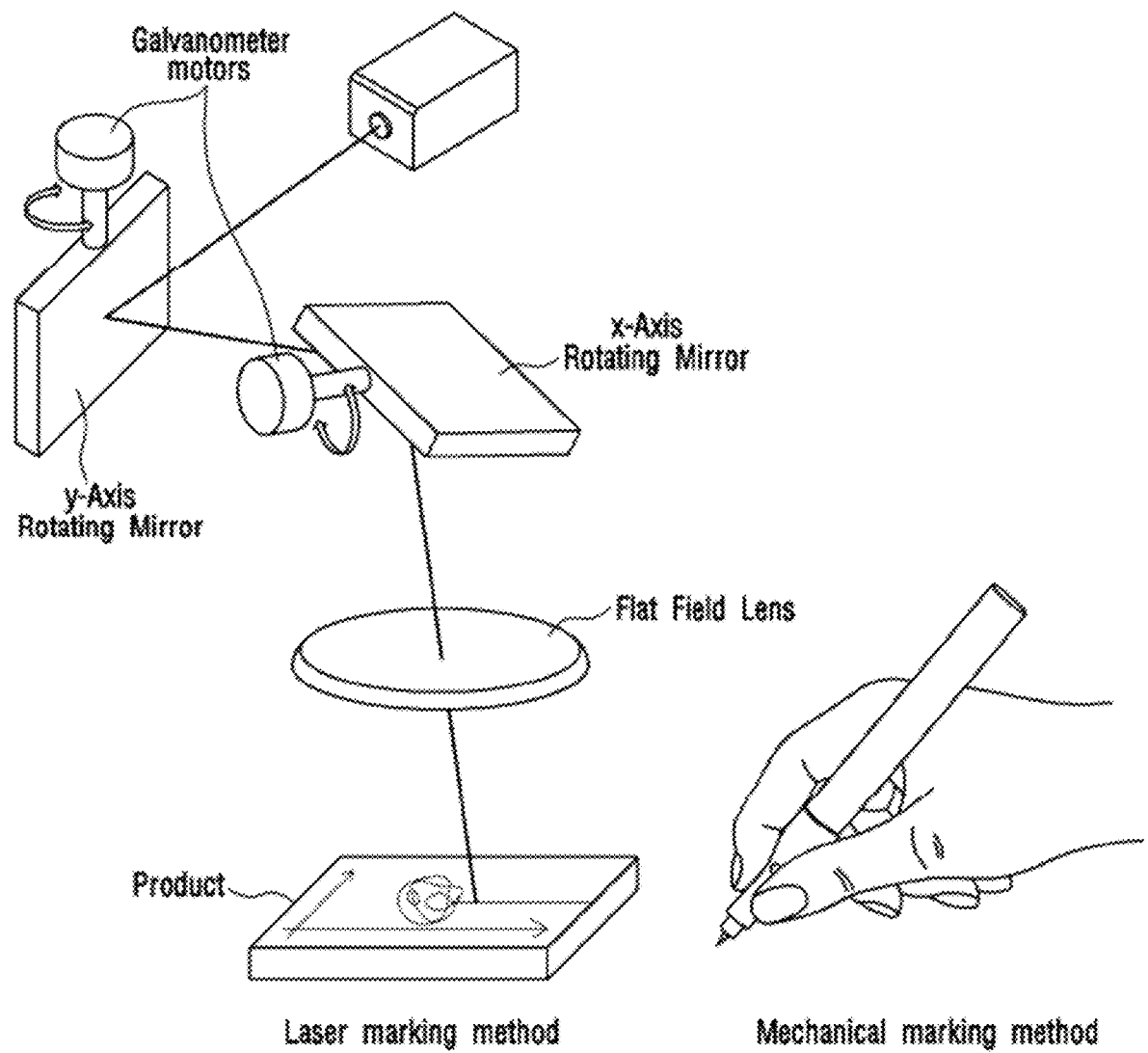
FIG. 10 is a diagram illustrating conventional methods of implementing a specific image in the conventional acrylic lighting device illustrated in FIG. 9.

The light exiting member thus manufactured may present a patterned image of a specific shape, such as the conventional acrylic lighting illustrated in FIG. 9. Unlike the conventional method, the method for manufacturing a light exiting member according to the first and second embodiments of the present invention has an advantage that manufacturing costs are reduced since metal molds are unnecessary, desired images (or patterns) may be variously manufactured, and delicate images (or patterns) may be implemented.

In particular, the method of manufacturing the light exiting member according to the first embodiment has the advantage of being able to reuse the light exiting member. After the resin layer 70 and the resin 55 are removed through a removal method such as a removal solution, a new image may be implemented in the light exiting part.

In addition, the method of manufacturing the light exiting member according to the first and second embodiments differs from the prior art in that a printing method used in general printed paper, fabric, film, etc. is used in a new application in selectively removing or preserving the intaglio/embroidered light emitting pattern of the light emitting portion, which is different from the conventional use.

Figure 41:
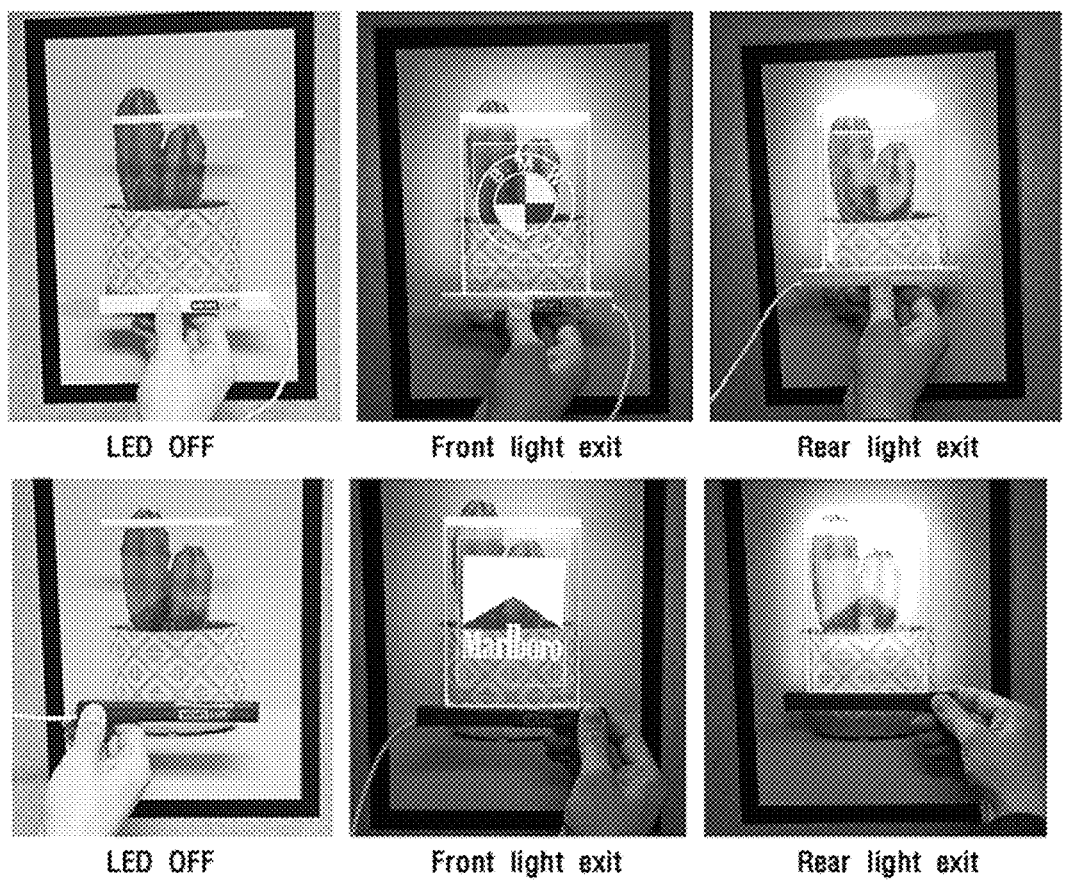
FIG. 41 is photographs showing an actual operation of applying a light exiting member manufactured using a manufacturing method of a light exiting member according to a first embodiment or a second embodiment of the present invention to a light unit.

FIG. 41 is photographs showing an actual operation of applying a light exiting member manufactured using the manufacturing method of a light exiting member according to the first embodiment or the second embodiment of the present invention to a light unit.

The light unit illustrated in FIG. 41 comprises a light source LED and a light guide plate. In addition, it further comprises a light exiting member manufactured according to the first embodiment or the second embodiment disposed on one surface of the light guide plate.

Referring to FIG. 41, in a state in which the light source LED is turned off, it may be seen that since the light exiting member according to the first embodiment or the second embodiment of the present invention is made of a transparent material, and thus a cactus image positioned behind the rear side of the light exiting member is transmitted and visible as it is. This means that the light reflected from the cactus image transmits the light guide plate and the light exiting member of the lighting device as it is.

On the other hand, when the light source LED is turned on, a specific image (BMW or Marlboro) drawn by the resin 55 or the deformation patterns 23a' formed on one surface of the light exiting member is viewed from the front surface (a surface where the light exiting pattern is not formed) of the light exiting member. In the case of front light exit, it may be seen that the cactus image positioned behind the rear side of the light exiting member is hidden by the specific image (BMW or Marlboro) and is hardly visible. On the other hand, in the case of the rear light exit, the specific image (BMW or Marlboro) is hardly visible on the rear surface (the surface on which the light exiting pattern is formed), and it can be seen that the cactus image is transmitted and visible as it is.

As described above, the light exiting member manufactured according to the first embodiment or the second embodiment may be attached to one surface of the light guide plate to provide a light unit capable of implementing delicate and various specific images.

The light exiting part 20 illustrated in FIG. 36 may be the light exiting member 230' illustrated in FIGS. 13 to 14A and 14B, or may be any one of the light exiting members of FIGS. 15A-E. In addition, the light exiting part 20 illustrated in FIG. 36 may be used in a light unit as illustrated in FIGS. 16 to 18. In addition, the light exiting part 20 illustrated in FIG. 36 may be the light exiting member 230' illustrated in FIG. 19, and may be used in a light unit as illustrated in FIGS. 20 to 21.

FIGS. 42A to 51 are diagrams for explaining embodiments of a light unit to which a light exiting member according to embodiments of the present invention described in FIGS. 38 and 40 is applied.

Here, the light exiting part of the light exiting members 1000, 2000, . . . 9000 illustrated in FIGS. 42A to 51 may be one of those illustrated in FIGS. 36, 13, 15, and 19.

Figure 42A:
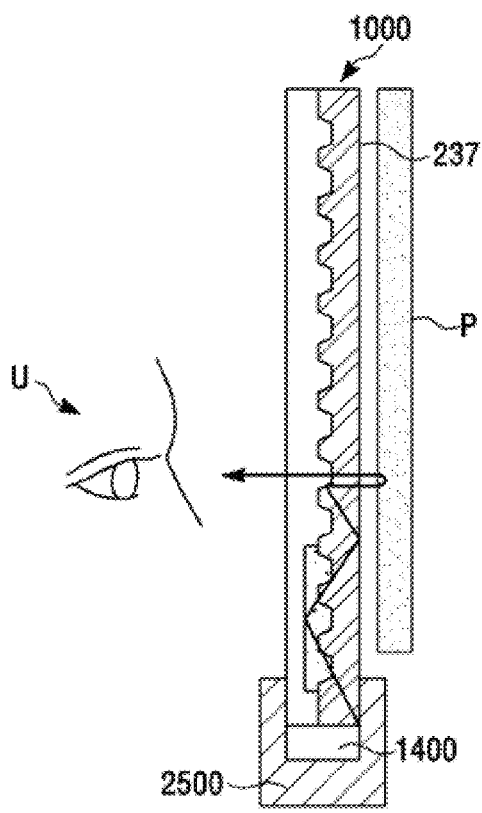
FIGS. 42A to 51 are diagrams for explaining embodiments of a light unit to which a light exiting member according to embodiments of the present invention described in FIGS. 38 and 40 is applied.
Figure 42B:
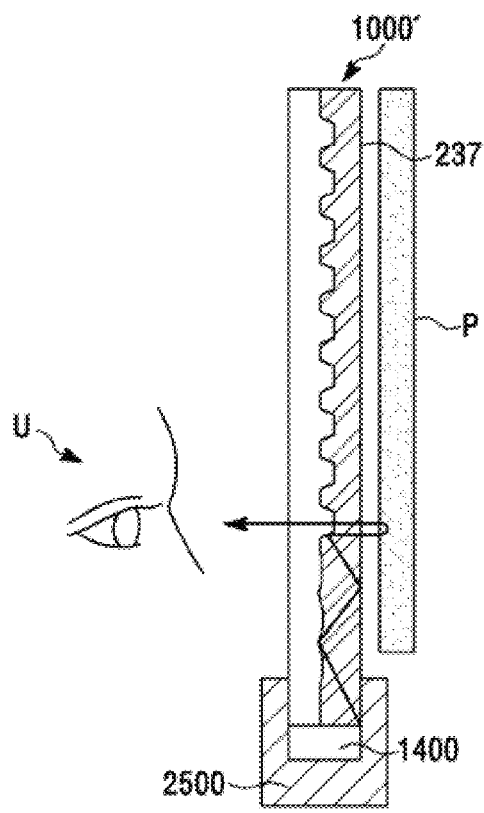

FIGS. 42A-B are diagrams illustrating a light unit according to a first embodiment of the present invention.

Referring to FIG. 42A, a light unit according to an embodiment of the present invention comprises a light exiting member 1000, a light source 1400, and a housing 2500.

The light exiting member 1000 may be the light exiting member illustrated in FIG. 38. The light exiting member 1000 comprises a light exiting surface 237 through which light from the light source 1400 is exited. Here, the light exiting surface 237 may be referred to as other surface of the light exiting member 1000.

Referring to FIG. 42B, a light unit according to an embodiment of the present invention comprises a light exiting member 1000', a light source 1400, and a housing 2500.

The light exiting member 1000' may be the light exiting member illustrated in FIG. 40. The light exiting member 1000' comprises a light exiting surface 237 through which light from the light source 1400 is exited. Here, the light exiting surface 237 may be referred to as other surface of the light exiting member 1000'.

In FIGS. 42A-B, the light source 1400 is disposed at one side surface of the light exiting members 1000 and 1000' and emits light to the light exiting members 1000 and 1000'. The light source 1400 may be one or a plurality of LEDs, and may be CCFL.

The light source 1400 is disposed inside the housing 2500. Since the light source 1400 is disposed inside the housing 2500, foreign substances or light from the outside may be prevented from reaching the light source 1400.

The housing 2500 may be disposed to cover one side part comprising one side surface of the light exiting members 1000 and 1000'. The housing 2500 may be configured such that light emitted from the light source 1400 does not leak to the outside other than the light exiting members 1000 and 1000'. The housing 2500 may have a receiving groove in which the light source 1400 is accommodated. The one side part of the light exiting members 1000 and 1000' may be accommodated in the receiving groove.

In the light units according to the embodiments of the present invention illustrated in FIGS. 42A-B, light emitted from the light sources 1400 is incident on the light exiting members 1000 and 1000', and the light which is traveling while being totally reflected in the light exiting members 1000 and 1000' is reflected substantially perpendicular to the light exiting surface 237 and exited to the outside through the light exiting surface 237. The light exited from the light exiting surface 237 is reflected by the subject P to be lighted (for example, a printed material) and passes through the light exiting members 1000 and 1000' to reach the user U. Here, the subject P to be lighted may be attached to and fixed to the light exiting surfaces 237 of the light exiting members 1000 and 1000' through an adhesive.

When the light units of the present invention illustrated in FIGS. 42A-B are used, the subject P may be lighted only by using a single of the light exiting members 1000 and 1000', the user may accurately recognize the information displayed on the subject P not only under a dark environment but also under a bright environment, and since illumination is applied to the subject P, the probability of exposure of the subject P to the user U may be increased, thereby improving the advertising effect. In addition, since the light exiting member described above with reference to FIGS. 38 and 40 is used, there is an advantage in that a fine and delicate image may be implemented.

Figure 43:
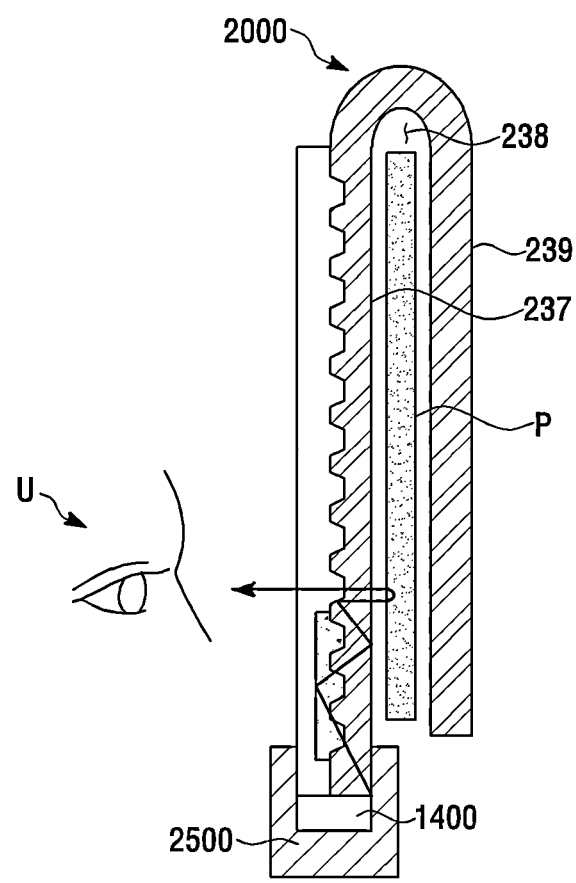

FIG. 43 is a diagram illustrating a light unit according to a second embodiment of the present invention.

Referring to FIG. 43, a light unit according to a second embodiment of the present invention comprises a light exiting member 2000, a light source 1400, and a housing 2500. Since the structures of the light source 1400 and the housing 2500 are the same as those of the light source 1400 and the housing 2500 illustrated in FIGS. 42A-B, a detailed description thereof will be replaced with the above description.

In addition, it should be noted that the light exiting member 1000' illustrated in FIG. 42B is not illustrated in the following drawings including FIG. 43. But, this is just for the convenience of explanation. And, it should be noted that in the following drawings including FIG. 43, the light emitting member 1000' shown in FIG. 42B may be applied instead of the light emitting member 1000 shown in FIG. 42A.

The light exiting member 2000 further comprises an extension part 239 extending from the other side part of the light exiting member 1000 illustrated in FIG. 42A. The extension part 239 may extend from the other side part among both side parts of the light exiting member 1000 illustrated in FIG. 42A and may be bent toward the one side part of the light exiting member 1000.

The light exiting member 2000 has a receiving part 238 which is formed by the extension part 239 and capable of accommodating a subject P to be lighted. Here, the extension part 239 may have a predetermined elasticity in a direction toward the light exiting surface 237. The user may pull the extension part 239 in a direction away from the light exiting surface 237 to receive the subject P in the receiving part 238, and the subject P received in the receiving part 238 may be fixed to the receiving part 238 without a separate adhesive due to the elasticity of the extension part 239.

By using the light unit according to the second embodiment of the present invention illustrated in FIG. 43, there is an advantage that a subject P to be lighted may be fixed to the light exiting member 2000 without an additional adhesive, in addition to the advantages of the light unit illustrated in FIGS. 42A-B.

Figure 44:
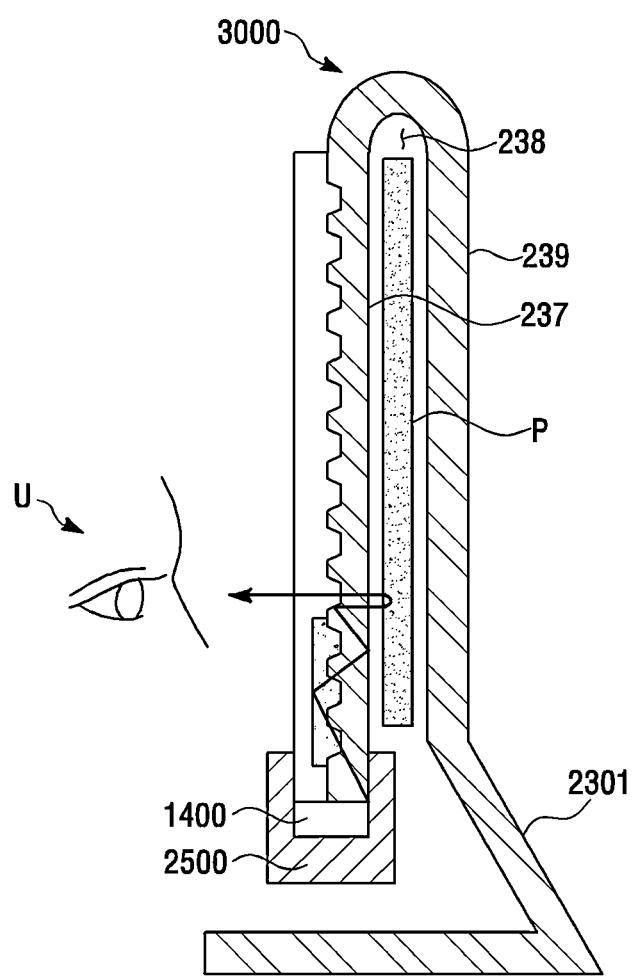

FIG. 44 is a diagram illustrating a light unit according to a third embodiment of the present invention.

Referring to FIG. 44, a light unit according to a third embodiment of the present invention comprises a light exiting member 3000, a light source 1400, and a housing 2500. Since the structures of the light source 1400 and the housing 2500 are the same as those of the light source 1400 and the housing 2500 illustrated in FIGS. 42A-B, a detailed description thereof will be replaced with the above description.

The light exiting member 3000 further comprises a support part 2301 extending from the end of the extension part 239 of the light exiting member 2000 illustrated in FIG. 43. The support part 2301 may extend from an end portion of the extension part 239 and may have a portion bent at least once. The support part 2301 is bent to cover the housing 2500 and supports the light unit according to the third embodiment of the present invention from the bottom.

When the light unit according to the third embodiment of the present invention illustrated in FIG. 44 is used, there is advantages that the overall light unit may be supported by the light exiting member 3000, and since the entire portion of the light unit except the light source 1400 and the housing 2500 may be implemented by a material of the light exiting member 3000, uniformity of the light unit may be provided to the user, in addition to the advantages of the light unit illustrated in FIG. 43.

Figure 45:
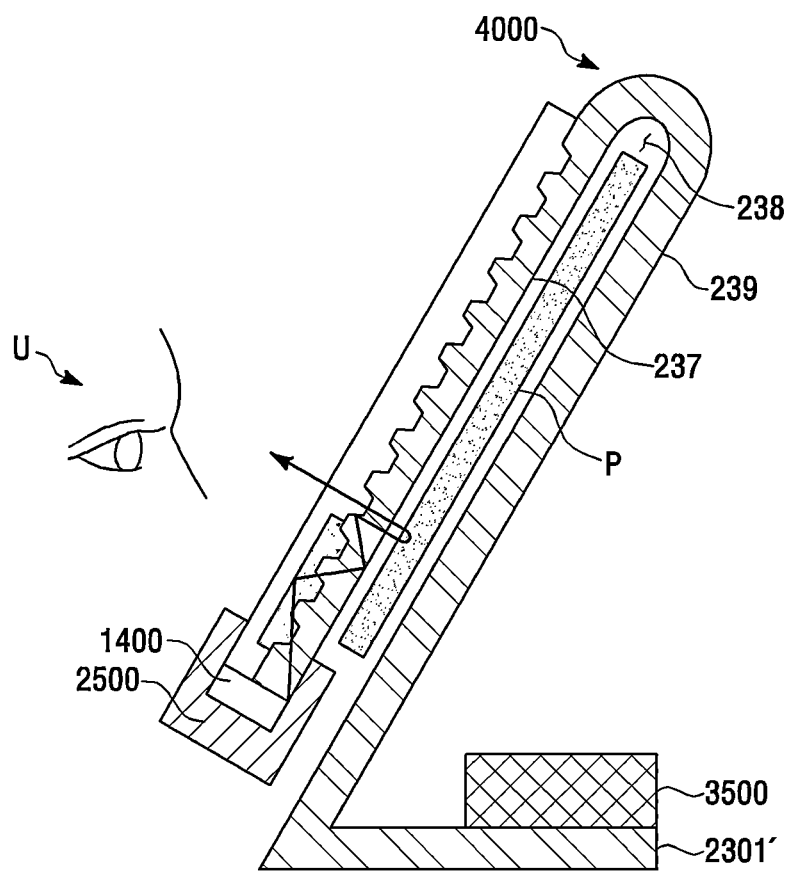

FIG. 45 is a diagram illustrating a light unit according to a fourth embodiment of the present invention.

Referring to FIG. 45, a light unit according to a fourth embodiment of the present invention comprises a light exiting member 4000, a light source 1400, a housing 2500, and a battery 3500. Since the structures of the light source 1400 and the housing 2500 are the same as those of the light source 1400 and the housing 2500 illustrated in FIGS. 42A-B, a detailed description thereof will be replaced with the above description.

The light exiting member 4000 further comprises a support part 2301' extending from the end of the extension part 239 of the light exiting member 2000 illustrated in FIG. 43. The support part 2301' may extend from the end of the extension part 239 and may have a bent part at least once. The support part 2301' is bent at the end of the extension part 239 in a direction opposite to the direction in which the housing 2500 is located, and supports the light unit according to the fourth embodiment of the present invention from the bottom.

The extension part 239 of the light exiting member 4000 may be supported by the support part 2301' and may be inclined at a predetermined angle. For example, an angle formed by an upper surface of the support part 2301' and one surface of the extension part 239 may be an acute angle.

The battery 3500 is disposed on the support part 2301' of the light exiting member 4000 and supplies power to the light source 1400. Since the battery 3500 is disposed on the support part 2301', there is an advantage in that the battery 3500 is not exposed to the user U.

When the light unit according to the fourth embodiment of the present invention illustrated in FIG. 45 is used, there is advantages that the light unit may be supported by the light exiting member 4000 and since the entire light unit may be implemented by a material of the light exiting member 4000, uniformity may be provided to the user, the light exiting member 4000 are inclined at a predetermined angle so that the user U may easily obtain information on the subject P, and the battery 3500 is not exposed to the user, in addition to the advantages of the light unit illustrated in FIG. 43.

Figure 46:
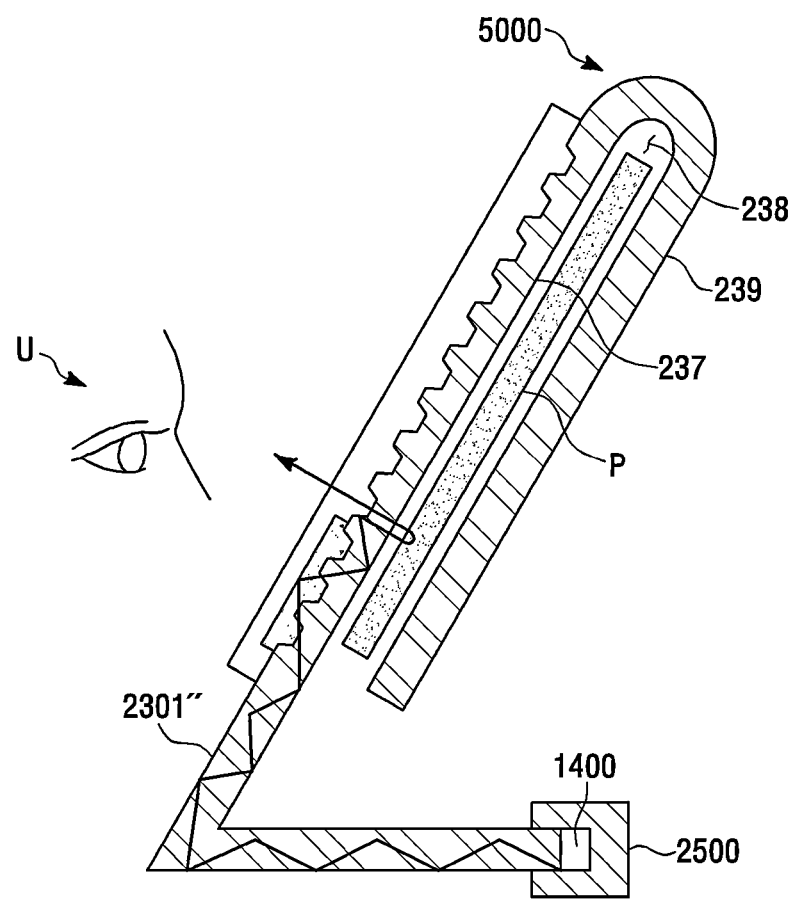

FIG. 46 is a diagram illustrating a light unit according to a fifth embodiment of the present invention.

Referring to FIG. 46, a light unit according to a fifth embodiment of the present invention comprises a light exiting member 5000, a light source 1400, and a housing 2500. Since the structures of the light source 1400 and the housing 2500 are the same as those of the light source 1400 and the housing 2500 illustrated in FIGS. 42A-B, a detailed description thereof will be replaced with the above description.

The light exiting member 5000 further comprises a support part 2301" extending from the one side part of the light exiting member 2000 illustrated in FIG. 43. The support part 2301" may extend from one side part of the light exiting member 2000 illustrated in FIG. 18 and may have a bent part at least once. The support part 2301" extends from one side part of the light exiting member 2000 illustrated in FIG. 18 by a predetermined length and is bent toward the extension part 239 to support the light unit according to the fifth embodiment of the present invention from the bottom.

The light exiting surface 237 and the extension part 239 of the light exiting member 5000 may be supported by the support part 2301' and may be inclined at a predetermined angle. For example, an angle formed between the upper surface of the support part 2301" and the light exiting surface 237 may be an acute angle.

The light source 1400 may be disposed at one side surface of the end portion of the support part 2301", and the housing 2500 may be disposed to receive the end portions of the light source 1400 and the support part 2301".

Although not shown separately in the drawings, a battery (not shown) may be disposed on the support part 2301", and power may be supplied to the light source 1400. Since the battery (not shown) is disposed on the support part 2301", there is an advantage that the battery is not exposed to the user U.

When the light unit according to the fifth embodiment of the present invention illustrated in FIG. 46 is used, there is advantages that the light unit may be supported by the light exiting member 5000 and since the entire light unit may be implemented by a material of the light exiting member 5000, uniformity may be provided to the user, the light exiting member 5000 are inclined at a predetermined angle so that the user U may easily obtain information on the subject P, and the battery is not exposed to the user, in addition to the advantages of the light unit illustrated in FIG. 43.

Figure 47:
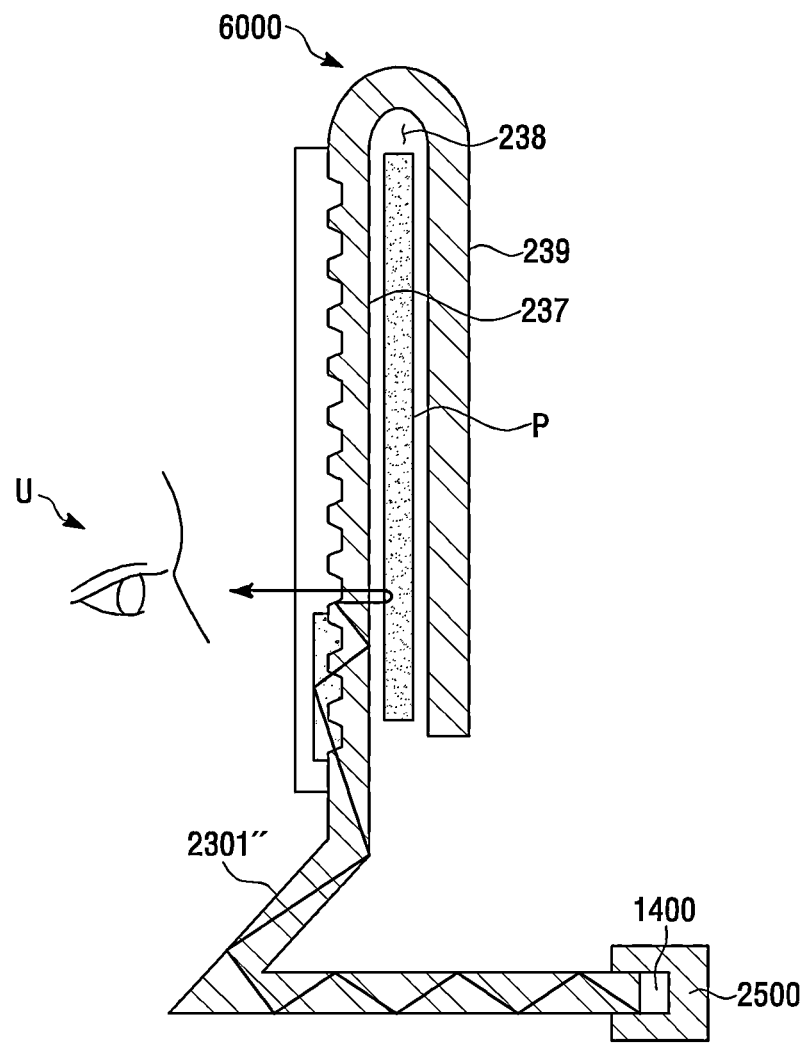

FIG. 47 is a diagram illustrating a light unit according to a sixth embodiment of the present invention.

The light unit in accordance with the sixth embodiment of the present invention illustrated in FIG. 47 is different from the light unit illustrated in FIG. 46 in that the support part 2301" is extended so as to be bent twice, and the light exiting member 6000 is disposed perpendicular to the ground. Here, the angle formed by the light exiting member 6000 with the ground may be variously changed in design.

According to the light unit according to the sixth embodiment of the present invention illustrated in FIG. 47, there is advantages that the light unit may be supported by the light exiting member 6000, since the entire light unit may be implemented by a material of the light exiting member 6000, uniformity may be provided to the user, and the battery is not exposed to the user, in addition to the advantages of the light unit illustrated in FIG. 43.

Figure 48:
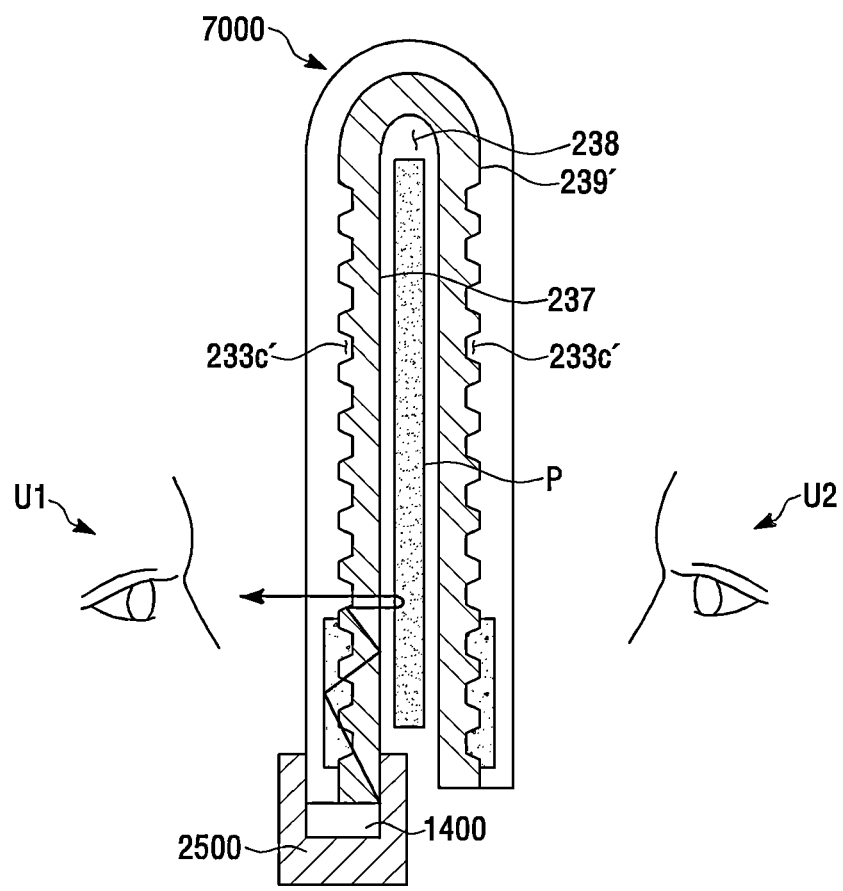

FIG. 48 is a diagram illustrating a light unit according to a seventh embodiment of the present invention.

The light unit in accordance with the seventh embodiment of the present invention illustrated in FIG. 48 is different in the light exiting member 7000 illustrated in FIG. 43, when compared to the light unit illustrated in FIG. 43.

Specifically, the light exiting member 7000 comprises an extension part 239', and one surface of the extension part 239' has a cavity 233c' which is a light exiting pattern. Accordingly, the extension part 239' has one surface having the cavity 233c' and a light exiting surface 237.

According to the light unit according to a seventh embodiment of the present invention illustrated in FIG. 48, there is advantages that when the subject P to be lighted is a double-sided print, the information on one surface of the light unit may be shown to first user U1 located at one side of the light unit and simultaneously the information on the other surface of the light unit may be shown to second user U2 located at the other side of the light unit, in addition to the advantages of the light unit illustrated in FIG. 43.

Figure 49:
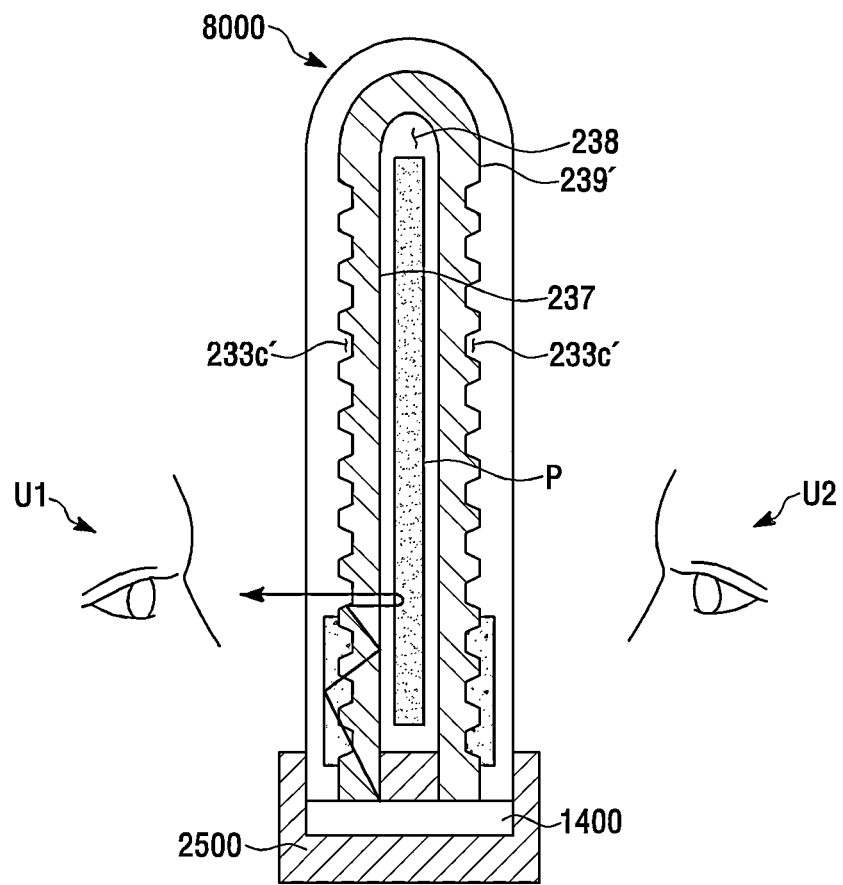

FIG. 49 is a diagram illustrating a light unit according to an eighth embodiment of the present invention.

The light unit according to an eighth embodiment of the present invention illustrated in FIG. 49 is different from the light unit illustrated in FIG. 48 in that the light emitting member 8000 has a symmetrical structure and in the light source 1400' and the housing 2500'.

The housing 2500' may be configured to accommodate the light source 1400', and to accommodate both ends of the light exiting member 8000.

The light source 1400' is disposed at both ends of the light exiting member 8000. That is, the light source 1400' may simultaneously emits light to both ends of the light exiting member 8000. Accordingly, substantially the same lighting effect may be provided to the first user U1 and the second user U2 at the same time.

Figure 50:
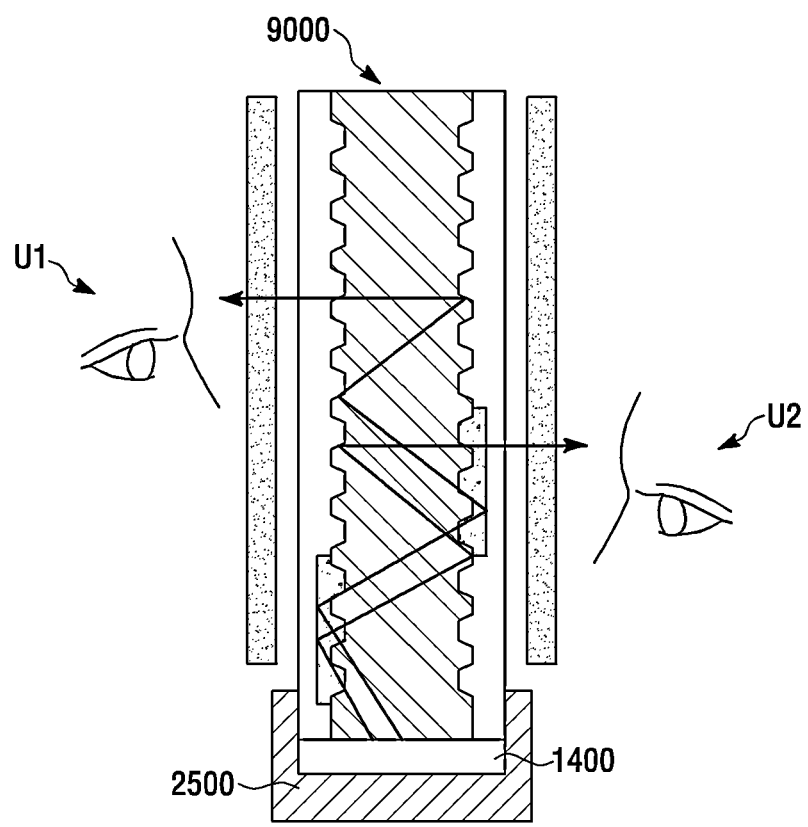

FIG. 50 is a diagram illustrating a light unit according to a ninth embodiment of the present invention.

The light unit according to the ninth embodiment of the present invention illustrated in FIG. 50 comprises a light exiting member 9000, a light source 1400, and a housing 2500. Here, since the light source 1400 and the housing 2500 are the same as the light source 1400 and the housing 2500 illustrated in FIGS. 42A-B, a detailed description thereof will be replaced with those described above.

The light exiting member 9000 has cavities that are light exiting patterns on both sides of the light exiting member 1000 illustrated in FIG. 42A.

Light reflected from the cavity formed on one surface of the light exiting member 9000 is exited to the other surface, and light reflected from the cavity formed on the other surface of the light exiting member 9000 is exited to the one surface. That is, both surfaces of the light exiting member 9000 may function as light exiting surfaces.

When the first transmissive subject P1 to be lighted is disposed on the one surface of the light exiting member 9000 and the second transmissive subject P2 to be lighted is disposed on the other surface of the light exiting member 9000, the first user U1 may obtain information printed on the first transmissive subject P1 through light exited from the one surface of the light exiting member 9000, and the second user U2 may obtain information printed on the second transmissive subject P2 through light exited from the other surface of the light exiting member 9000.

Figure 51:
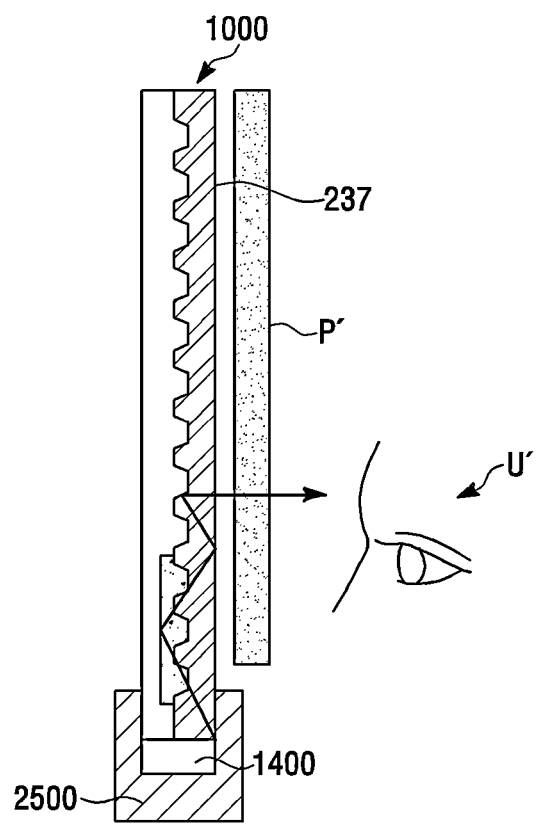

FIG. 51 is diagram for describing other lighting method of the light unit according to the first embodiment of the present invention illustrated in FIG. 42A.

Referring to FIG. 51, the light unit according to the first embodiment of the present invention may exit light to the transmissive subject P' located on the light exiting surface 237, through which a user U' may obtain information contained in the transmissive subject P'. In this way, the light unit according to the first embodiment of the present invention has an advantage of being able to illuminate not only non-transmissive subjects but also transmissive subjects.

The subjects P and P' illustrated in FIGS. 42A to 51 may be a mirror such as a single-sided mirror or a double-sided mirror. If the subjects P and P' are mirrors, a user may use the light unit as a general mirror when light is not incident (light-off) on the light exiting member of FIGS. 42A to 51, and the user may use the light unit as lighting when light is incident (light-on). In particular, when the light unit is used as a lighting, it may be used as a lighting for broadcast photographing, and a partial lighting where light is exited only at a specific portion may be implemented. For example, such a partial lighting may be implemented as in which light is exited only at an edge portion of a mirror surface which is a subject to be lighted. As another example, light may be exited only at the top or bottom of the mirror surface, or at any specific part, or only at a predetermined image or character.

Figure 52:
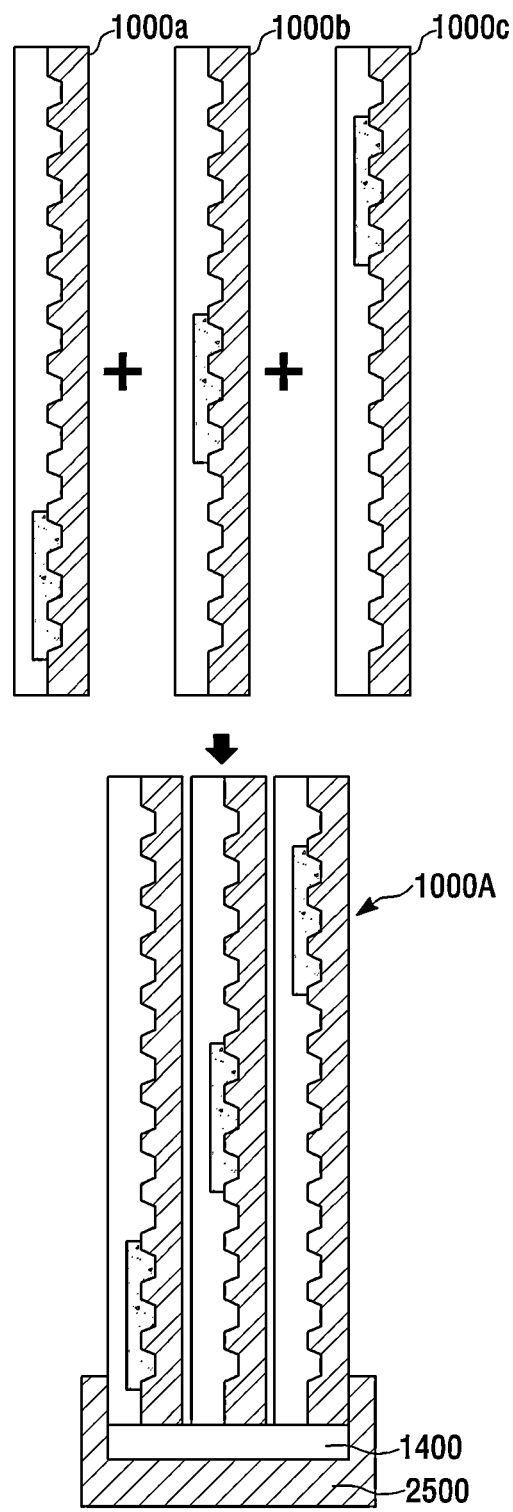
FIGS. 52 to 54 are diagrams for explaining other embodiments of a light unit to which a light exiting member according to embodiments of the present invention described with reference to FIGS. 38 and 40 is applied.
Figure 53:
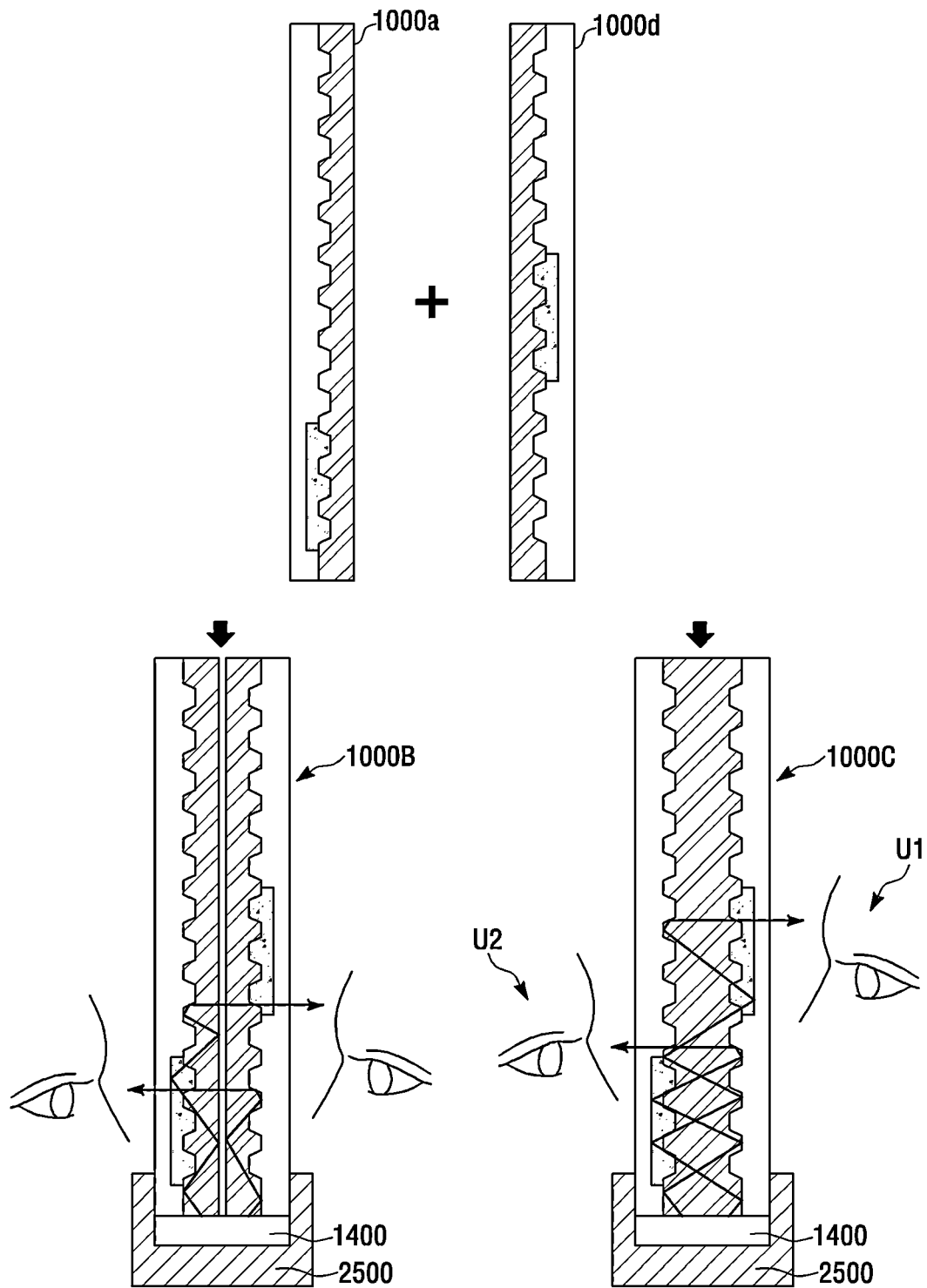
Figure 54:
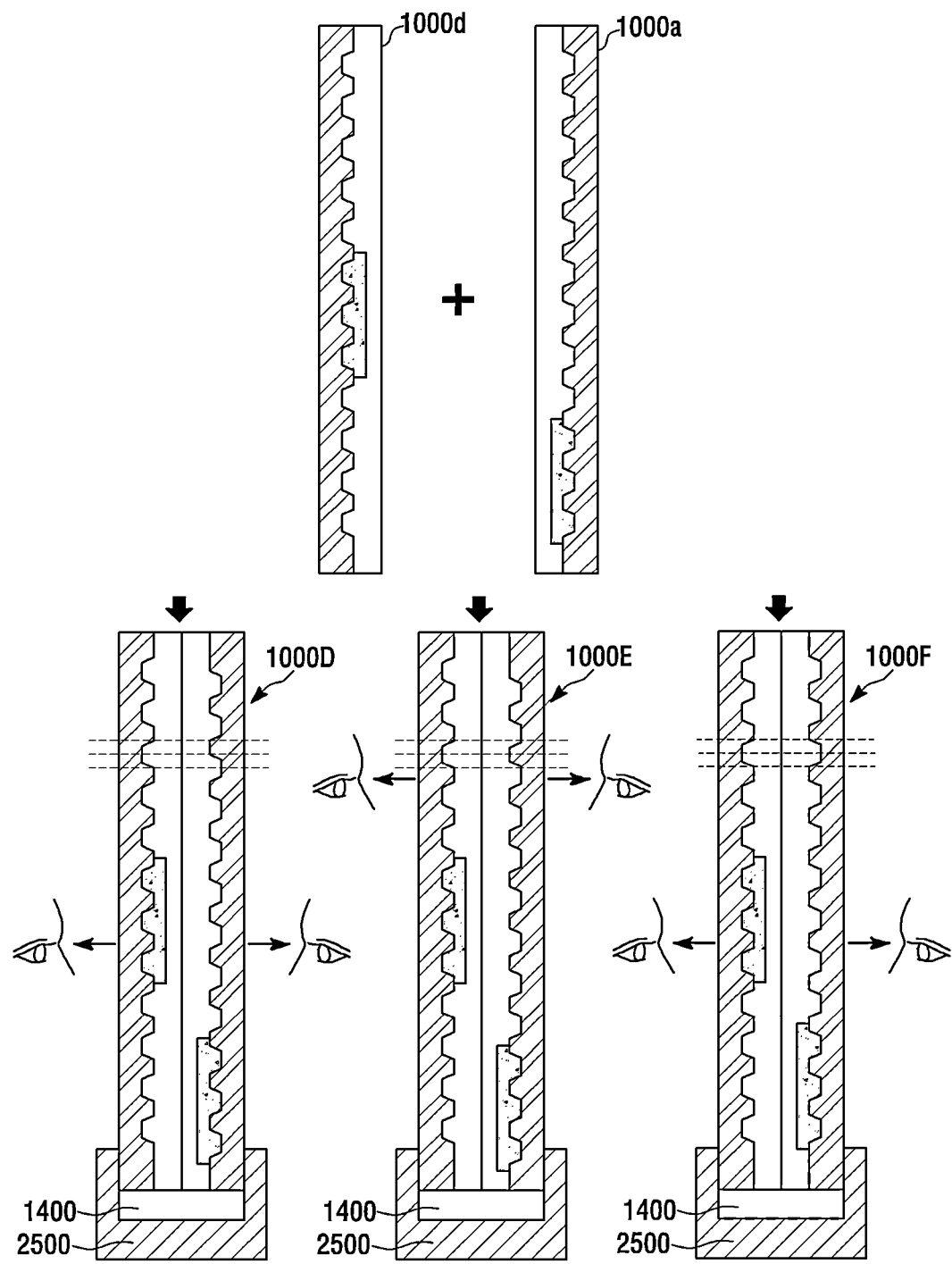

FIGS. 52 to 54 are diagrams for explaining other embodiments of a light unit to which a light exiting member according to embodiments of the present invention described with reference to FIGS. 38 and 40 is applied.

In FIGS. 52 to 54, for convenience of description, various light units will be described with reference to the light exiting member illustrated in FIG. 38. Accordingly, it can be acknowledged that the light exiting member 1000 illustrated in FIGS. 52 to 54 may be replaced with the light exiting member illustrated in FIG. 40.

FIG. 52 is a diagram illustrating a light unit according to a tenth embodiment of the present invention.

Referring to FIG. 52, a light unit according to a tenth embodiment of the present invention comprises a light exiting member 1000A, a light source 1400, and a housing 2500.

The light source 1400 is disposed at one side surface of one side part of the light exiting member 1000A, and the housing 2500 accommodates the light source 1400 and accommodates the one side part of the light exiting member 1000A.

The light exiting member 1000A may be a plurality of light exiting members 1000a, 1000b, and 1000c combined together. Here, each of the plurality of light exiting members 1000a, 1000b, and 1000c may be approximately 1 T(mm). When the light exiting member 1000A is configured with a combination of a plurality of light exiting members 1000a, 1000b, 1000c, the unidirectional light exiting luminance can be improved compared to that of using one light exiting member.

Meanwhile, the light exiting member 1000A comprises a plurality of laminated light exiting members 1000a, 1000b, and 1000c. The plurality of light exiting members 1000a, 1000b, and 1000c may be laminated, and a predetermined air gap may be formed between the two laminated light exiting members 1000a, 1000b, and 1000c. Here, each of the plurality of light exiting members 1000a, 1000b, and 1000c may be positioned such that one surface in which a cavity, which is a light exiting pattern, is formed faces the same direction. According to the light unit with such light exiting member 1000A, the light incident from the light source 1400 is totally reflected on both surfaces of each of the light exiting members 1000a, 1000b, 1000c in the light exiting member 1000A and travels inside of each of the light exiting members 1000a, 1000b, 1000c in the light exiting member 1000a, 1000b, 1000c and the travelling light is reflected on the inner surface defining the cavity 233c' toward the light exiting surface of the light exiting members 1000a, 1000b, 1000c and exited to outside through the light exiting surface.

FIG. 53 is a diagram illustrating a light unit according to an eleventh embodiment of the present invention.

The light unit according to the eleventh embodiment of the present invention illustrated in FIG. 53 is different in the light exiting member, when compared to the light unit illustrated in FIG. 52.

The light exiting members 1000B and 1000C illustrated in FIG. 53 may be a plurality of light exiting members 1000a and 1000d illustrated in FIG. 38 combined together. More specifically, the light exiting members 1000B and 1000C may be bonded so that the two light exiting members 1000a and 1000d are symmetrical to each other.

The light exiting member 1000B may be disposed such that light exiting surfaces of the two light exiting members 1000a and 1000d face each other. A predetermined air gap may be formed between the two light exiting members 1000a and 1000d which are disposed to face each other. A light unit comprising such light exiting member 1000B has an advantage in that double-sided light exit is possible. That is, lighting may be provided to not only the first user UI but also the second user U2 located on both sides with the light exiting member 1000B interposed therebetween.

Meanwhile, the light exiting member 1000C may comprise two light exiting members 1000a and 1000d integrally formed into one body. The light unit comprising the light exiting member 1000C has an advantage in that double-sided light exit is possible.

FIG. 54 is a diagram illustrating a light unit according to a twelfth embodiment of the present invention.

The light unit according to the twelfth embodiment of the present invention illustrated in FIG. 54 is different in the light exiting member, when compared to the light unit illustrated in FIG. 53.

The light exiting members 1000D, 1000E, and 1000F may be a plurality of light exiting members illustrated in FIG. 38 combined together. Here, the light exiting members 1000D, 1000E, and 1000F may be combined in a state in which the two light exiting members 1000d and 1000a are disposed to be symmetrical to each other. The two light exiting members 1000d and 1000a may be combined such that one surfaces of the two light exiting members 1000d and 1000a in which the cavity, which is a light exiting pattern, is formed face each other.

Likewise with the light exiting member illustrated in FIG. 53, the light exiting members 1000D, 1000E, and 1000F may provide lighting to the first user U1 and the second user U2 located at both sides of the light exiting members 1000D, 1000E, and 1000F.

The light exiting member 1000D comprises two light exiting members 1000d and 1000a. The two light exiting members 1000d and 1000a may be combined so that one surfaces where the cavity, which is a light exiting pattern, is formed face each other, and the cavities facing each other partly overlap each other.

In addition, the light exiting member 1000E comprises two light exiting members 1000d and 1000a. The two light exiting members 1000d and 1000a may be combined so that one surfaces where the cavity, which is a light exiting pattern, is formed face each other, and the cavities facing each other do not overlap each other.

In addition, the light exiting member 1000F comprises two light exiting members 1000d and 1000a. The two light exiting members 1000d and 1000a may be combined so that one surfaces where the cavity, which is a light exiting pattern, is formed face each other, and the cavities facing each other completely overlap each other.

Since the light units illustrated in FIGS. 52 to 54 comprise light exiting member in which a plurality of light exiting members illustrated in FIG. 38 or 40 are combined in various ways, there are advantages that light exiting luminance may be improved, and not only unidirectional light exiting but also bidirectional light exiting is possible.

Figures 55A, 55B, 55C:
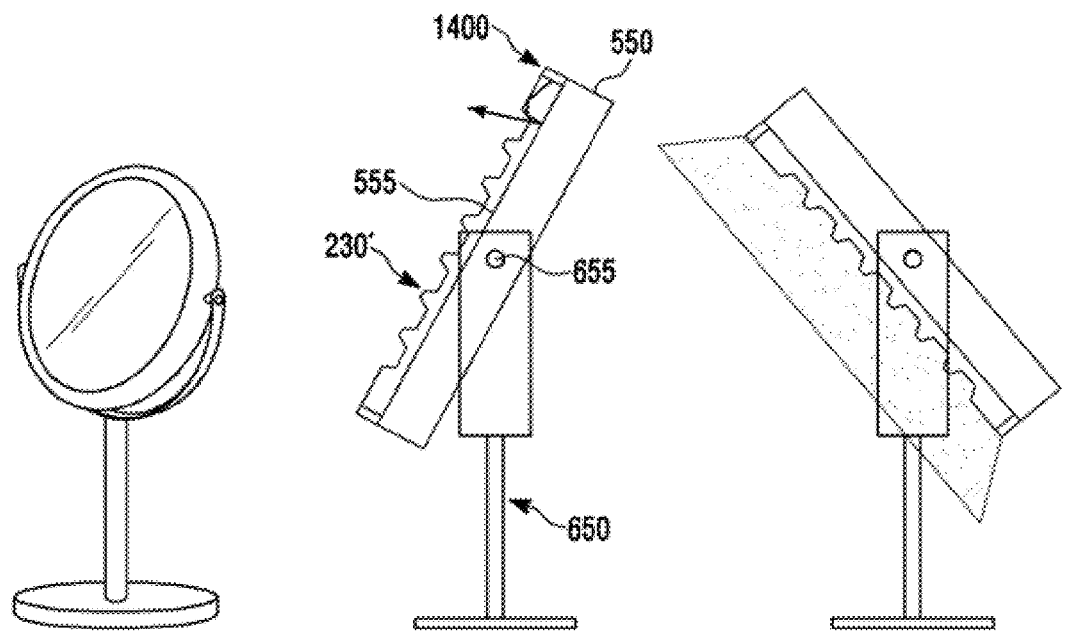
FIGS. 55A-C are diagrams illustrating a light unit according to a thirteenth embodiment of the present invention.

FIGS. 55A-C are diagrams illustrating a light unit according to a thirteenth embodiment of the present invention. FIG. 55A is a perspective view of a light unit according to a thirteenth embodiment of the present invention, FIG. 55B is a schematic side view of the light unit before driving, and FIG. 55C is a schematic side view of the light unit after driving.

The light unit according to the thirteenth embodiment of the present invention illustrated in FIGS. 55A-C may further comprise a mirror part 550, a light exiting member 230', and a support part 650 for mounting and supporting the mirror part 550 and enabling rotation of the mirror part 550.

The mirror part 550 is made of a material that reflects incident light. The mirror part 550 comprises at least one mirror surface, and the shape of the mirror surface may be implemented in a various shape such as a circle, an oval, and a polygonal shape.

The light exiting member 230' is disposed on the mirror surface 555 of the mirror part 550. Here, the light exiting member 230' may be attached to the mirror surface 555 through an adhesive member. The light exiting member 230' may be the one illustrated in FIG. 13 described above, but is not limited thereto. The light exiting member 230' may be replaced by the light exiting member 230' illustrated in FIG. 11, or may be replaced by the light exiting member 230' illustrated in FIG. 19. In addition, the light exiting member 230' may be replaced by the light exiting member of FIG. 38 or 40.

The light source 1400 is disposed at one side surface of the light exiting member 230' to emit light to the one side surface. Light incident on the one side surface of the light exiting member 230' may be reflected from patterns of the light exiting member 230' and exited toward the mirror surface 555. The exited light may be reflected from the mirror surface 555 and transmitted through the light exiting member 230' to be exited to the outside.

The light source 1400 may be located on the mirror part 550. The light source may be located on the mirror surface 555.

The support part 650 may be coupled to the mirror part 550 to support the mirror part 550. The support part 650 may further comprise a hinge member 655 capable of rotating the mirror part 550. The mirror part 550 may rotate through the hinge member 655.

FIG. 55B illustrates a state in which the light source 1400 is not driven. In this state, since the light exiting member 230' of the light unit is a transparent thin plate, the light unit functions as a general mirror. Accordingly, a mirror surface appears as shown in the right view of FIG. 56.

Figure 56:
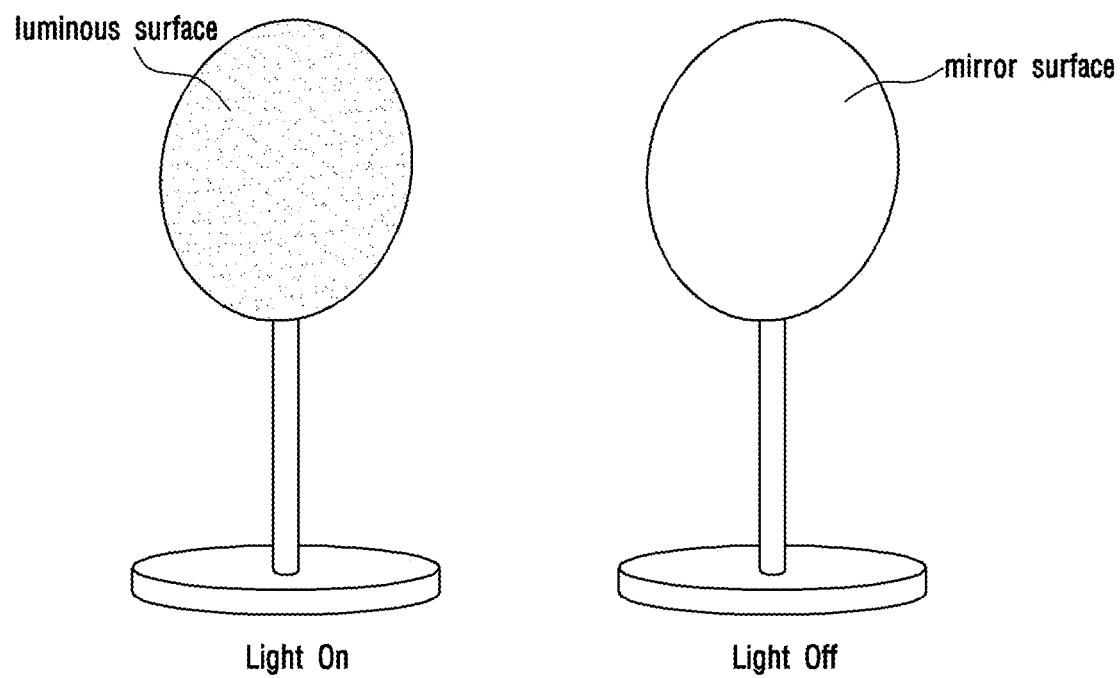
FIGS. 56 to 58 are diagrams illustrating a modified example and a driving method of the light unit of FIGS. 55A-C.

FIG. 55C illustrates a state in which the light source 1400 is driven. In this state, light may be emitted through the light exiting member 230' of the light unit. Since light is emitted from the light unit of FIGS. 55A-C, a luminescent surface is formed, as shown in the left view of FIG. 56. Here, as illustrated in FIG. 56, the light emitting surface may be the entire mirror surface, but is not limited thereto, and the light emitting surface may occupy a smaller area than the mirror surface. That is, the light emitting surface may be a portion of the mirror surface.

Figure 57:
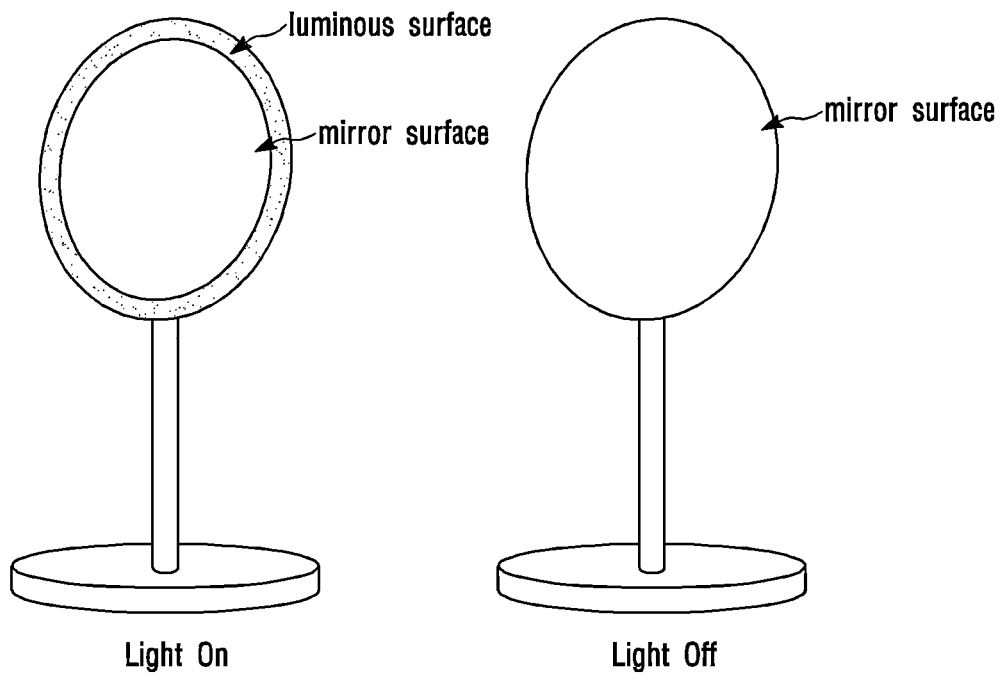
Figure 58:
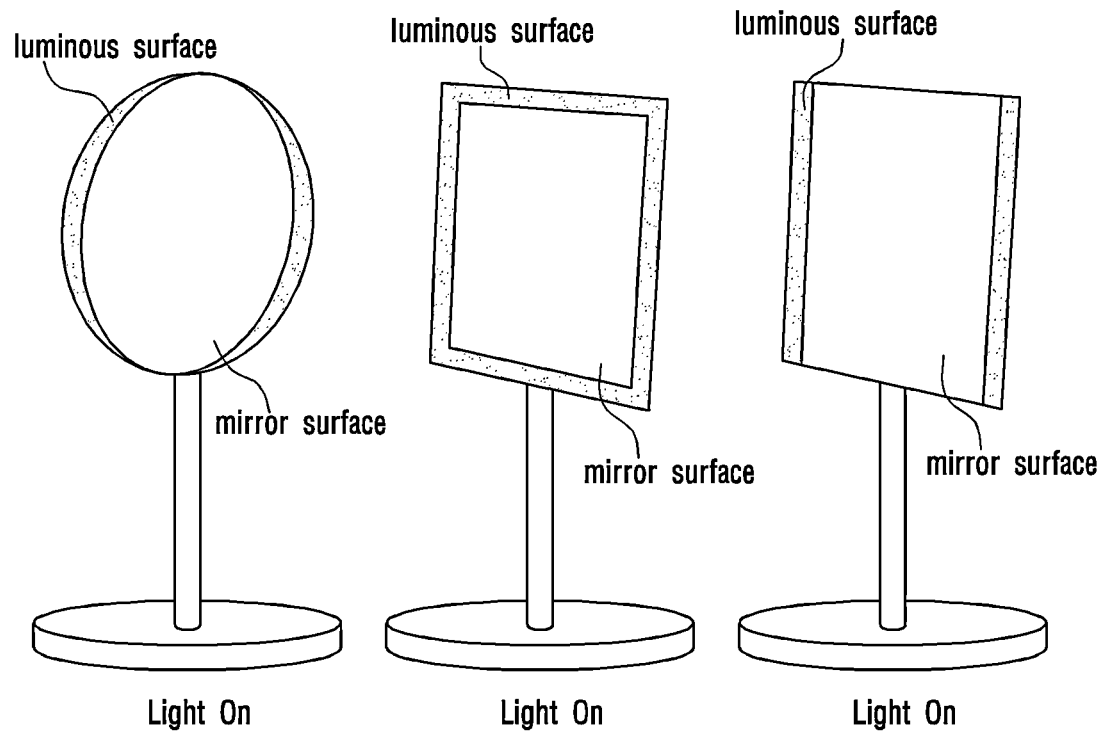

Specifically, referring to FIG. 57, any one of the light exiting members 230, 230', and 230' illustrated in FIGS. 11, 13 and 19 may be disposed on a portion corresponding to the light emitting surface on the mirror surface. Alternatively, the light exiting members illustrated in FIGS. 38 and 40 may be disposed on the entire mirror surface but exit light only at a portion corresponding to the light emitting surface. FIG. 58 is a modified example of FIG. 57 and illustrates various shapes of the light emitting surface.

Figure 59:
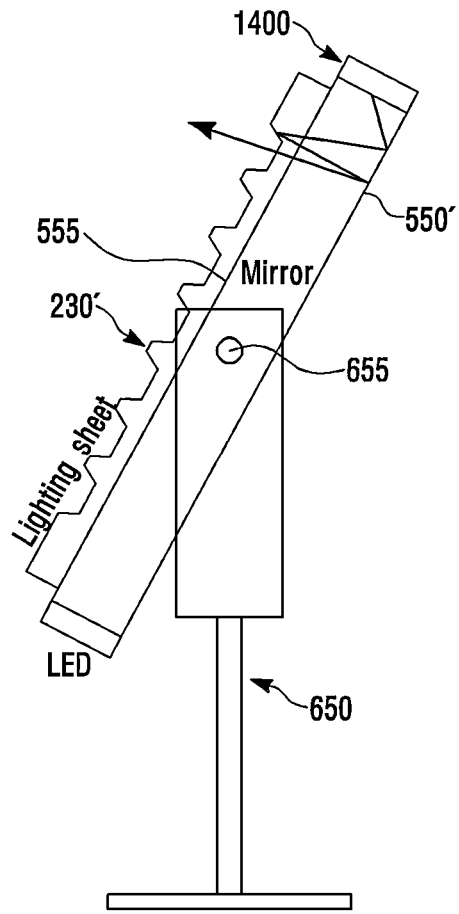
FIG. 59 is a diagram illustrating a light unit according to a fourteenth embodiment of the present invention.

FIG. 59 is a diagram illustrating a light unit according to a fourteenth embodiment of the present invention.

The light unit illustrated in FIG. 59 may comprise a mirror part 550', a light exiting member 230', and a light source 1400, and may further comprise a support part 650 that mounts and supports the mirror part 550' and enables rotation of the mirror part 550'.

The light unit illustrated in FIG. 59 differs from the light unit illustrated in FIGS. 55A-C in positions of the mirror part 550' and the light source 1400. The rest of the configurations are the same, so a description of them will be omitted.

The mirror part 550' may guide light incident from the light source 1400 located on one side surface. The mirror part 550' may perform a function of the light guide member 210 illustrated in FIGS. 11, 18, and 21. Since the thickness of the light exiting member 230' is thinner than that of the mirror part 550, it may be more stable to position the light source 1400 on one side surface of the mirror part 550.

In the light unit illustrated in FIG. 59, as illustrated in FIGS. 56 to 58, a light exiting surface may be implemented on the entire mirror surface or a portion of the mirror surface.

Figure 60:
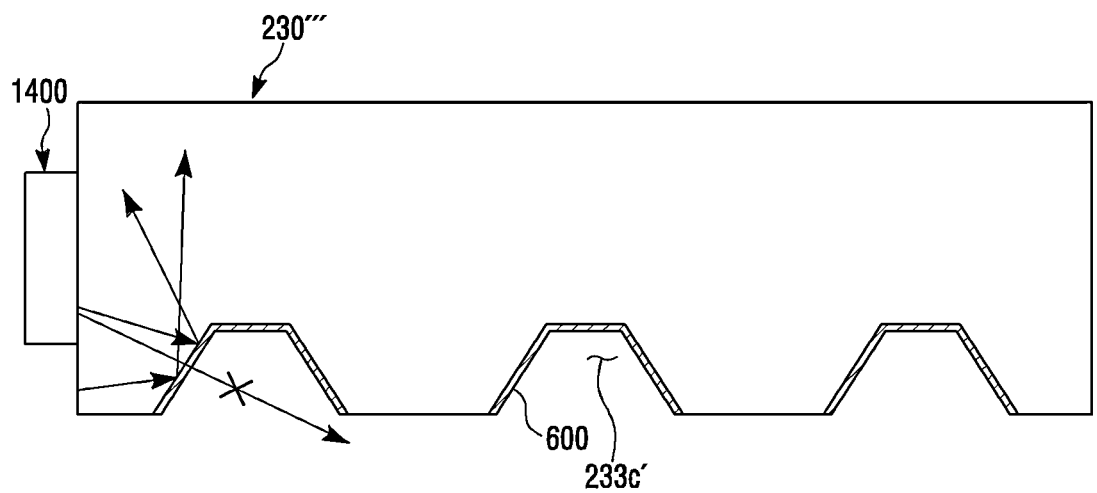
FIG. 60 illustrates a modified light exiting member and a light unit comprising the same.

FIG. 60 illustrates a modified light exiting member and a light unit comprising the same.

Referring to FIG. 60, the modified light exiting member 230''' may further comprise a mirror layer 600 added to the light exiting member 230' illustrated in FIG. 13. Here, the light exiting member 230' to which the mirror layer 600 is applied is illustrated using the light exiting member 230' illustrated in FIG. 13, but is not limited thereto. The light exiting member 230''' illustrated in FIG. 60 may be the light exiting member 230 illustrated in FIG. 11, the light exiting member 230'' illustrated in FIG. 19, or the light exiting member illustrated in FIG. 38 or 40.

The mirror layer 600 may be disposed in at least one cavity 233c'. The mirror layer 600 may be disposed on the bottom and inner surface(s) defining the cavity 233c'. Here, the mirror layer 600 may be coated on the bottom and inner surface(s) defining the cavity 233c'.

Although there is a loss of transparency and transmittance of the light exiting member 230''' due to the mirror layer 600, there is an advantage in that high-angle light emission problem, that is, light incident from the light source 1400 is exited as it is from the inner surface defining the cavity 233c', may be prevented. In addition, since the mirror layer 600 is not disposed on the entire surface of the light exiting member 230''' but is disposed in the cavity 233c', there is an advantage in that transparency of the light exiting member 230''' may be ensured.

Figure 61:
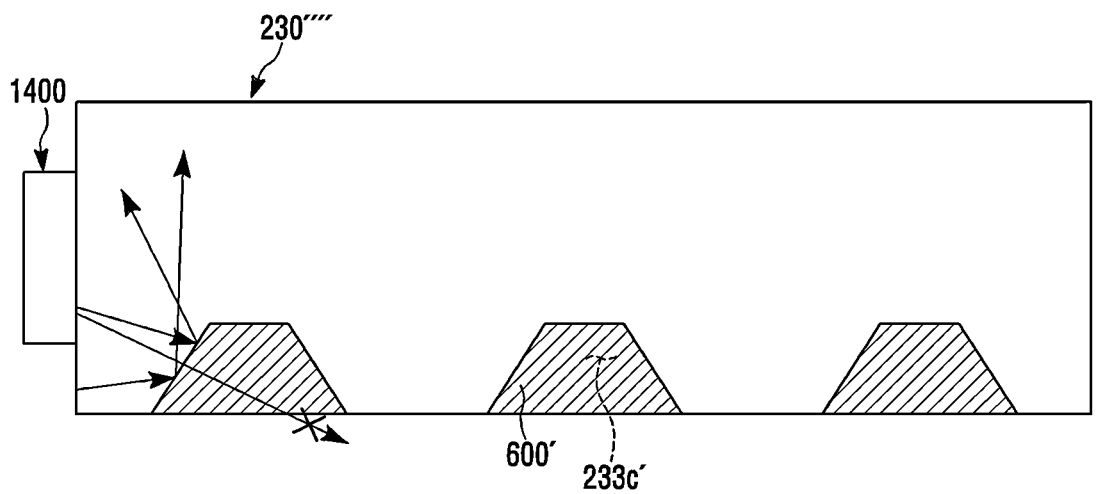
FIG. 61 illustrates a modified example of the light unit illustrated in FIG. 60.

FIG. 61 illustrates a modified example of the light unit illustrated in FIG. 60.

The light unit of FIG. 61 differs only in the structure of the mirror layer 600' of the light exiting member 230'''', when compared to the light unit of FIG. 60. Since the remaining configurations are the same, a detailed description will be omitted.

The mirror layer 600' is disposed to fill the interior of the cavity 233c'. In FIG. 61, the mirror layer 600' is illustrated to fill the entire interior of the cavity 233c', but the present invention is not limited thereto. The mirror layer 600' may be disposed to fill at least a portion of the interior of the cavity 233c'.

Like the light unit of FIG. 60, the light unit of FIG. 61 may prevent high-angle light emission problem and may ensure a certain degree of transparency.

Figure 62:
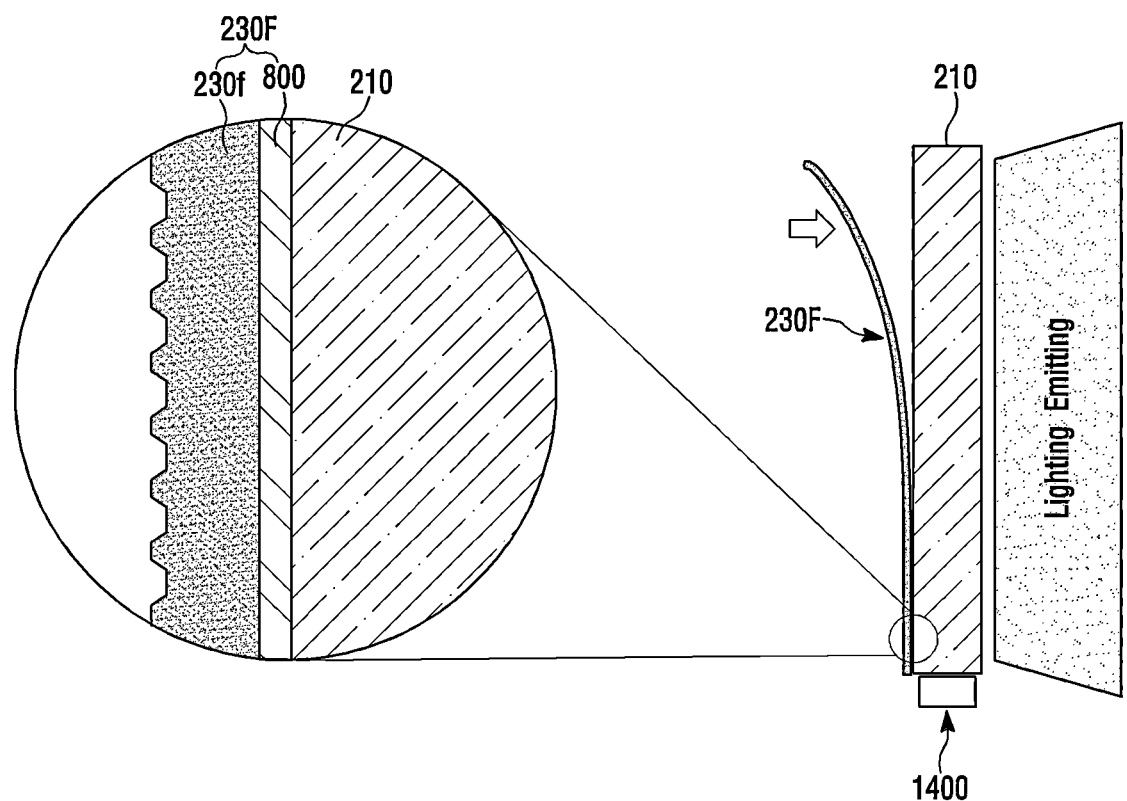
FIG. 62 is a diagram illustrating a light unit according to a fifteenth embodiment of the present invention.

FIG. 62 is a diagram illustrating a light unit according to a fifteenth embodiment of the present invention.

Referring to FIG. 62, a light unit according to a fifteenth embodiment of the present invention comprises a light exiting member 230F, a light guide member 210, and a light source 1400.

The light exiting member 230F is attached to one surface of the light guide member 210.

The light exiting member 230F may comprise a light exiting film 230*f* and an adhesive layer 800.

The light exiting film 230*f* may be the light exiting member shown in any one of FIGS. 11, 13, 19, 38, and 40 being formed in a film form of a flexible material. The light exiting film 230*f* may be a film on which a plurality of patterns may be transferred to one surface thereof (as shown in FIGS. 11, 13, 19, 38 and 40).

The adhesive layer 800 is formed on the one surface of the light exiting film 230*f*. The adhesive layer 800 is a layer having an adhesive component and may comprise OCR, OCA, or other double-sided adhesive.

Figure 63:
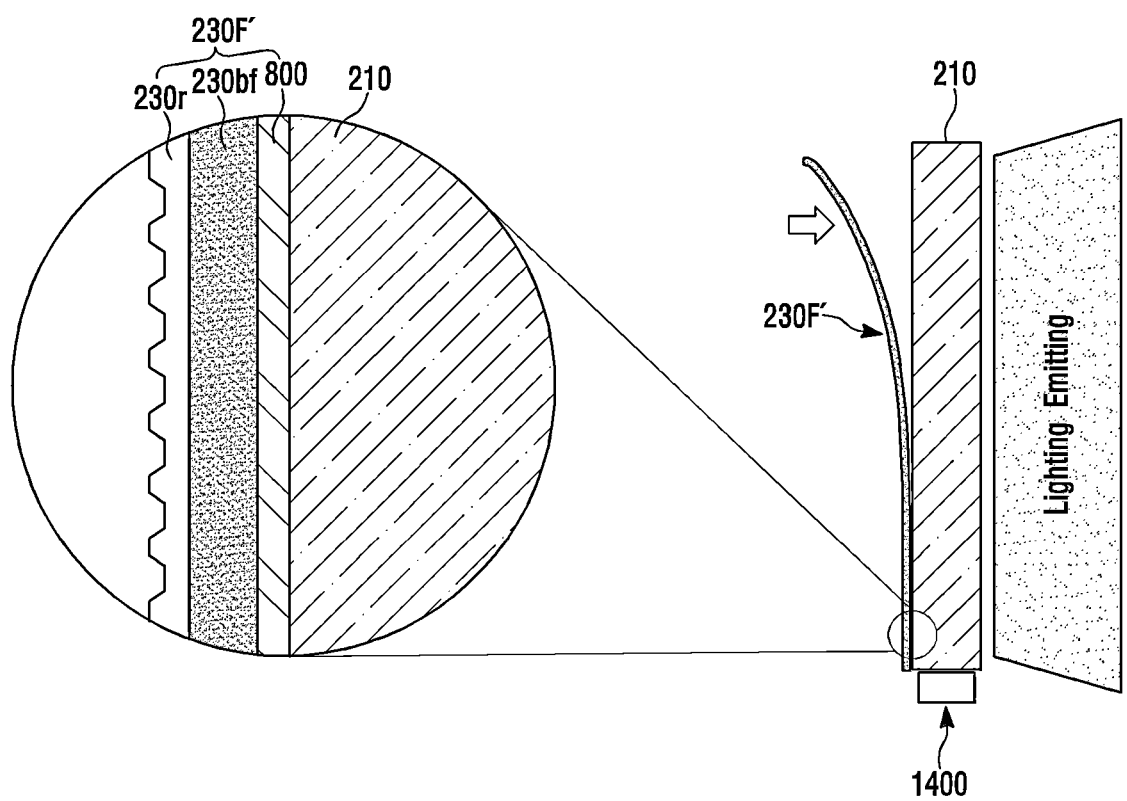
FIG. 63 illustrates a modified example 230F' of the light exiting member 230F of the light unit of FIG. 62.

FIG. 63 illustrates a modified example 230F' of the light exiting member 230F of the light unit of FIG. 62.

Referring to FIG. 63, the light exiting member 230F' may comprise a base film 230*bf*, a resin layer 230*r* disposed on one of both surfaces of the base film 230*bf*, and an adhesive layer 800 disposed on the other surface of the base film 230*bf*.

The base film 230*bf* may be made of a flexible material.

A plurality of patterns (as shown in FIGS. 11, 13, 19, 38 and 40) may be transferred to one surface of the resin layer 230*r*. The resin layer 230*r* may be formed of a UV curable resin that may be cured by ultraviolet rays.

Features, structures, effects, etc. described in the embodiments are comprised in one embodiment of the present invention and are not necessarily limited to one embodiment. Furthermore, the features, structures, effects, and the like illustrated in each embodiment may be implemented in combination or modification with respect to other embodiments by a person skilled in the art to which the embodiments belong. Therefore, it should be interpreted that the matters related to these combinations and modifications are comprised in the scope of the present invention.

In addition, although the embodiments have been mainly described above, these are merely examples and the present invention is not limited, and it will be appreciated by a person skilled in the art that various modifications and applications not illustrated are possible within the scope not departing from the present invention. For example, each component specifically shown in the embodiments may be modified and implemented. And differences related to these modifications and applications should be interpreted as falling within the scope of the present invention as defined in the appended claims.

What is claimed is:

1. A light exiting member comprising:
a plurality of fine pattern portions formed on one surface, wherein at least one fine pattern portion of the plurality of fine pattern portions has a cavity, the cavity is defined by a lower surface located at a predetermined depth from an opening and a plurality of inner surfaces each of which is connected to each side of the lower surface,
wherein the cavity has a width which becomes narrower from the opening toward the lower surface,
wherein each of the inner surfaces is a curved surface convex toward inside of the cavity,
wherein the cavity has a trapezoidal cross-section,
wherein the cross-section of the trapezoid is perpendicular to the one surface while passing through a central axis of the cavity,
wherein the cross-section of the trapezoid includes first to fourth straight lines,
wherein the first straight line is included in the lower surface,
wherein the plurality of inner surfaces includes a first inner surface and a second inner surface arranged to face each other,
wherein the second straight line is included in the first inner surface,
wherein the third straight line is included in the second inner surface,
wherein the fourth straight line is included in the opening,
wherein an angle between the second straight line and the fourth straight line is an acute angle, and
wherein an angle between the second straight line and the first straight line is an obtuse angle.

2. The light exiting member of claim 1, wherein the plurality of inner surfaces is disposed symmetrically with respect to the cavity.

3. The light exiting member of claim 1, wherein the fine pattern portion comprises a protruding pattern disposed inside the cavity and protruding from the lower surface toward the opening, and wherein the protruding pattern has a truncated cone shape whose diameter decreases toward the opening direction.

4. The light exiting member of claim 1, further comprising:
a mirror layer disposed on the inner surface and filling a part or all of the cavity.

5. The light exiting member of claim 1, wherein at least two inner surfaces of the plurality of inner surfaces are disposed such that at least a portion faces each other.

6. A light unit, comprising:
a light source; and
a light exiting member for exiting light upward from the light source,
wherein the light exiting member has a plurality of fine pattern portions formed on one surface thereof,
wherein at least one fine pattern portion of the plurality of fine pattern portions has a cavity,
wherein the cavity is defined by a lower surface located at a predetermined depth from an opening and a plurality of inner surfaces each of which is connected to each side of the lower surface,
wherein the cavity has a width which becomes narrower from the opening toward the lower surface,
wherein each of the inner surfaces is a curved surface convex toward inside of the cavity,
wherein the cavity has a trapezoidal cross-section,
wherein the cross-section of the trapezoid is perpendicular to the one surface while passing through a central axis of the cavity,
wherein the cross-section of the trapezoid includes first to fourth straight lines,
wherein the first straight line is included in the lower surface,
wherein the plurality of inner surfaces includes a first inner surface and a second inner surface arranged to face each other, wherein the second straight line is included in the first inner surface, wherein the third straight line is included in the second inner surface, wherein the fourth straight line is included in the opening, wherein an angle between the second straight line and the fourth straight line is an acute angle, and wherein an angle between the second straight line and the first straight line is an obtuse angle.

7. The light unit of claim 6, wherein at least two inner surfaces of the plurality of inner surfaces are disposed such that at least a portion faces each other.

8. The light unit of claim 6, wherein the light source is disposed at one side surface of one side part of the light exiting member, further comprising a housing for accommodating the side part of the light exiting member and the light source, wherein the light exiting member comprises an extension part extending from other side part of the light exiting member and bent toward the side part of the light exiting member, and wherein the light exiting member has a receiving part capable of accommodating a subject between the light exiting member and the extension part.

9. The light unit of claim 8, wherein the extension part has a structure symmetrical to the light exiting part, and wherein the light source is disposed together on one side surface of one side part of the light exiting part and one side surface of an end part of the extension part.

10. The light unit of claim 8, wherein the subject is a single-sided mirror or a double-sided mirror.

11. The light unit of claim 6, wherein the light exiting member comprises:

an extension part extending from other side part of the light exiting member and bent toward one side part of the light exiting member; and a support part extending from one side part of the light exiting member and bending at least once to support the light exiting member from the ground, wherein the light exiting member has a receiving part capable of receiving an subject between the light exiting member and the extension part, and wherein the light source is disposed at one side surface of an end portion of the support part, and further comprising a housing accommodating the light source and the end portion of the support part.

12. The light unit of claim 11, wherein the subject is a single-sided mirror or a double-sided mirror.

13. The light unit of claim 6, wherein the light exiting member is one in which at least two light exiting members are combined, and wherein each of the at least two light exiting members is disposed such that one surface thereof faces in one direction, or the at least two light exiting members are disposed to be symmetrical to each other.

14. The light unit of claim 13, wherein the at least two light exiting members are bonded to one body, or one of the at least two light exiting members is laminated on the other light exiting member.

15. The light unit of claim 13, wherein the at least two light exiting members are disposed to be symmetrical to each other, and wherein the cavity of one of the at least two light exiting members is at least partially overlapped with or alternately disposed with the cavity of the other light exiting member.

16. The light unit of claim 6, further comprising:

a mirror part having a top surface, wherein the light exiting member is disposed on at least a portion of an upper surface of the mirror part and is made of a transparent material, and wherein when light is provided from the light source to the light exiting member, light is exited only through the upper surface of the light exiting member.

17. The light unit of claim 16, wherein the light source is mounted on one side surface of the mirror part, and wherein the mirror part guides light provided from the light source and provides the light to the light exiting member.

18. The light unit of claim 16, wherein the light exiting member is disposed on at least a portion of an edge of an upper surface of the mirror part.

* * * * *